US011895033B2

(12) United States Patent
Li et al.

(10) Patent No.: US 11,895,033 B2
(45) Date of Patent: Feb. 6, 2024

(54) METHOD AND APPARATUS FOR TRAFFIC ROUTING AND PATH OPTIMIZATION FOR PEER-TO-PEER COMMUNICATIONS

(71) Applicants: Xu Li, Nepean (CA); Ngoc Dung Dao, Ottawa (CA); Hang Zhang, Nepean (CA)

(72) Inventors: Xu Li, Nepean (CA); Ngoc Dung Dao, Ottawa (CA); Hang Zhang, Nepean (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/185,795

(22) Filed: Nov. 9, 2018

(65) Prior Publication Data

US 2019/0158408 A1    May 23, 2019

Related U.S. Application Data

(60) Provisional application No. 62/632,898, filed on Feb. 20, 2018, provisional application No. 62/588,197, filed on Nov. 17, 2017.

(51) Int. Cl.
*H04L 47/20* (2022.01)
*H04W 72/56* (2023.01)
(Continued)

(52) U.S. Cl.
CPC .......... *H04L 47/20* (2013.01); *H04L 12/189* (2013.01); *H04L 67/104* (2013.01); *H04W 72/56* (2023.01); *H04W 88/02* (2013.01)

(58) Field of Classification Search
USPC ....................................................... 370/329
See application file for complete search history.

(56) References Cited

U.S. PATENT DOCUMENTS 8,737,956 B2 * 5/2014 Stenfelt .................. H04W 4/24
455/406
10,849,189 B2 * 11/2020 Di Girolamo .... H04W 36/0033
(Continued)

FOREIGN PATENT DOCUMENTS

CN         101330448 A      12/2008
CN         100591158 C  *    2/2010
(Continued)

OTHER PUBLICATIONS

3GPP TSG SA WG2 Meeting, Application-friendly UP Management, 3GPP, Huawei, HiSilicon (Year: 2017).*
(Continued)

*Primary Examiner* — Jeffrey M Rutkowski
*Assistant Examiner* — Luna Weissberger

(57) ABSTRACT

Application Function (AF) influenced routing for peer-to-peer (P2P) communications is provided. Core network elements correlate PDU sessions and optimize the UP path for peer-to-peer traffic. UP selection, reselection, configuration or reconfiguration can be performed in support of P2P traffic routing. P2P traffic between a pair of UEs is routed or rerouted through a bridge. The bridge may be established between the first UP and the second UP, and/or between associated RAN nodes. One or more application functions can be included along the bridge path. A policy control function (PCF) directs underlying resources to route P2P traffic via the bridge, for example in response to a trigger from the AF. A session management function (SMF) directs underlying resources to configure or reconfigure user plane data paths to route P2P traffic via the bridge. First and second SMFs of the first and second UPs can cooperate to establish the desired traffic routing. One or more UPFs can be configured to support P2P traffic detection.

22 Claims, 27 Drawing Sheets

(51) Int. Cl.
*H04L 67/104* (2022.01)
*H04W 88/02* (2009.01)
*H04L 12/18* (2006.01)

(56) References Cited

U.S. PATENT DOCUMENTS

| | | | | |
|---|---|---|---|---|
| 11,419,035 | B2* | 8/2022 | Dannebro | H04W 28/0808 |
| 2012/0094685 | A1* | 4/2012 | Marsico | H04W 4/021 |
| | | | | 455/456.1 |
| 2013/0102277 | A1 | 4/2013 | Stenfelt et al. | |
| 2017/0104758 | A1 | 4/2017 | Jin | |
| 2017/0150420 | A1* | 5/2017 | Olsson | H04L 41/5054 |
| 2018/0317121 | A1* | 11/2018 | Liao | H04L 45/38 |
| 2019/0109721 | A1* | 4/2019 | Qiao | H04L 47/24 |
| 2019/0182733 | A1* | 6/2019 | Shimojou | H04W 36/0055 |

FOREIGN PATENT DOCUMENTS

| | | | | |
|---|---|---|---|---|
| CN | 102170626 | * | 1/2011 | |
| CN | 102714788 A | * | 10/2012 | H04H 20/42 |
| CN | 105393630 A | | 3/2016 | |
| CN | 106912117 A | | 6/2017 | |
| EP | 2538719 A2 | | 12/2012 | |
| WO | WO-2009143708 A1 | * | 12/2009 | H04W 4/029 |
| WO | 2017167247 A1 | | 10/2017 | |

OTHER PUBLICATIONS

3GPP TS 23.501 V1.5.0 (Year: 2017).*
3GPP TR 23.799 V2.0.0 (Nov. 2016);3rd Generation Partnership Project;Technical Specification Group Services and System Aspects;Study on Architecture for Next Generation System(Release 14),total 523 pages.
"System Architecture for the 5G System; Stage 2"; 3GPP TS 23.501 V15.0.0 (Dec. 2017).
"Procedures for the 5G System; Stage 2"; 3GPP TS 23.502 V1.3.0 (Nov. 2017).
"3rd Generation Partnership Project; Technical Specification Group Core Network and Terminals; Study on CT WG3 Aspects of 5G System—Phase 1; Stage 3 (Release 15)", 3GPP TR 29.890, V1.1.0, Nov. 8, 2017 (Nov. 8, 2017), pp. 1-127, XP051391657.
NTT DOCOMO: "23.501: persistence of PCC rules related to application location in the SMF", 3GPP Draft; S2-176498, Aug. 24, 2017 (Aug. 24, 2017), XP051325148, total 5 pages.

* cited by examiner

METHOD AND APPARATUS FOR TRAFFIC ROUTING AND PATH OPTIMIZATION FOR PEER-TO-PEER COMMUNICATIONS

CROSS-REFERENCE TO RELATED APPLICATIONS

The present application claims priority from U.S. Provisional Patent Application No. 62/588,197 filed on Nov. 17, 2017, and U.S. Provisional Patent Application No. 62/632,898, filed on Feb. 20, 2018, both of which are incorporated herein by reference in their entirety.

FIELD OF THE INVENTION

The present invention pertains to communication networks such as $5^{th}$ generation (5G) networks, and in particular to a method and apparatus for traffic routing and path optimization for peer-to-peer communications in such a network, for example which can be responsive to influence from an application function (AF).

BACKGROUND

Peer-to-peer communication refers to the communication between two end devices such as two user equipments (UEs), referred to here as UE-1 and UE-2. In a conventional example, UE-1 initiates a packet data unit (PDU) session establishment procedure involving an application server (AS), and uses the established PDU session to send application traffic. Based on the application traffic of UE-1, the AS identifies the destination device UE-2 and triggers another PDU session establishment procedure for communicating with UE-2. UE-1's traffic is sent in the uplink (UL) direction via the first PDU session and then to the UE-2 in the downlink (DL) direction via the second PDU session.

For unstructured PDUs, the AS correlates the two PDU sessions and forwards the peer-to-peer traffic between the two UEs. For IP or Ethernet PDU, the two PDU sessions are correlated at the transport layer. For example, peer-to-peer traffic may be handled by routing intelligence at appropriate anchor user plane functions (UPFs). The user planes (UPs) of the two PDU sessions are established and maintained independently, and this may lead to inefficiencies such as inefficiencies in the UP path.

Therefore there is a need for a method and apparatus for traffic routing in peer-to-peer communications in such a network that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for Application Function (AF) influenced traffic routing for peer-to-peer (P2P) communications in such a network. Network elements are used to correlate PDU sessions and optimize the UP path for peer-to-peer traffic. UP path selection or reselection, UP path configuration or reconfiguration, or both, can be performed in support of P2P traffic routing.

Embodiments of the present invention provide for a control function (such as a policy control function) associated with a core network portion of a communication network, the control function including a processor operatively coupled to memory and a network interface. The control function is configured to receive a message indicative of a correlation between two or more PDU sessions, for example for joint user plane (UP) management. The control function is further configured, in response to the message, to transmit, to one or more management functions (such as session management functions), an instruction causing respective UP paths of at least one of the two or more PDU sessions to be selected or reselected according to the correlation between the two or more PDU sessions.

Embodiments of the present invention provide for a method for controlling user plane (UP) paths in a communication network. Referring to FIG. 23, the method 2300 includes operations by a control function associated with a core network portion of the communication network. The control function comprises or otherwise utilizes a processor operatively coupled to memory and a network interface. The method includes receiving 2310 a message requesting a correlation between two or more PDU sessions, for example for joint user plane (UP) management. The method further includes, in response to the message, transmitting 2320, to one or more management functions, an instruction causing respective user plane (UP) paths of at least one of the two or more PDU sessions to be selected or reselected according to the correlation between the two or more PDU sessions.

In embodiments, the correlation is indicative of one or more of: the two or more PDU sessions are part of the same multicast or anycast; the two or more PDU sessions correspond to peer sessions in a peer-to-peer communication; the two or more PDU sessions are part of a same group PDU session; and the two or more PDU sessions correspond to interaction with a common application.

In embodiments, the instruction includes a first instruction for one or more of the following, for example in order to create a bridge between PDU sessions: Causing the at least one PDU session to include, in a UP path thereof, a user plane function which is also included in another UP path of at least one other of the two or more PDU sessions. Causing the at least one PDU session to include, in a first UP path thereof, a first user plane function which is communicatively coupled to a second user plane function, the second user plane function being included in another UP path of another one of the two or more PDU sessions. Causing the at least one PDU session to connect to an application location which is also connected to at least one other of the two or more PDU sessions. Causing the at least one PDU session to connect to a first application location which is communicatively coupled to a second application location, the second application location being connected to another one of the two or more PDU sessions.

The control plane function may select or reselect the user plane function, the first and second user plane functions, the application function, or the first and second application functions, and the instruction may include policy rules to be implemented by the one or more management functions. Alternatively, the instruction may cause the management functions to perform the selection or reselection.

Embodiments of the present invention provide for a network function (or application function) including a processor operatively coupled to memory and a network interface. The network function is configured to transmit a message to a control function, the message indicative of a correlation between two or more PDU sessions and instructing the control function to cause respective UP paths of at least one of the two or more PDU sessions to be selected or reselected according to the correlation. The network function is further configured to receive a response to the message from the control function. In embodiments, the network function is further configured to identify the correlation between two or more PDU sessions before transmitting the message to the control function.

In embodiments, the correlation is identified by the network function, for example as reflecting an existing property of the PDU sessions. As a result of the identified correlation, the network function may instruct or request the control function to adjust the UP paths in a manner that is responsive to the identified correlation. In embodiments, the message includes an indication of whether or not UP paths of the two or more PDU sessions are to be connected through an application location. In embodiments, the message includes an indication of a primary PDU session of the two or more PDU sessions or a primary UE of the two or more PDU sessions.

Embodiments of the present invention provide for a method, by a network function including a processor operatively coupled to memory and a network interface. Referring to FIG. 24, the method 2400 includes transmitting 2420 a message to a control function, the message indicative of a correlation between two or more PDU sessions and instructing the control function to cause respective UP paths of at least one of the two or more PDU sessions to be selected or reselected according to the correlation. The method further includes receiving 2430 a response to the message from the control function. The method may further include identifying 2410 a correlation between two or more PDU sessions before transmitting the message to the control function.

Embodiments of the present invention provide for a session management function (SMF) associated with a core network and managing a first PDU session. The SMF includes or otherwise utilizes a processor operatively coupled to memory and a network interface. The SMF is configured, in response to a trigger from a policy control function (PCF), a user plane function (UPF), or a second SMF, to direct resources (e.g. via configuration of a UPF or other underlying resource) to handle data traffic forming part of a first PDU session and corresponding to a "correlated" traffic flow (such as a peer-to-peer traffic flow), the first PDU session associated with a first user plane managed by the SMF. Handling the data traffic may include detecting the data traffic. The SMF is further configured to direct further resources to handle data traffic forming part of a second PDU session and corresponding to the correlated traffic flow, the second PDU session associated with a second user plane managed by the second SMF. The direction may be direct, e.g. by configuring another UPF, or indirect, e.g. by instructing the second SMF to configure the other UPF. The correlated traffic flow is routed via the first user plane and the second user plane. Indirectly directing the further underlying resources may include transmitting an instruction to the second SMF to cause the second SMF to configure the further underlying resources.

In embodiments, the correlated traffic flow is a peer-to-peer traffic flow. In embodiments, directing the resources or the further resources comprises configuring a user plane function (UPF).

In embodiments, directing the further resources comprises transmitting an instruction to the second SMF to cause the second SMF to configure the further resources. In further embodiments, the instruction is one or more of: add a new user plane function to the second user plane; remove an existing user plane function within the second user plane; move another existing user plane function from the second user plane; and reconfigure traffic steering behaviour of an indicated end point of a bridge connecting user plane function. Additionally or alternatively, the SMF may be further configured to identify the second SMF using a received SMF identifier or address, an indication from the PCF, an indication from a unified data management function.

In embodiments, the SMF is further configured to receive, from the second SMF, information regarding the second PDU session, said information comprising some or all of: identification information for the second PDU session; user plane information for the second PDU session; context information for the second PDU session.

In embodiments, the correlated traffic flows between the first user plane and the second user plane via a bridge comprising one or more of: a pair of communicatively coupled user plane functions (UPFs) each associated with a different respective one of the first PDU session and the second PDU session; a UPF shared by the first PDU session and the second PDU session; a pair of communicatively coupled application locations each associated with a different respective one of the first PDU session and the second PDU session; and a common application location shared by the first PDU session and the second PDU session.

The correlated traffic may flow between the first user plane and the second user plane via a bridge comprising one or more of: a pair of communicatively coupled user plane functions (UPFs) each associated with a different respective one of the first PDU session and the second PDU session; a UPF shared by the first PDU session and the second PDU session; a pair of communicatively coupled application locations each associated with a different respective one of the first PDU session and the second PDU session; and a common application location shared by the first PDU session and the second PDU session.

Embodiments of the present invention provide for a method for operating a session management function (SMF) associated with a core network and managing a first PDU session. The SMF includes or otherwise utilizes a processor operatively coupled to memory and a network interface. Referring to FIG. 25, the method 2500 includes, by the SMF and in response to a trigger 2505 from a policy control function (PCF), a user plane function (UPF), or a second SMF: directing 2510 resources to handle data traffic forming part of a first PDU session and corresponding to a correlated traffic flow, the first PDU session associated with a first user plane managed by the SMF. The method further includes directing 2520 further resources to handle data traffic forming part of a second PDU session and corresponding to the correlated traffic flow, the second PDU session associated with a second user plane managed by the second SMF. The correlated traffic flow is routed via the first user plane and the second user plane.

In some embodiments, a correlation between multiple PDU sessions indicates that the end device of at least one of the PDU sessions is communicating with the end device of at least another one of the PDU sessions. In some embodiments, implementing multiple PDU sessions according to a correlation therebetween includes routing traffic from one PDU session to another via a bridge, which may be a bridge between UPFs. The bridge may be in the core network or between radio access nodes, and may bypass the AF. In some embodiments, implementing multiple PDU sessions according to a correlation therebetween additionally or alternatively includes determining the UP paths of the multiple PDU sessions together, for example so that the UP paths are optimized together. The optimization can be performed to facilitate communication efficiency between different end users of different PDU sessions. The UP paths can be linked or bridged directly or via an application location, for example instantiated in the core network.

According to various embodiments, P2P traffic between a pair of UEs is routed or rerouted through a bridge entity. The P2P traffic flows between a first UE (UE-1) associated with a first user plane (UP) and a second UE (UE-2) associated with a second UP. In the present disclosure, the terms "UP" and "UP path" are used interchangeably. An application server (AS) is operatively coupled to both the first and the second UPs. Rather than the P2P traffic flowing through the AS or through the anchor UPFs of the two UPs, the bridge is established between a component of the first UP and a component of the second UP, and the P2P traffic is detected and routed across the bridge. The bridge may be implemented using traffic handling behaviours of the first and second UPs, including P2P traffic identification and traffic steering. A bridge can also be described as a connection in various embodiments.

The bridge entity can be a bridge communication link over which P2P traffic is routed or a common UPF. In the case of a common UPF, the first and second UP paths share the common UPF, and P2P traffic is routed via the common UPF between UE-1 and UE-2.

According to other embodiments, the bridge may be established between a radio access network (RAN) node lying between one of the UEs and its associated UP and a component of the UP associated with the other UE. According to other embodiments, the bridge may be established between a RAN node lying between the first UE and the first UP, and a RAN node lying between the second UE and the second UP.

Some embodiments of the present invention provide for the direct connection of PDU sessions via bridging. The paths of the connected PDU sessions may be jointly optimized. Some embodiments provide for indirect connection of PDU sessions via one or more application servers. In this case, the application server may be placed or selected along the P2P path. This is performed when the P2P communication requires support of an application server. The paths of the connected PDU sessions and the application server placement or selection can be optimized together. Path optimization can include configuration of P2P paths in the user plane to support traffic steering.

According to various embodiments, there is provided a policy control function (PCF) configured to configure a session management function (or alternatively other underlying resources) to route P2P traffic through a bridge entity. The PCF may operate in response to a trigger or request from an application function (AF) associated with an AS.

According to various embodiments, there is provided a session management function (SMF) configured to configure underlying user plane function resources to establish, configure or reconfigure user plane data paths such that P2P traffic is routed through a bridge entity. A first SMF associated with the first UP, and a second SMF associated with the second UP can cooperate to establish the desired traffic routing. The SMF may operate in response to direction, configuration, instruction, policies, or rules from the PCF. Based on provided policies, the SMF can determine the P2P path and configure associated UPFs to set up the P2P path. The configuration or reconfiguration of UP data paths may include (re)configuring the connection (or tunnels) between UPFs. The SMF may also configure or reconfigure the traffic steering behavior of selected UPFs (e.g. at UL CL, BP, and anchor UPF).

According to various embodiments, there is provided a system comprising plural functions, such as an AF, PCF, SMF, UPF, etc., which are cooperatively configured to route P2P traffic through a bridge entity. Each of the functions can operate as described above or elsewhere herein. The PCF may interact with one or more SMFs as described elsewhere herein to update policies in support of P2P bridge configuration. Multiple SMFs, such as a source SMF and a target SMF, may interact as described elsewhere herein to cooperatively configure a P2P bridge.

Various embodiments of the present invention thus provide for a mechanism that correlates two PDU sessions for handling P2P traffic. An AF request for P2P traffic handling (which may cause two PDU sessions to be correlated for P2P path establishment between their user planes) can be issued. One or more UPFs can be configured for supporting P2P traffic detection, for example based on the AF request. In some embodiments, the configuration is performed (or directed) by an SMF. The UPF configuration may cause the UPF to detect P2P traffic of interest (according to the P2P traffic detection configuration) and notify an associated SMF. One or more SMFs are configured to determine and configure P2P paths, for example in response to a notification from an associated UPF. If both PDU sessions are served by the same SMF, then only one SMF is involved; if they are served by two different SMFs, then two SMFs may be involved. The P2P paths involve a bridging connection between two UPs for supporting P2P traffic forwarding. According to various embodiments, methods associated with operation of the above components, individually or in combination, are provided.

In some embodiments, the SMF that manages the PDU session configures a UPF (for the UP path of the same PDU session) to perform P2P traffic detection. The UPF may be an anchor UPF, a UL classifier (UL CL), or a BP (branching point), for example. The UPF, operating according to the configuration, detects P2P traffic and notifies the SMF.

In accordance with embodiments of the present invention, there is provided a policy control function (PCF) associated with a core network, the PCF utilizing a processor operatively coupled to memory and a network interface and configured to: in response to a request from an application function (AF) or another entity, communicate with one or more session management functions (SMFs) to configure traffic handling policies thereof, wherein the request pertains to at least a first PDU session and a second PDU session, the first and second PDU sessions handling a common peer-to-peer (P2P) traffic flow, the first PDU session corresponding to PDU traffic in a first portion of the core and a first radio access network portion, the second PDU session corresponding to PDU traffic in a second portion of the core and a second radio access network portion, and wherein, upon said configuration, the traffic handling policies configure underlying resources to cause the common peer-to-peer traffic flow to traverse a bridge between: the first portion of the core or the first radio access network portion; and the second portion of the core or the second radio access network portion. The request from the AF may be relayed via an NEF. In the relayed request, the NEF may translate or map the information in the request to information that the PCF can use directly. The traffic handling policies may be provided to the one or more SMFs that are managing at least one of the two PDU sessions, which configure the UPF(s) in the UPs of the two PDU sessions to cause the P2P traffic to traverse a bridge entity. The bridge entity may be a bridge link defined between end UPFs for each of the UPs, or a bridge UPF shared by the UPs.

In some such embodiments, the one or more SMFs comprise a first SMF for managing the first PDU session, and a second SMF for managing the second PDU session. In some embodiments, the first PDU session is associated with a first user plane and the second PDU session is associated with a second user plane. In some embodiments, the AF is associated with an application server, the traffic handling policies cause the common peer-to-peer traffic flow to bypass the application server, and control messages associated with the common peer-to-peer traffic flow are routed toward the application server. The PCF may be further configured to notify the AF upon implementation of the traffic handling policies.

In accordance with embodiments of the present invention, there is provided a method for operating a PCF in the manner described above.

In accordance with embodiments of the present invention, there is provided a session management function (SMF) associated with a core network and managing a first PDU session, the SMF utilizing a processor operatively coupled to memory and a network interface and configured to: in response to a traffic handling policy change or a trigger from a policy control function (PCF), a user plane function (UPF) or another entity (e.g. NEF), configure a UPF (or other underlying resources) to detect and handle data traffic forming part of the first PDU session and corresponding to a specified peer-to-peer traffic flow in a specified manner, wherein the peer-to-peer traffic flow traverses at least a UP of the first PDU session and a UP of a second PDU session, the first PDU session corresponding to PDU traffic in a first portion of the core and a first radio access network portion (a first UP path), the second PDU session corresponding to PDU traffic in a second portion of the core and a second radio access network portion (a second UP path), wherein the specified manner causes the peer-to-peer traffic flow to traverse a bridge between: the first portion of the core or the first radio access network portion; and the second portion of the core or the second radio access network portion.

In some such embodiments, a second SMF is associated with the core manages the second PDU session, and the SMF is further configured to cooperate with the second SMF to cause the peer-to-peer traffic to flow in the specified manner. The SMF and the second SMF may cooperate to determine a path for the peer-to-peer traffic, the path including the bridge. In some embodiments, the SMF is further configured to receive, from the PCF an indication of a determined path for the peer-to-peer traffic, the path including the bridge, and wherein the specified manner causes the peer-to-peer traffic to traverse the path. In some embodiments, the underlying resources include one or more user plane functions. In some embodiments, the SMF is further configured to notify the PCF upon directing the underlying resources to detect and handle data traffic in the specified manner. In some embodiments, the SMF is further configured to notify an application function (AF) upon directing the underlying resources to detect and handle data traffic in the specified manner, wherein the AF is associated with an application server being bypassed by the peer-to-peer traffic flow due to traversal of the bridge, and wherein control messages associated with the peer-to-peer traffic flow are routed toward the application server.

In accordance with embodiments of the present invention, there is provided a method for operating a SMF in the manner described above.

In accordance with embodiments of the present invention, there is provided a user plane function (UPF) associated with a core network and with a first PDU session, the UPF utilizing a processor operatively coupled to memory and a network interface and configured to: monitor for data traffic, within the first PDU session, associated with a peer-to-peer traffic flow handled by the first PDU session and at least a second PDU session, the first PDU session corresponding to PDU traffic in a first portion of the core and a first radio access network portion, the second PDU session corresponding to PDU traffic in a second portion of the core and a second radio access network portion; and in response to detection of said data traffic associated with the peer-to-peer traffic flow, communicate with one or more session management functions (SMFs) to trigger a configuration or reconfiguration of traffic handling policies thereof, wherein, upon said configuration or reconfiguration, the traffic handling policies direct a UPF (or other underlying resources) to cause the common peer-to-peer traffic flow to traverse a bridge between: the first portion of the core or the first radio access network portion; and the second portion of the core or the second radio access network portion. In some embodiments, the one or more SMFs are the SMFs serving the PDU sessions or one of the SMFs serving the PDU sessions.

In some such embodiments, the UPF is configured to receive configuration instructions from an application function (AF), the configuration instructions specifying characteristics of the peer-to-peer traffic flow and causing the UPF to monitor for the peer-to-peer traffic flow based on said specified characteristics. In some embodiments, at least one of the SMFs or the PCF is configured to notify the AF of said configuration or reconfiguration, the AF is associated with an application server being bypassed by the peer-to-peer traffic flow due to traversal of the bridge, and control messages associated with the peer-to-peer traffic flow are routed toward the application server.

In accordance with embodiments of the present invention, there is provided a method for operating a UPF in the manner described above.

Embodiments of the present invention relate to configuration and operation of the SMF. Furthermore, some such embodiments relate to relocation of the SMF, in which the serving SMF role for a PDU Session is relocated from a source SMF to a target SMF. Embodiments of the present invention relate to configuration and operation of the PCF. Furthermore, some such embodiments relate to relocation of the PCF, in which the serving PCF role for a PDU Session is relocated from a source PCF to a target PCF. Before the relocation, the source SMF (or PCF) is the serving SMF (or PCF) of the PDU Session; after the relocation, the target SMF (or PCF) is the serving SMF (or PCF) of the PDU Session.

According to embodiments of the present invention, there is provided a policy control function (PCF) associated with a core network. The PCF utilizes a processor operatively coupled to memory and a network interface. The PCF is configured, in response to a request from an application function (AF) or another entity, to communicate with one or more session management functions (SMFs) to configure traffic handling policies thereof. The request pertains to at least a first PDU session and a second PDU session, the first and second PDU sessions handling a common peer-to-peer (P2P) traffic flow, the first PDU session corresponding to PDU traffic in a first portion of the core and a first radio access network portion, the second PDU session corresponding to PDU traffic in a second portion of the core and a second radio access network portion. Upon said configuration, the traffic handling policies configure underlying resources to cause the common peer-to-peer traffic flow to traverse a bridge, the bridge comprising one or more of application functions or application servers supporting the P2P traffic flow.

In some such embodiments, the PCF is further configured to jointly optimize a traffic flow path for the first PDU session, the second PDU session, and locations of said one or more of application functions or application servers. In some embodiments, configuration of traffic handling policies comprises: directing a first underlying resource to configure the traffic handling policies for the first PDU session; directing a second underlying resource to configure the traffic handling policies for the second PDU session; monitoring for confirmation from the first underlying resource and the second underlying resource that the traffic handling policies have been configured; and directing the traffic handling policies for the first PDU session and the second PDU session to be implemented concurrently after receipt of said confirmation.

According to embodiments of the present invention, there is provided an application function configured to send a message indicative of whether user plane (UP) paths of two or more PDU sessions are to be jointly selected or reselected. In some such embodiments, selection or reselection of one or both of: a user plane function (UPF); and a selected or reselected application location, is performed based on the joint selection or reselection, and wherein at least one of said UPF and said application location is shared by the UP paths. In some embodiments, the application function is configured to transmit an indication of whether or not UP paths of the two or more sessions are to be connected through an application location. In some embodiments, the application function is configured to transmit a request carrying one or both of: said message indicative of whether user plane (UP) paths of two or more PDU sessions are to be jointly selected or reselected; and indication of whether or not UP paths of the two or more sessions are to be connected through an application location. In some embodiments, the request further comprises information indicating a primary PDU session of the two or more PDU sessions or a primary UE of the two or more peer PDU sessions.

According to embodiments of the present invention, there is provided a policy control function (PCF) configured to: receive a message indicative of whether user plane (UP) paths of two or more PDU sessions are to be jointly selected or reselected; and transmit an instruction to a session management function (SMF) indicative that the user plane (UP) paths of two or more PDU sessions are to be jointly selected or reselected. In some such embodiments the PCF is further configured to receive an indication of whether or not UP paths of the two or more sessions are to be connected through an application location. In some embodiments, the PCF further configured to receive a request carrying one or both of: said message indicative of whether user plane (UP) paths of two or more PDU sessions are to be jointly selected or reselected; and indication of whether or not UP paths of the two or more sessions are to be connected through an application location.

According to embodiments of the present invention, there is provided a session management function (SMF) configured to: receive an instruction from a policy control function (PCF), the instruction indicative that user plane (UP) paths of two or more designated PDU sessions are to be jointly selected or reselected; and to jointly select or reselect the UP paths of the two or more designated PDU sessions based on the instruction.

According to embodiments of the present invention, there is provided a policy control function (PCF) configured to: receive, from an application function (AF), a message indicative that user plane (UP) paths of two or more PDU sessions are to be jointly selected or reselected; and selecting or reselecting one or both of: user plane functions (UPFs); and application locations, for use in connecting said UP paths of said two or more PDU sessions. In some such embodiments, the PCF is further configured to perform said selecting or reselecting in response to a trigger. In some embodiments, the trigger is received from a session management function (SMF) or an access and mobility management function (AMF). In some embodiments, the PCF is further configured to receive an indication that the UP paths of the two or more PDU sessions are to be connected through an application location. In some embodiments, the PCF is further configured, after said selecting or reselecting, to notify a session management function (SMF) of the selected or reselected UPFs or application locations. In some embodiments, the PCF is further configured to receive a message from a session management function (SMF) indicating that a connection relating to one of the UP paths is ready, and confirming with the SMF that the connection is established once connections relating to all the two or more PDU sessions are ready.

According to embodiments of the present invention, there is provided a session management function (SMF) configured to: receive an instruction from a policy control function (PCF), the instruction indicative of one or both of: a selected or reselected user plane function (UPF); and an application location, and selecting or reselecting a UP path of a PDU session based on the received instruction. In some embodiments, the selected or reselected UP path includes one or both of the selected or reselected UPF and the application location. In some embodiments, the SMF is further configured to send a message indicating that a connection relating to the UP path is ready.

Embodiments of the present invention provide for methods of operating PCF, AF, UPF, SMF, or a combination thereof, according to the above description.

BRIEF DESCRIPTION OF THE FIGURES

Further features and advantages of the present invention will become apparent from the following detailed description, taken in combination with the appended drawings, in which:

FIG. 12B is a continuation of the call flow beginning in FIG. 12A.

It will be noted that throughout the appended drawings, like features are identified by like reference numerals.

DETAILED DESCRIPTION

Figure 1:
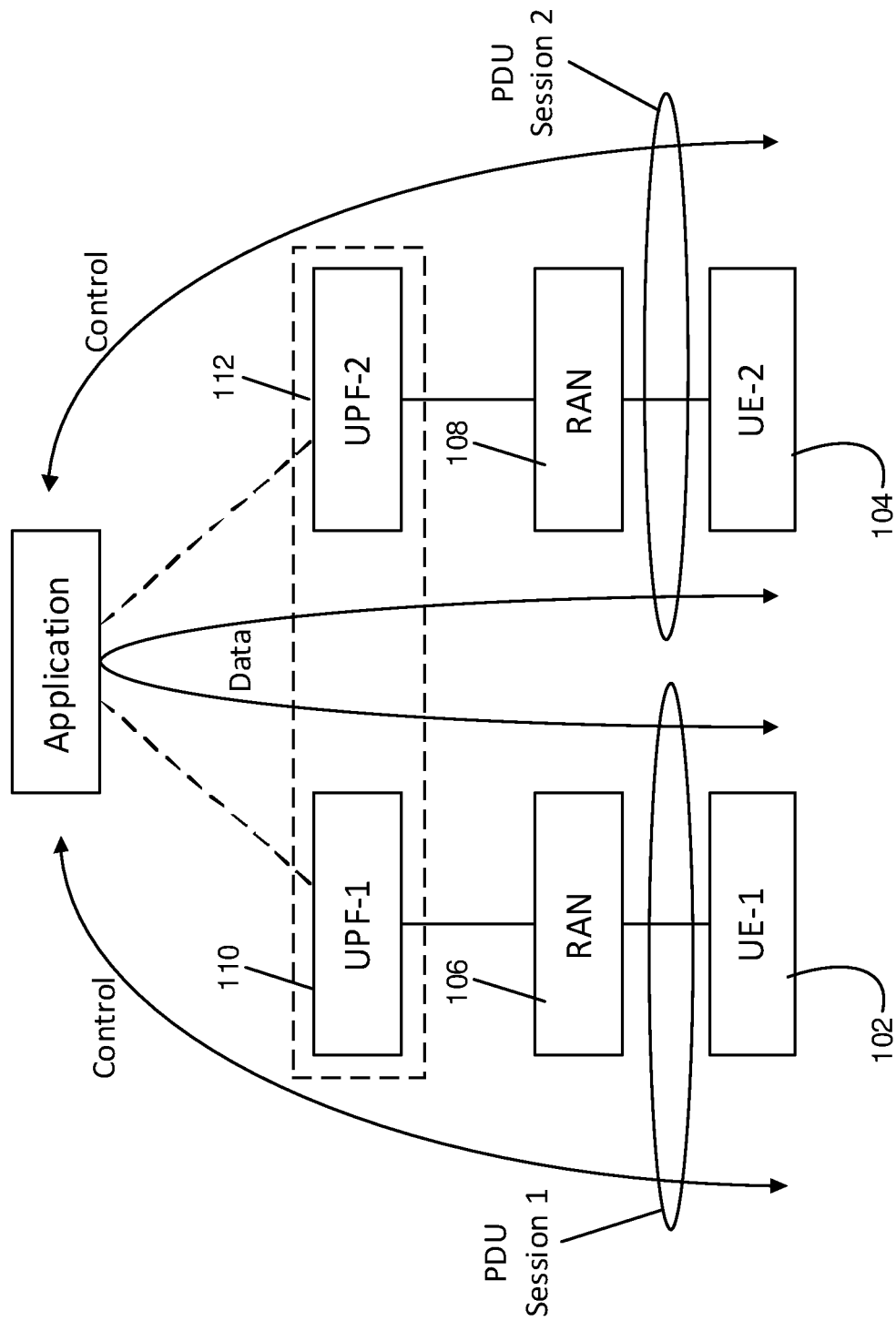
FIG. 1 illustrates initial P2P traffic flow prior to bridging, according an embodiment of the present invention.

Embodiments of the present invention provide for a method and apparatus for application function influenced traffic routing for peer-to-peer (P2P) communications in such a network. The P2P traffic can be routed across a bridge between a user plane or associated RAN of a first peer and a user plane or associated RAN of a second peer, thereby shortening the P2P traffic path relative to a default case, such as where the P2P traffic is routed through a common application server, or where an IP or Ethernet PDU is routed by an anchor UPF locally toward an anchor UPF of a PDU session of a target peer. In some embodiments, two or more anchor UPFs may be replaced by a single anchor UPF acting for multiple sessions. The method and apparatus can involve operation of one or a plurality of functions of the communication network, such as functions in the core network of a 5G network. Such functions can include, for example, one or more policy control functions (PCFs), one or more session management functions (SMFs) associated with one or more PDU sessions, and one or more user plane functions (UPFs) associated with the PDU sessions. Application functions (AFs) associated with the application server (AS) can also be involved, as can other functions such as but not necessarily limited to a network exposure function (NEF), a unified data management function (UDM), and a unified data repository function (UDR).

Embodiments of the present invention are described with respect to the following scenario. However, it should be appreciated that the invention may be applicable to other scenarios. In the basic illustrative scenario, there are two ongoing PDU sessions, namely PDU session 1 and PDU session 2. PDU session 1 is established via a first user plane labelled UP-1. PDU session 1 may be established to facilitate access to a data network (DN) via UP-1 by a first UE, labelled UE-1. PDU session 2 is established via a second user plane labelled UP-2. PDU session 2 may be established to facilitate access to the data network (DN) via UP-2 by a second UE, labelled UE-2. Conventionally, P2P application traffic between UE-1 and the UE-2 is forwarded between the two PDU sessions by an application server (AS) residing in the DN. As another example, P2P application traffic may be forwarded between anchor UPFs of two UPs (or by a shared anchor UPF common to the two UPs) based on local routing intelligence, in the case of IP or Ethernet traffic. According to some embodiments, P2P application traffic may initially be forwarded via the AS in this manner prior to establishing a bridge, and the P2P application traffic may bypass the AS after establishing the bridge. In other embodiments, the bridge may be formed prior to flow of the P2P application traffic.

Without loss of generality, UP-1 can in some cases be referred to as the source UP, while UP-2 can in some cases be referred to as the target UP. This may be illustrative in a scenario in which UE-1 transmits data in the uplink direction and UE-2 receives data in the downlink direction. However, it should be noted that P2P traffic can be bidirectional and different UPs can more generally be considered as correlated peer UPs.

In various embodiments, an indication is provided, for example in a message, e.g. AF request, sent to an entity in the core network (5 GC) (e.g. a PCF entity) from an AF, that two or more PDU sessions are to be correlated. The PDU sessions may be identified in the message (e.g. AF request) for example using identifiers of the sessions, identifiers (e.g. GPSI or IP address) of associated UEs, an identifier of a group of UEs, descriptions (e.g. IP 5 tuple (source address, source port, destination address, destination port, QoS marker), or an identifier of traffic filter for traffic detection, identifier of application, identifier of traffic associated to the PDU Session, or other relevant information (such as DNN, S-NSSAI). The indication may further indicate the purpose of the correlation, e.g. to support anycasting among the correlated PDU Sessions or to support multicasting among the correlated PDU Session. In response, paths for the correlated PDU sessions may be jointly optimized, along with the location of one or multiple intermediating application servers (or applications), if appropriate. This may occur along with bridging, where the bridging may or may not involve one or more application servers (or application locations). In some embodiments, correlation may be performed in support of multicasting or anycasting, with respect to the purpose of correlation indicated by the AF. That is, when a group of UEs is established which requires one member to be able to multicast or anycast to other members, then the PDU sessions for the group of UEs may be correlated.

In various embodiments, information indicative of PDU Session correlation (a.k.a. PDU Session correlation information) is provided, for example in a message, e.g. AF request, sent to an entity in the core network (5 GC) (e.g. a PCF entity) from an AF, that indicates two or more PDU sessions are to be correlated or are already correlated. This information may be or include an indication as described above. The indication may be in the form of a single bit (e.g. 0 indicating the sessions are correlated or not correlated; 1 means the opposite to meaning of 0) or a bit string (e.g. a particular combination of bits indicating sessions are correlated or not correlated).

In various embodiments, this information may include or be associated with information of requirement(s) on UP path (re)selection for PDU Sessions identified or indicated as correlated in the message. The information of requirement(s) on UP path (re)selection for correlated PDU Sessions may indicate how the UP paths of the PDU Sessions should or are expected to connect to each other as a result of UP path (re)selection, e.g. via a common UPF (i.e. the same UPF is included/shared in the UP paths of correlated PDU Sessions) or via a common application location (i.e. the UP paths of correlated PDU Sessions connect to the same application location). The information of requirement(s) on UP path (re)selection for correlated PDU Sessions is indicated or included in the message sent to the entity in the core network from the AF. The information may be, for example, equivalent to or in the form of the bridging requirement information described below, or equivalent to or in the form the type of bridge to be used (e.g. UPF-based bridge, application-location-based bridge) described elsewhere herein.

In various embodiments, the information of requirement(s) on UP path (re)selection for correlated PDU Sessions may be provided or indicated implicitly, for example, in the form of a combination of purpose of correlation (e.g. indicating to support what type of traffic, such as multicast or broadcast traffic, among correlated PDU Sessions) and potential application locations (e.g. in the form of DNAIs). For example, if the purpose of correlation indicates support of multicast/broadcast traffic and potential application locations are absent or not provided, it can be considered that the UP paths of correlated PDU Sessions should or are expected to connect via a common UPF. If the purpose of correlation indicates support of multicast/broadcast traffic and potential application locations are present or provided, it can be considered that the UP paths of correlated PDU Sessions should or are expected to connect via a common application location selected from the potential application locations.

In various embodiments, the message, e.g. AF request, sent to an entity in the core network (5 GC) (e.g. PCF) from an AF indicates bridging requirement information for the purpose of P2P traffic steering or P2P UP path optimization between correlated PDU Sessions (e.g. a source PDU Session and a target PDU Session). A bridge between two PDU Session connects the UPs of the two PDU Sessions. The bridging requirement information may indicate whether the bridge(s) between correlated PDU Sessions needs to pass through location(s) of one or more associated application servers or applications. When the bridge(s) do not need to pass through such location(s), the bridge(s) connect(s) the UP paths of the PDU Sessions directly, via a common UPF or links between UPFs. When the bridge is to pass through the application server, the bridging requirements may include information indicative of an interconnection between application servers (or application locations), such as cost and connectivity quality (e.g. delay, throughput) information and information of the weight of each application server (or application location).

FIG. 1 illustrates the initial flow of P2P application traffic prior to bridging, according to an example embodiment of the present invention. Both control messages 130 and data messages 135 between UE-1 102 and UE-2 104 pass through the AS 120 (or alternatively through the link between the anchor UPFs or the shared anchor UPF of the two UPs). UPF-1 110 and UPF-2 112 denote one or more functions of UP-1 and UP-2, respectively. UE-1 and UE-2 access the network via wireless communication, using the illustrated RAN entities 106, 108.

Figure 2:
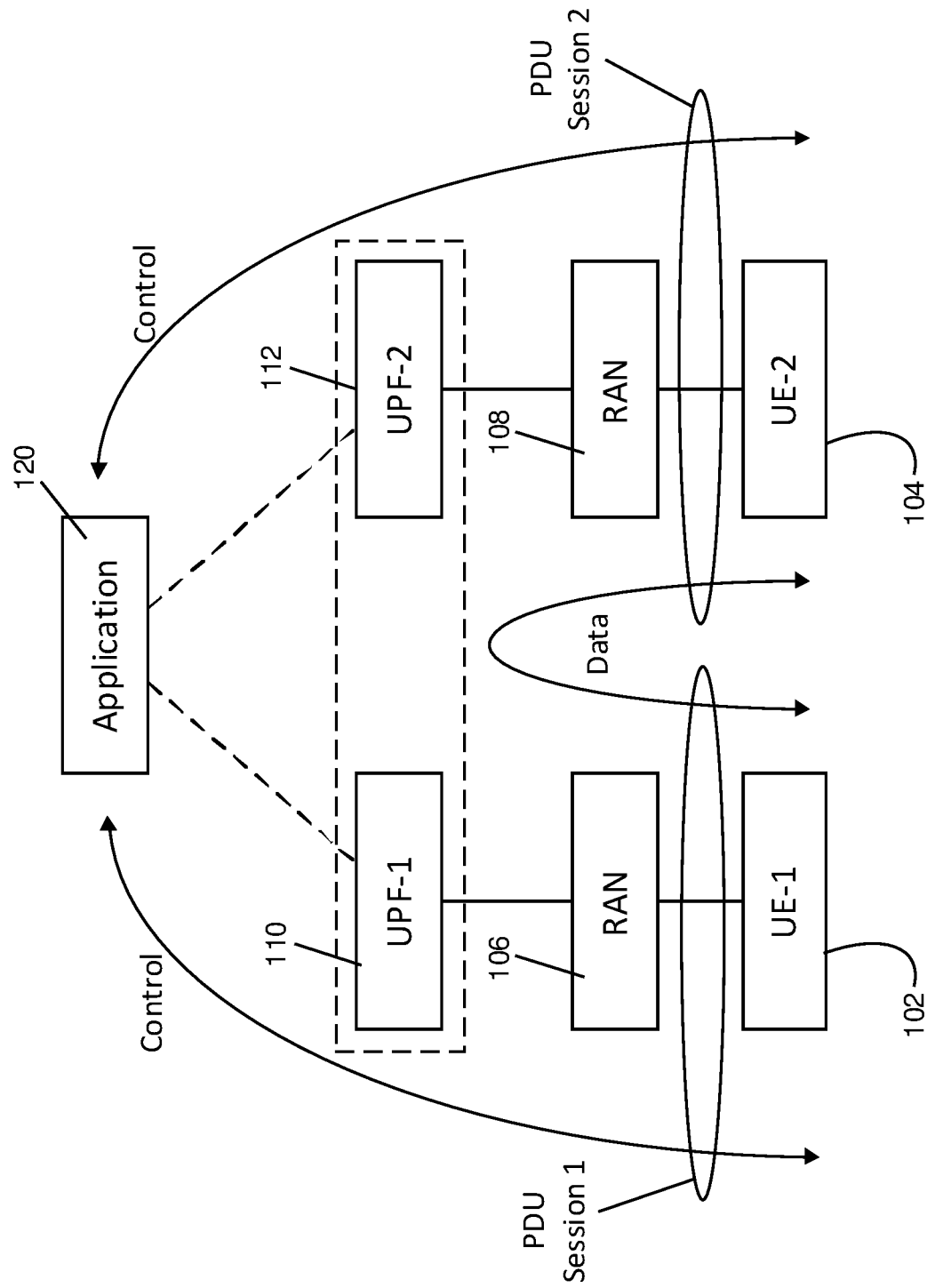
FIG. 2 illustrates P2P traffic flow after bridging, according an embodiment of the present invention.

FIG. 2 illustrates the flow of P2P application traffic after bridging, according to a related example embodiment of the present invention. Control messages 130 between UE-1 102 and UE-2 104 continue to pass through the AS 120 (in the present example). However, data messages 135 between UE-1 102 and UE-2 104 now traverse a bridge between UPF-1 110 and UPF-2 112. As such, data messaging is handled via a shortcut between the two UPs, for example lying within the core network (e.g. 5 GC) user plane. It is also noted that, in some embodiments, UPF-1 110 and UPF-2 112 may be merged into a common entity in both FIG. 1 and FIG. 2. Other configurations for the bridge, such as between the two RAN entities 106, 108, or between one RAN entity and UPF-1 110 or UPF-2 112, may also be implemented.

Figure 3:
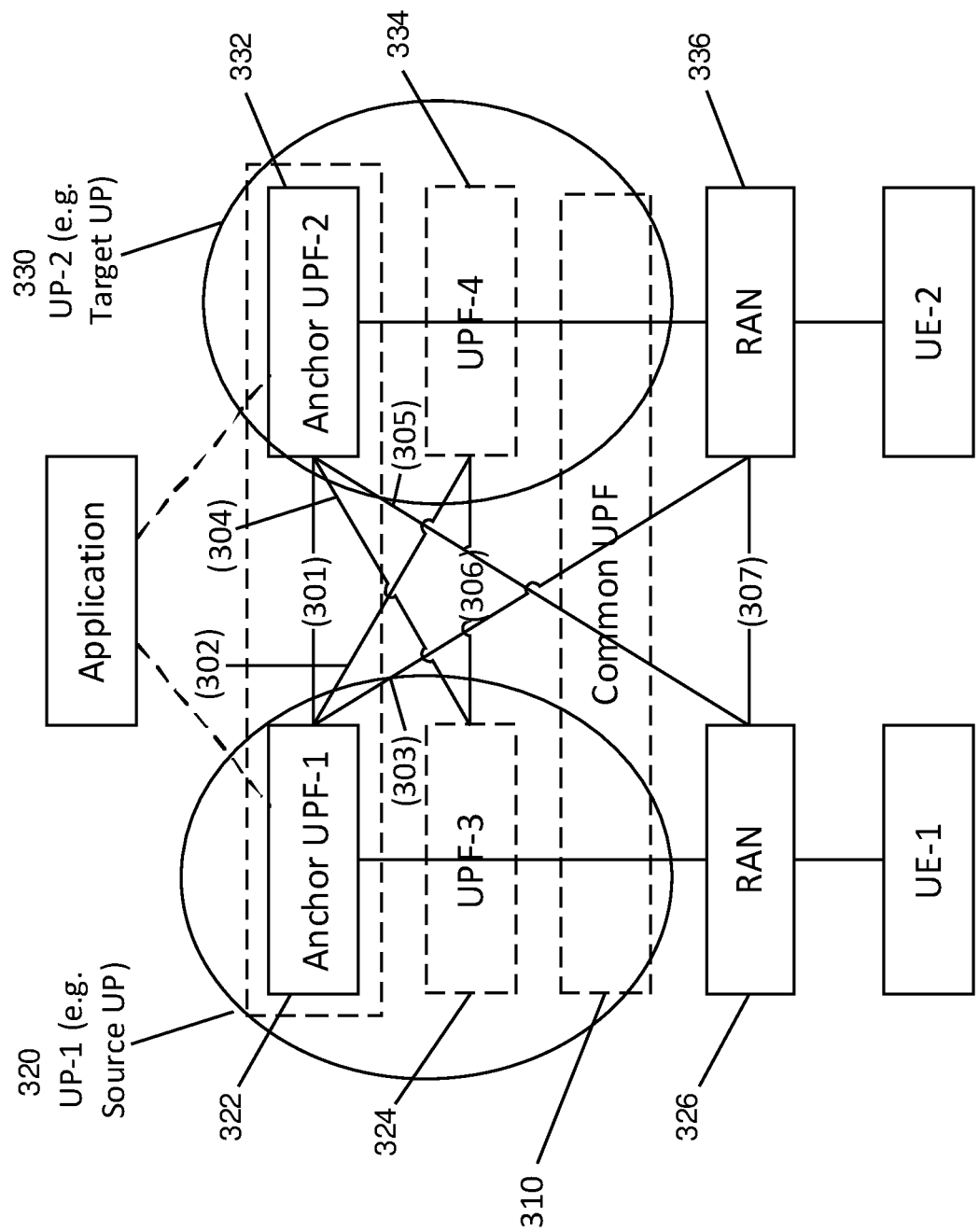
FIG. 3 illustrates different bridging configurations for P2P traffic flow, according various embodiments of the present invention.

FIG. 3 illustrates different bridge configurations according to various embodiments of the present invention. UP-1 320 includes at least an anchor UPF, referred to as UPF-1 322, and another UPF, referred to as UPF-3 324. UP-2 330 includes at least an anchor UPF, referred to as UPF-2 332, and another UPF, referred to as UPF-4 334. An anchor UPF may be a PDU session anchor of the user plane of the PDU session. UPF-3 324 and UPF-4 334 may be inserted into their host UPs as a result of AF influence. For example, UPF-3 324 and UPF-4 334 may be instantiated as part of UP configuration operations according to embodiments of the present invention. In other embodiments, one or both of UPF-3 324 and UPF-4 334 may be omitted. Furthermore, additional UPFs (not shown) may be included in one or both of UP-1 320 and UP-2 330.

Different embodiments of the present invention may use different ones of the illustrated bridge configurations. Some embodiments may use multiple ones of the illustrated bridge configurations, either concurrently or sequentially. Each bridge corresponds to a unidirectional or bidirectional communication link between UP-1 or a RAN associated therewith and UP-2 or a RAN associated therewith.

Having reference now to FIG. 3, a first bridge (301) is located between UPF-1 322 and UPF-2 332. Using this bridge, traffic (i.e. select P2P traffic) is steered between the anchor UPFs of the two PDU sessions. This may be enabled by TNL for IP or Ethernet PDUs, for example. For unstructured PDUs, this is enabled by the present application. A second bridge (302) is located between UPF-1 322 and UPF-4 334. Using this bridge, traffic is steered from UPF-1 322 to UPF-4 334. UPF-4 334 may be a Branching Point (BP) or a UL CL within UP-2 330. A third bridge (303) is located between UPF-1 322 and the RAN 336 associated with UP-2 330. Using this bridge, traffic is steered from UPF-1 322 to a node of this RAN 336. This may correspond to a scenario in which UPF-1 322 is reselected as the anchor UPF of the PDU session for UP-2 330 (e.g. target session). A fourth bridge (304) located between UPF-3 324 and UPF-2 332. Using this bridge, traffic is steered from UPF-3 324 to UPF-2 332. UPF-3 324 may be an UL Classifier (UL CL) or a BP within UP-1 320 (e.g. the source UP associated with a corresponding PDU session).

A fifth bridge (305) is located between UPF-2 332 and the RAN 326 associated with UP-1 320. Using this bridge, traffic is steered from a node of this RAN 326 to UPF-2 332. This may correspond to a scenario in which UPF-2 332 is reselected as the anchor UPF of the PDU session for UP-1 320 (e.g. source session). A sixth bridge (306) is located between UPF-3 324 and UPF-4 334. Using this bridge, traffic is steered from UPF-3 324 (e.g. an UL CL) to UPF-4 334 (e.g. a BP). One or both of UPF-3 324 and UPF-4 334 may be instantiated in response to AF influence. For example, the AF may trigger UPF-3 324 and UPF-4 334 instantiation due to the request for P2P traffic steering. A seventh bridge (307) is located between the two RANs 326, 336 associated with UP-1 and UP-2, respectively. Using this bridge, traffic is steered between nodes of the two RANs 326, 336, without entering the core network.

Alternatively to a bridge formed as a data link, a common UPF (310) (also referred to as a bridge UPF) may be used to form the bridge. The common UPF (310) is shared between both UP-1 320 and UP-2 330. The common UPF receives P2P traffic in the uplink direction at UP-1 and forwards the P2P traffic in the downlink direction to UP-2. Although the common UPF (310) is shown separately, it may be provided as a combination of UPF-3 324 and UPF-4 334, or possibly as a combined replacement for anchor UPF-1 322 and anchor UPF-2 332. It is noted that the third (303) and fifth (305) bridges also employ a common UPF due to anchor UPF re-selection.

The bridges illustrated in FIG. 3 can be traversed by peer-to-peer traffic flow, and can generally be described as bridges between a first portion of the core or the first radio access network portion and a second portion of the core or the second radio access network portion.

For the first to sixth bridges 301, 302, 303, 304, 305, 306 illustrated in FIG. 3, N6 or N9 tunnels may be created. For the third and fifth UPF-to-RAN bridges 303, 305, as well as the common UPF 310 case, the bridge may be created on the involved UPF, i.e. UPF-1 322 or UPF-2 324.

In various embodiments, PDU session 1 is managed by a first session management function, referred to as SMF-1, and PDU session 2 is managed by a second session management function, referred to as SMF-2. In some embodiments, SMF-1 and SMF-2 are separate entities. In other embodiments, SMF-1 and SMF-2 are integrated together or provided as a single entity. For example, the same SMF may be selected by the network to serve both PDU sessions. Although the two SMFs are illustrated separately for clarity, it should be understood that, when integrated together, the interaction and message passing between the two SMFs, as set forth in various embodiments below, may either occur in a different, internal manner, or may be omitted entirely when it is unnecessary.

In various embodiments, the AF indicates session information for at least two peer sessions (e.g. source and target PDU session) to elements of the core network (e.g. 5 GC). This is applicable to the scenario in which P2P traffic is to be detected and routed between the at least two peer sessions via a bridge as described above. One or both of the PDU sessions may be an ongoing (pre-existing) session or a future (e.g. anticipated) PDU session. One or both of the PDU sessions may be a single-UE PDU session or a multi-UE (group) PDU session. As such, embodiments of the present invention are applicable to unicast, multicast, or broadcast P2P traffic, for example defined based on UE grouping or geographic area. It is noted that more than two PDU sessions can be involved in the P2P communication and indicated by the AF and that embodiments of the present invention may be applied to those more than two PDU sessions in a pair-wise manner.

In addition, the AF may provide traffic filtering information (e.g. filter parameters) indicative of a desired portion of the UL traffic, such as UL traffic associated to the source PDU session.

Based on the information provided by the AF, elements of the core network are configured to correlate the multiple (e.g. two) PDU sessions such that a specified portion of uplink traffic from one of the PDU sessions is routed via a bridge (e.g. directly, bypassing the AS), to the UP of another one of the PDU sessions, where it is handled as downlink traffic. The specified portion of traffic may be defined and detected using an appropriately implemented traffic filter configured based on the traffic filtering information.

In some embodiments, the PCF makes the correlation decision and generates session correlation policy. In some embodiments, SMFs of one or more of the PDU sessions (e.g. the source SMF, the target SMF, or a combination thereof) obtains the session correlation policy. SMFs may obtain the session correlation policy for example by transmitting a request to the PCF during session establishment or upon receipt and processing of a policy update notification.

In some embodiments, when the configured elements of the core network detect traffic of the source PDU session matching the traffic filter parameters specified by the AF, these elements may trigger the establishment of the target PDU session, if the target PDU session does not exist. In example implementations enabling this, the UPF of the source PDU session in FIG. 2 detects the traffic matching the filter parameters and notifies the source SMF upon such detection. In some embodiments, the source SMF notifies the AF, which then triggers the target PDU session establishment. In some embodiments, the source SMF notifies the PCF, which then triggers target PDU session establishment. In some embodiments, the source SMF triggers the target PDU session establishment directly. During the establishment of target PDU session, the PCF may enforce the source SMF to be selected for the PDU session.

Embodiments of the present invention involve determining a desired efficient path for the P2P traffic. The determination may comprise selecting one of the bridges illustrated in FIG. 3, for example. The bridge entity is used to steer the P2P traffic from a selected UPF in the UP of the source PDU session (or associated RAN node) to a selected UPF in the UP of the target PDU session (or associated RAN node). Determining and implementing the path may additionally or alternatively include configuring and adding one or more UPFs into UPs of one or both of the source and target PDU sessions. Determining and implementing the path may additionally or alternatively include reselecting a UPF into the UPF of one or both of the source and target PDU sessions.

Determining the desired efficient path for the P2P traffic can be performed by one or a combination of entities in the core network, for example as described below. This operation corresponds to the step of "determine P2P path" as illustrated in various figures disclosed herein.

In some embodiments, the PCF determines the P2P path. The PCF may interact with the involved SMFs to obtain the UP path structure, which can be used in the path determination decision. The involved SMFs manage the peer PDU sessions for the P2P path. The interaction with the SMF may be direct or via a third network function, such as a storage function in which the SMFs store up-to-date UP path information. The storage function can be a UDSF (Unstructured Data Storage Function), UDM (Unified Data Management function), or UDR (Unified Data Repository), for example. The PCF may then provide relevant information from the decision to the involved SMFs, such as those managing the source and target PDU sessions. This information may include the full determined P2P path or relevant parts thereof (e.g. the parts related to respective the UPs of the PDU sessions managed by the SMFs), or configuration instructions for implementing the determined P2P path. The involved SMFs accordingly configure or reconfigure the UPs of the PDU sessions managed thereby. In this case, the SMF-based P2P path establishment procedure (as illustrated for example in FIG. 5) can be omitted. It is noted that this approach, with the PCF determining the P2P path, can be applied to various scenarios such as the three scenarios described elsewhere herein.

In some embodiments, the policy contains information indicative of the involved (e.g. source and target) PDU sessions and the SMF is configured to determine the (e.g. direct) UP path between the involved PDU sessions. The determination by the SMF may be based on at least the received policy information.

In some embodiments, multiple involved SMFs (e.g. source SMF and target SMF) interact via messaging to negotiate the path. Implementing the negotiated path may comprise adding, removing, or both adding and removing, one or more UPFs. Added or removed UPFs may belong to the source UP path, target UP path, or both. The addition and removal may be performed as part of implementing an efficient direct path, including a bridge portion of the path. The interaction may be initiated by one of the involved SMFs, such as the source SMF or target SMF. The interaction may involve exchanges, sharing, or exposure, between the involved SMFs, of the UP path structures of the involved PDU sessions. The interaction may be direct or mediated by a third network function, such as a storage function in which the SMFs store up-to-date UP path information. The storage function can be a UDSF, UDM, or UDR, for example. In some embodiments, each of the involved SMFs may make the same UP path decision independently. In some embodiments, one of the involved SMFs makes the UP path decision and informs another involved SMF of that decision. In some embodiments, each of the involved SMFs makes UP path decisions regarding their own PDU session, and exchanges information (e.g. any of address, port number, an ID) regarding only the UPF that is to connect to the UP of another PDU session.

In some embodiments, the PCF may provide policy information to one of the SMFs, thereby triggering the SMF to hand over the corresponding PDU session to the other SMF. Upon handover, both PDU sessions are managed, at least temporarily, by the same SMF. This managing SMF may then perform the UP path decision operations.

It is noted that the UP configuration or reconfiguration, of the involved PDU sessions, is performed by one or more SMFs associated with these PDU sessions. This configuration can include some or all of UPF addition, UPF removal, UPF reselection, and traffic steering configuration or reconfiguration.

Figure 4:
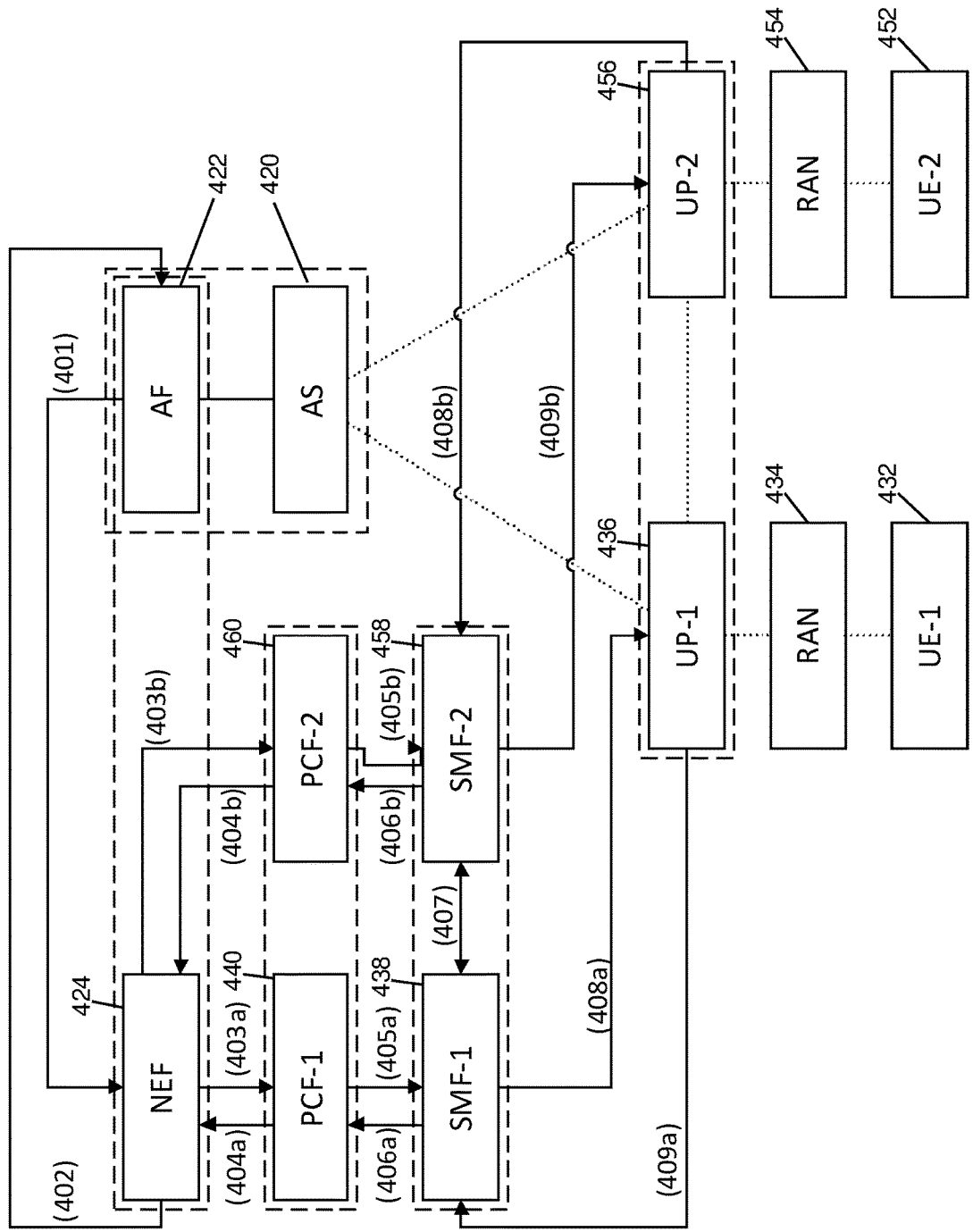
FIG. 4 illustrates a high-level call flow involving operation of core network functions during implementation of embodiments of the present invention.

FIG. 4 illustrates a high-level call flow involving operation of core network functions during implementation of embodiments of the present invention. As with FIG. 3, an application server (AS) 420 is connected to both a first UP (UP-1) 436 and a second UP (UP-2) 456. A first UE (UE-1) 432 and a second UE (UE-2) 452 are coupled to UP-1 436 and UP-2 456, respectively, via associated RAN infrastructures 434, 454. By way of example, UE-1 432 can be regarded as a source of P2P traffic and UE-2 452 can be regarded as a destination for the P2P traffic, although it is noted that such traffic can be bidirectional. An application function (AF) 422 is associated with the AS 420, and may be integrated with the AS. That is, AF 422 and AS 420 may be the same entity. A network exposure function (NEF) 424 is provided as an intermediary between the AF 422 and functions of the core network, such as the PCF functions 440, 460. In some embodiments, the NEF 424 may be integrated with the AF 422, in which case messages (401) and (402) are AF internal messages.

FIG. 4 illustrates two PCFs in communication with the NEF. PCF-1 440 is associated with a first PDU session involving UE-1 432 and UP-1, and PCF-2 460 is associated with a second PDU session involving UE-2 452 and UP-2. In some embodiments, PCF-1 440 and PCF-2 460 can be integrated and provided as the same entity. FIG. 4 also illustrates two SMFs. SMF-1 438 is associated with the first PDU session, and PCF-2 458 is associated with the second PDU session. In some embodiments, SMF-1 438 and SMF-2 458 can be integrated and provided as the same entity, in which case message (407) becomes an SMF internal message. It is also noted that, in some embodiments, UP-1 and UP-2 can overlap partially or fully, in that some or all of the UPFs may be shared by both UP-1 and UP-2.

The call flow of FIG. 4 can be regarded as comprising two overarching steps. First, AF 422 influence for the P2P messaging is installed or established, in order to correlate a source PDU session with a target PDU session. This first step involves messages (401), (402), (403*a*), (403*b*), (404*a*) and (404*b*). Second, the AF influence is applied. The application can be regarded as occurring when the SMF(s) 438, 458 obtain the relevant policy information, for example during session set up or upon receipt of notification from a PCF 440, 460. This second step involves messages (405*a*), (405*b*), (406*a*), (406*b*), (407), (408*a*), (408*b*), (409*a*) and (409*b*). The call flow generally causes the AF request to be relayed to the PCFs 440, 460, which in turn trigger operation of the SMFs 438, 458, thereby directly or indirectly triggering policy update operations and P2P path configuration operations in support of P2P traffic handling and efficient path routing as described herein. Some information mapping may be performed by the NEF 424. The PCFs 440, 460 generate polices based on the AF request and provide the policies to the SMFs 438, 458. The SMFs, according to the policies, perform P2P traffic handling including P2P path establishment and traffic steering configuration at the end points of the bridge entity.

In more detail, message (401) is an AF request made by the AF 422; message (402) is an AF request response from or relayed by the NEF 424; messages (403*a*) and (403*b*) are translated or untranslated AF requests relayed by the NEF to the two PCFs 440, 460; and messages (404*a*) and (404*b*) are responses to the translated or untranslated AF requests from the two PCFs 440, 460 to the NEF 424. Messages (405*a*) and (405*b*) are policy update messages from the two PCFs 440, 460 to their respective SMFs 438, 458. Messages (406*a*) and (406*b*) are responses to the policy update messages. Message (407) corresponds to negotiation or other communication between SMFs 438, 458, of UP configuration or reconfiguration parameters, and may include multiple messages in one or both directions. Messages (408*a*) and (408*b*) are UP path configuration or reconfiguration messages sent from the SMFs 438, 458 to their corresponding UPs 436, 456 or UPFs thereof. Messages (409*a*) and (409*b*) are responses to the UP path configuration or reconfiguration messages, sent from the UPs 436, 456 to their corresponding SMFs 438, 458.

In various embodiments, the messages and corresponding responses of FIG. 4 occur pairwise, such that a message triggers its corresponding response. However, it is also contemplated that responses can be end-to-end responses. For example, receipt of a UP path (re)configuration response (409*a*) or (409*b*) can trigger the receiving SMF 438, 458 to transmit a notification to the corresponding PCF 440, 460, which in turn transmits a notification to the NEF 424, which further in turn transmits a notification to the AF 422. Similarly, responses can be forwarded partway through the function chain, rather than from end to end. It should be noted that various acknowledgement or response messages, such as those described with respect to FIGS. 4 to 9, may be provided in some but not necessarily all embodiments. Some or all of these response or acknowledgement messages can be omitted, or provided via the transport layer.

Figure 5:
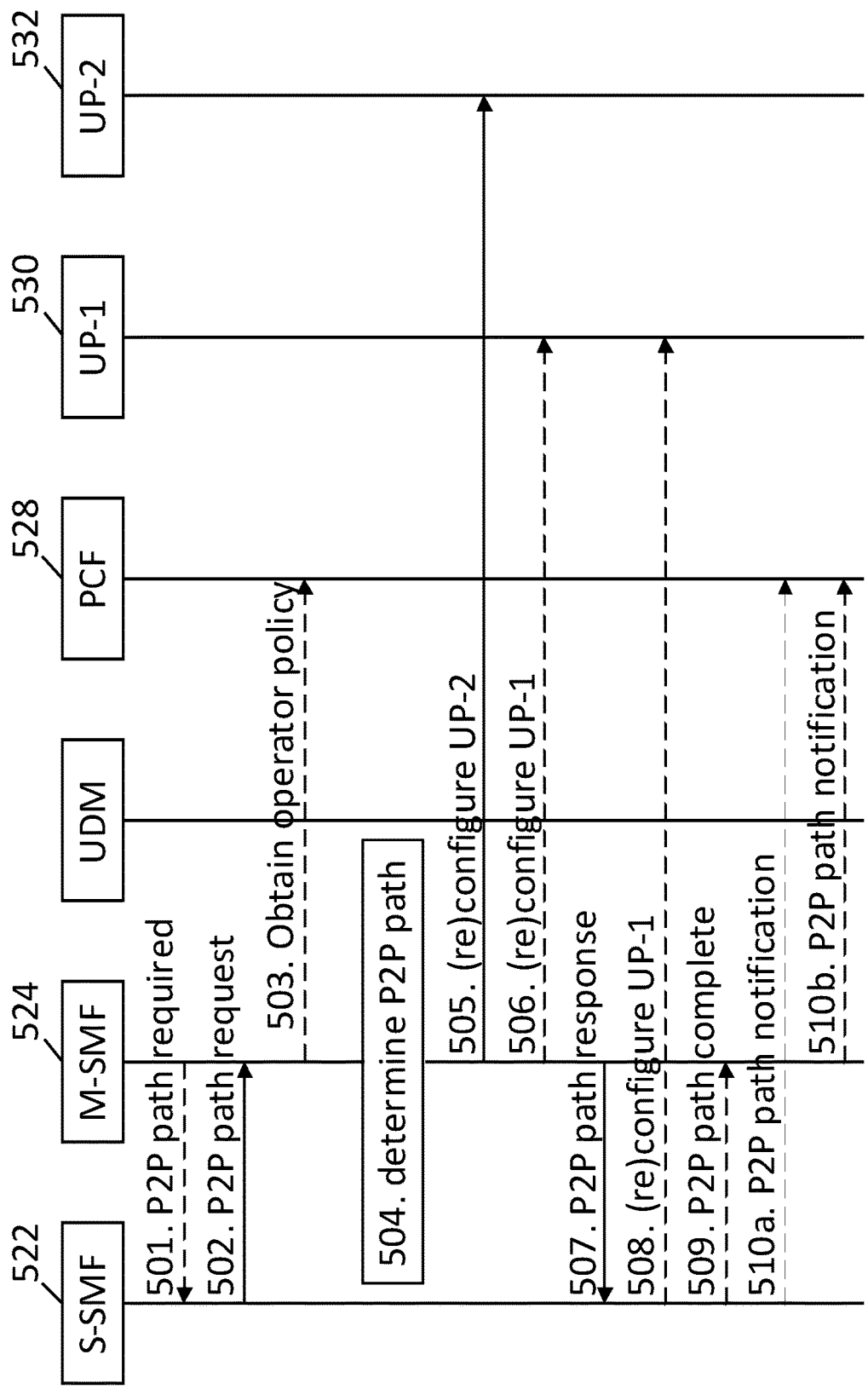
FIG. 5 illustrates a P2P path establishment procedure provided in accordance with embodiments of the present invention.

FIG. 5 illustrates a P2P path establishment procedure provided in accordance with embodiments of the present invention. This procedure can be included, where indicated, within the procedures of FIGS. 6 to 8, as well as more generally. In such cases, the M-SMF may correspond to one of SMF-1 and SMF-2, and the S-SMF may correspond to the other of SMF-1 and SMF-2. Here and elsewhere, operations designated by dashed boxes or arrows may be omitted in some embodiments, or may represent one of several alternatives.

In some embodiments, two involved SMFs are referred to as a Master SMF (M-SMF) and a slave SMF (S-SMF). The M-SMF performs the P2P path decision between the PDU session 1 (whose UP is denoted by UP-1) managed by the S-SMF and the PDU session 2 (whose UP is denoted by UP-2) managed by the M-SMF. The P2P path decision is provided to the S-SMF by the M-SMF.

Designation of which involved SMF is the M-SMF and which is the S-SMF may be specified for example by operator policy. The S-SMF and the M-SMF may obtain operator policy information through an independent procedure. It should be noted that, in other embodiments, the involved SMFs do not necessarily operate in a master-slave arrangement with each other, or the master-slave arrangement can be altered in a variety of ways.

Continuing with the above embodiment, the M-SMF (re)configures the UP-2 for the P2P path. If capable or allowed, the M-SMF may also (re)configure the UP-1 for the P2P path. If the M-SMF is not able or allowed or determines (e.g. according to operator policy or location configuration) not to (re)configure the UP-1, the (re)configuration of UP-1 is performed by the S-SMF. This (re)configuration may occur after the S-SMF receives P2P path decision information from the M-SMF. According to operator policy or local configuration, the S-SMF, M-SMF, or both may notify the PCF upon the completion of P2P path establishment procedure.

Having reference now to FIG. 5, P2P path establishment proceeds as follows. In operation (501) the M-SMF 524 determines the need for a P2P path according to an operator policy and notifies the S-SMF 522 that P2P path establishment is required. This step is optional. In operation (502) the S-SMF 522 detects the need of P2P path (either from operator policy or from the notification in operation (501)) and sends a request to the M-SMF 524 to initiate P2P path establishment. At this point, the S-SMF 522 may provide information regarding PDU session 1 to the M-SMF 524 if the information is available. Such information may include, for example one or more of: UE IP address/prefix; a session ID; information of composition and structure of UP-1; and N6 tunnel information related to the core network. In operation (503) the M-SMF 524 obtains, from the PCF 528, operator policy if it does not have valid operator policy. The operator policy may include rules regulating P2P path establishment/traffic handling.

In operation (504), a P2P path determination is made according to the operator policy and the information of the two PDU sessions. In the presently illustrated embodiment, the M-SMF 524 determines the P2P path of the two PDU sessions. The P2P path spans UP-1 530 (fully or partially) and the UP-2 532 (fully or partially) and includes a bridge entity (e.g. bridge link or bridge UPF) between the two UPs or RANs associated therewith. In other embodiments, as already described above, the P2P path determination can be made by the PCF 528, or by one or a combination of SMFs involved in the PDU sessions.

In operation (505) the M-SMF 524 (re)configures UP-2 532 to enable the P2P path. This includes configuring the traffic steering behavior of the end point of the bridge connection in the UP-2. This may also include addition, removal, and relocation of UPFs for UP-2. In operation (506) the M-SMF 524 (re)configures UP-1 530 to enable the P2P path. This includes (re)configuring the traffic steering behavior of the end point of the bridge connection in UP-1. This may also include addition, removal, and relocation of UPFs for UP-1. Operation (506) is not performed if the M-SMF 524 is not allowed or able to (re)configure UP-1 530. In this case, the S-SMF 522 may instead perform the UP-1 (re)configuration. In operation (507) the M-SMF 524 responds to the S-SMF 522 with respect to the P2P path request of operation (502). The response may indicate addition, removal, and relocation of UPFs in UP-1 530 for the P2P path. The response may include information indicating the end point of the bridge connection in the UP-1 530 and information for (re)configuring the traffic steering behavior of that end point. The response may indicate to the S-SMF 522 to perform the UP-1 (re)configuration.

In operation (508), if (re)configuration of UP-1 530 has not yet been initiated by the M-SMF 524 as indicated in operation (507), the S-SMF 522 (re)configures the UP-1 530 to enable the P2P path. This includes configuring the traffic steering behavior of the end point of the bridge connection in the UP-1 530. This may also include addition, removal, and relocation of UPFs for the UP-1 530. In operation (509) the S-SMF 522 notifies the M-SMF 524 that the UP-1 has been (re)configured. Operation (509) may be omitted if operation (508) is omitted. In operation (510*a*) the S-SMF 522 notifies the PCF 528 that the P2P paths have been established. Additionally or alternatively, in operation (510*b*) the M-SMF 524 notifies the PCF 528 that the P2P paths have been established. These operations may be omitted for example if the operator policy or local configuration does not indicate the need of such notification.

Figure 6:
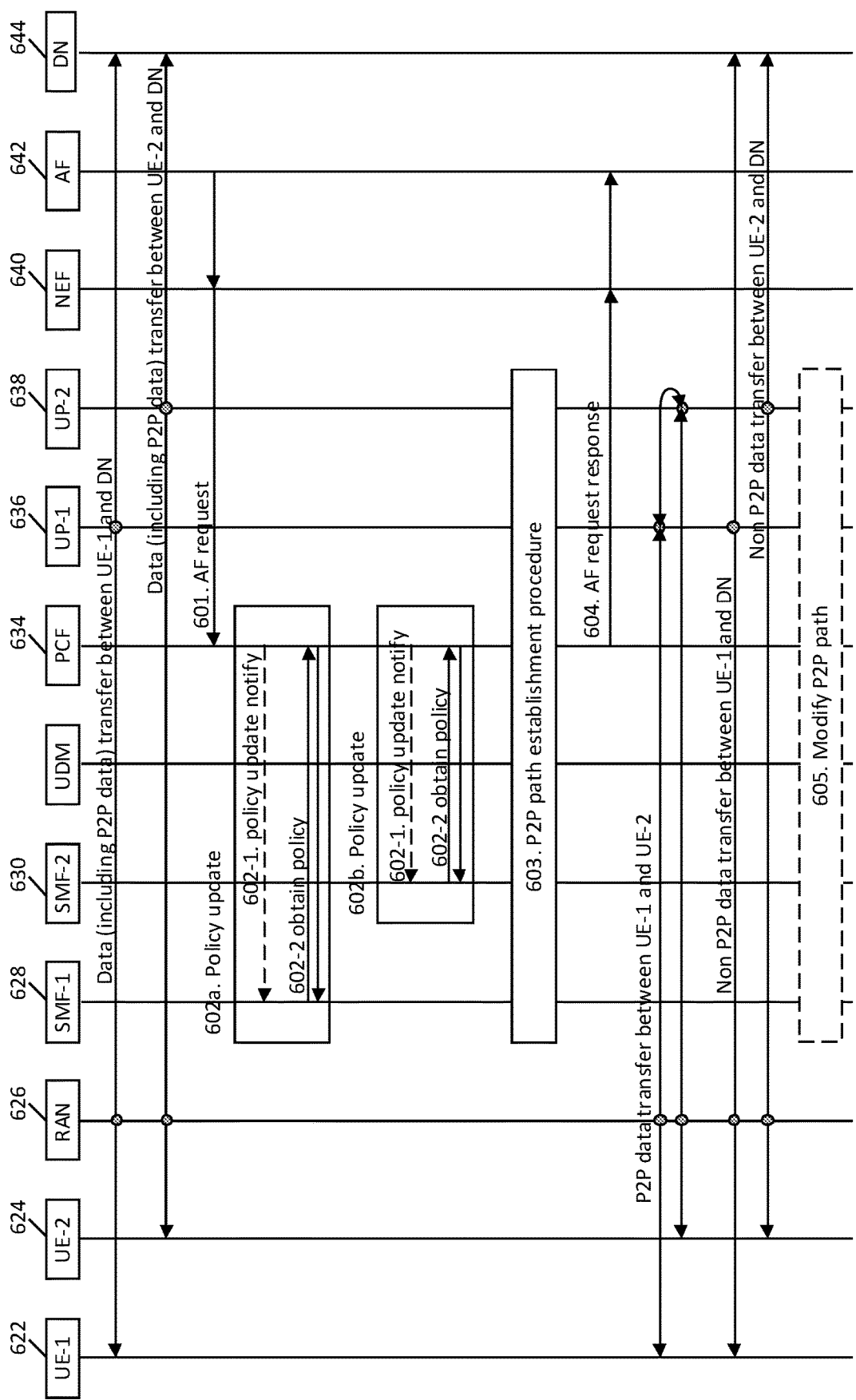
FIG. 6 illustrates a call flow performed according to an embodiment of the present invention, in which the involved PDU sessions are established before the AF request is received.

FIG. 6 illustrates an embodiment of the present invention in which the involved PDU sessions (PDU session 1 and PDU session 2) are established before the AF request is received. The AF request may be a result of the AF's detection of peer to peer traffic. In this case, the AF request triggers immediate P2P path establishment.

In operation (601) of FIG. 6, the AF 642 sends an AF request (i.e. the P2P traffic steering request) to the PCF 634 if the AF is allowed to directly interact with the PCF (for example, when the AF integrates the NEF functionality and/or when the AF is deployed in the trust domain). Otherwise, the AF sends the AF request to the NEF 640, which then transfers it the PCF 634. Before the transfer, the NEF may perform information mapping. Prior to operation (601), as illustrated, P2P traffic between UE-1 622 and UE-2 624 is routed through the DN. Detection of this traffic can trigger the AF request of operation (601).

In operations (602a) and (602b) the PCF 634 generates or updates PCC rules for the two PDU sessions. The PCF 634 updates the PCC rules to the SMF-1 628 (operation 602a) and the SMF-2 630 (operation 602b). Operations (602a) and (602b) may include the following sub-operations. In a first sub-operation (602-1) the PCF 634 notifies the SMF 628, 630 about the policy update. Sub-operation (602-1) is optional and may be performed when the SMF 628, 630 has subscribed to such notification. The notification may include the updated policy. In a second sub-operation (602-2), the SMF 628, 630 obtains the updated PCC rules from the PCF 634. In some embodiments, rather than triggering sub-operation (602-2) based on sub-operation (602-1), sub-operation (602-2) may be performed by the SMF 628, 630 in response to an internal decision or a trigger from another network component. The PCC rules may indicate the need of P2P traffic handling (whether as Master SMF or as Slave SMF), the partner PDU session information, the partner SMF information, traffic steering information, etc. The partner SMF information can include an indication of the SMF ID or address, an indication of whether the partner SMF is the Master SMF or the Slave SMF, or a combination thereof.

In operation (603), a P2P path between the two PDU sessions is established. Path establishment is described above for example with respect to FIG. 5.

In operation (604), the PCF 634 responds to the AF, indicating that the P2P traffic handling is in place. As illustrated, following operation (604), P2P data between UE-1 622 and UE-2 624 is routed through UP-1 636 and UP-2 638 but no longer routed through the DN 644 (as is shown in FIG. 6 by way of an illustrative but non-limiting example; in another example case, traffic may have been originally routed through PDU session anchors). In other embodiments, the bridge may involve at least one RAN node 626. Non-P2P data from UE-1 622 and UE-2 624, such as but not limited to control messages, may still be routed to the DN 644.

In operation (605), upon a subsequent trigger, either of SMF-1 628 and the SMF-2 630 (or another entity) may initiate the P2P path establishment procedure to modify the P2P path. Possible triggers include UE mobility, loading issues at UPF, transport layer congestion, failure in the user plane, etc.

It is noted that, for the embodiment illustrated in FIG. 6, the PDU session 1 and the PDU session 2 are established before the AF request. The AF request may be transmitted as a result of AF's detection of peer to peer traffic. This embodiment enables the AF to trigger substantially immediate P2P path establishment.

Figure 7:
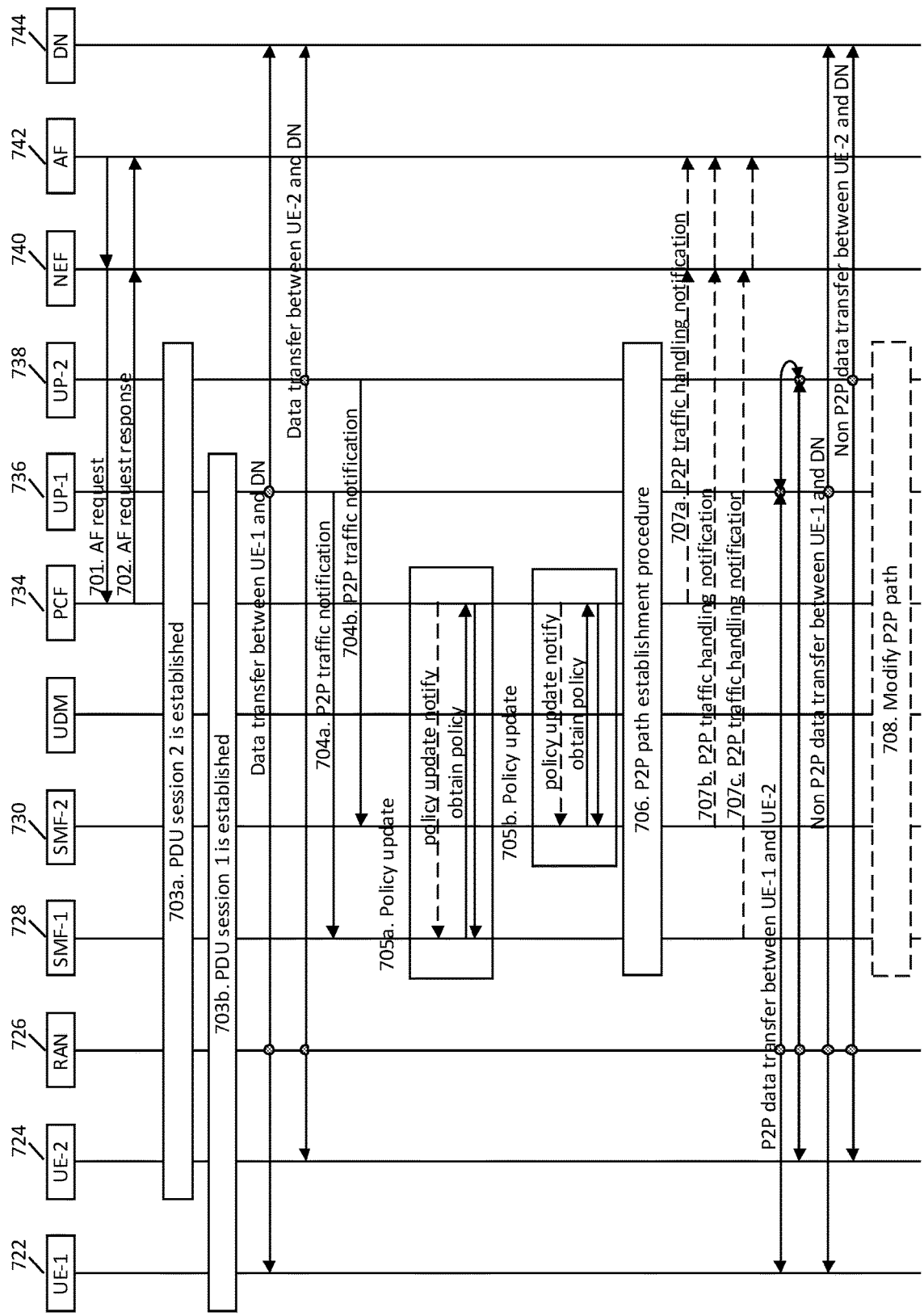
FIG. 7 illustrates a call flow performed according to another embodiment of the present invention, in which the involved PDU sessions are established before or after the AF request.

FIG. 7 illustrates an embodiment of the present invention in which the involved PDU sessions (PDU session 1 and PDU session 2) may be established before or after the AF request.

The embodiment of FIG. 7 is applicable to the scenario in which the AF has not detected P2P traffic, and the request indicates that P2P path establishment is to be initiated upon detection of designated P2P traffic. In this case, the SMF-1 and the SMF-2 according to the policy (obtained during session establishment or upon policy update notification) configure the UP of their served PDU sessions (e.g. the session anchor) to detect the P2P traffic (e.g. of a certain type, based on certain filter parameters). When the P2P traffic is detected, the UP triggers the P2P traffic handling by notifying the SMF.

For detecting P2P traffic in the UL direction, the SMF may configure a UPF that is closest to the RAN in the UP. For detecting P2P traffic in the DL direction, the SMF may configure a UPF that is closest to the DN in the UP.

P2P traffic detection can be performed, for example, by checking if the destination address (including address and possibly port number) or source address (including address and possibly port number) of a PDU is an address assigned by the network (e.g. within the IP address pool managed by the network). For checking if UL traffic corresponds to P2P traffic, the destination address may be checked. For checking if DL traffic is P2P traffic, the source address may be checked. The SMF may configure the UP to perform P2P traffic checking only on UL traffic or only one DL traffic or on both UL and DL traffic, depending on the policy. Some or all candidate PDUs can be checked in this manner via traffic filtering or packet inspection operations.

Referring now to FIG. 7, in operation (701) the AF 742 sends the P2P traffic steering request to the PCF 734 if the AF is allowed to directly interact with the PCF. Otherwise, the AF 742 sends the request to the NEF 740, which then transfers it the PCF 734. Before the transfer, the NEF may perform information mapping. In operation (702) the PCF 734 responds to the AF 742 with respect to the P2P traffic steering request, indicating acceptance of the request.

In operations (703a) and (703b) the two PDU sessions 1 and 2 are established. During the PDU session establishment, the SMFs 728, 730 may operate to identify the need for P2P traffic detection based on operator policy and configure their associated/involved UPs to detect P2P traffic according to the policy and/or local configuration. P2P traffic checks may be configured for one or both of UL traffic and DL traffic. One or both of SMF-1 728 and SMF-2 730 may perform the P2P traffic detection configuration. For example, only the master SMF, only the slave SMF, or both the master and slave SMFs may perform the configuration.

In operations (704a) and (704b), UP-1 738 and UP-2 740 detect P2P traffic and notify their associated SMF 728, 730. One or both of operations (704a) and (704b) may occur, for example depending on whether P2P traffic check is performed toward both UL traffic and DL traffic. At this point, the UPF may inform the SMF about the information of the P2P traffic, e.g. information regarding the source address and destination address associated with the P2P traffic, a reference number such as application identifier that maps to the P2P traffic detection rule or configuration.

In operations (705a) and (705b), the SMFs 728, 730 obtain policy related to P2P traffic. These operations may be omitted in some embodiments. These operations are similar to operations (602a) and (602b) as illustrated in FIG. 6.

In operation (706), a P2P path between the two PDU sessions is established. Path establishment is described above for example with respect to FIG. 5.

In operations (707a) to (707c), which represent various alternatives, the AF 742 is notified that the P2P path establishment/traffic handling is being or has been implemented. The notification may be sent (707a) by the PCF 734 or (707b) by SMF-2 730 or (707c) by SMF-1. If the notification is sent by an SMF, which of the SMF-1 728 and SMF-2 730 sends the notification can be specified by the operator policy. As illustrated, following operation (706), P2P data between UE-1 722 and UE-2 724 is routed through UP-1 736 and UP-2 738 but no longer routed through the DN 744 (again as shown by way of illustrative but non-limiting example). In other embodiments, the bridge may involve at least one RAN node 726. Non-P2P data from UE-1 722 and UE-2 724, such as but not limited to control messages, may still be routed to the DN 744.

In operation (708), upon a subsequent trigger, either of SMF-1 728 and the SMF-2 730 (or another entity such as a PCF 734, for example as described elsewhere herein) may initiate the P2P path establishment procedure to modify the P2P path, similarly to operation (605) of FIG. 6.

It is noted that, in the embodiment illustrated in FIG. 7, PDU session 1 and PDU session 2 may be established before or after the AF request. The AF 742 may initially have not detected P2P traffic, and the request indicates that P2P path is expected when P2P traffic occurs. This embodiment allows the AF to install P2P traffic handling policy before P2P traffic occurs.

Figure 8:
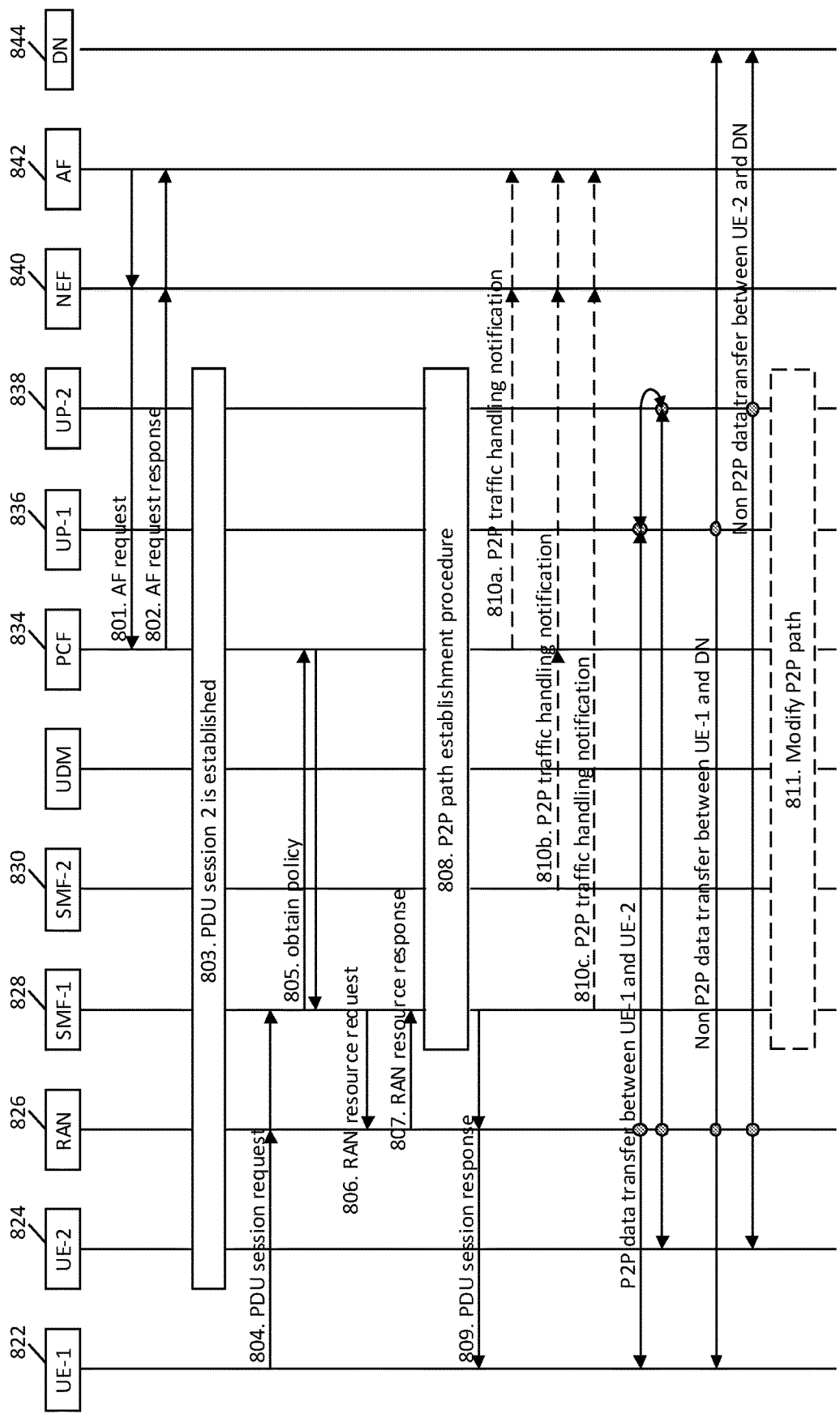
FIG. 8 illustrates a call flow performed according to another embodiment of the present invention, in which one of the involved PDU sessions is established after the AF request is received.

FIG. 8 illustrates an embodiment in which one of the involved PDU sessions (PDU session 1) is established after the AF request. The AF request indicates that the UP should be ready for P2P traffic substantially immediately. It is assumed here that PDU session 2 was established before PDU session 1. Due to the initial lack of peering information (i.e. initial lack of identity of PDU session 1), the PDU session 2 may have been established through another procedure (such as but not necessarily limited to the regular session establishment procedure described in 3 GPP TS 23.502). During the establishment of PDU session 1, SMF-1 obtains policy information from the PCF and determines that PDU session 1 correlates with PDU session 2 in terms of P2P traffic. This can trigger a substantially immediate reconfiguration to facilitate P2P traffic handling in the manner described herein. SMF-1 (or alternatively another entity such as SMF-2) then initiates P2P path establishment for the two PDU sessions.

Referring now to FIG. 8, in operation (801) the AF 842 sends the P2P traffic steering request to the PCF 834 if the AF is allowed to directly interact with the PCF. Otherwise, the AF sends the request to the NEF 840, which then transfers it the PCF 834. Before the transfer, the NEF may perform information mapping. In operation (802) the PCF 834 responds to the AF 842 with respect to the P2P traffic steering request, indicating acceptance of the request.

In operation (803) the PDU session 2 is established for UE-2 824. In operation (804), UE-1 822 requests establishment of PDU session 1. The request may be transmitted to SMF-1. In operation (805), SMF-1 828 obtains relevant operator policy through interaction with the PCF 834. In operation (806), SMF-1 828 request the RAN 826 (situated between UE-1 and SMF-1) to set up resources for supporting PDU session 1. In operation (807), the RAN 826 responds to the SMF-1 828, indicating the completion of RAN resource setup for PDU session 1.

In operation (808), a P2P path between the two PDU sessions is established. Path establishment is described above for example with respect to FIG. 5. The path establishment procedure may be initiated by SMF-1 operating as Master SMF or Slave SMF. In operation (809), SMF-1 828 responds to UE-1 822, indicating acceptance of PDU session 1.

In operations (810a) to (810c), which represent various alternatives, the AF 842 is notified that the P2P path establishment/traffic handling is being or has been implemented. The notification may be sent (810a) by the PCF 834 or (810b) by SMF-2 820 or (810c) by SMF-1 828. If the notification is sent by an SMF, which of the SMF-1 and SMF-2 sends the notification can be specified by the operator policy. As illustrated, following operation (808), P2P data between UE-1 822 and UE-2 824 is routed through UP-1 836 and UP-2 838 but no longer routed through the DN 844 (again as shown by way of illustrative but non-limiting example). In other embodiments, the bridge may involve at least one RAN node 826. Non-P2P data from UE-1 822 and UE-2 824, such as but not limited to control messages, may still be routed to the DN 844.

In operation (811), upon a subsequent trigger, either of SMF-1 828 and SMF-2 830 (or another entity) may initiate the P2P path establishment procedure to modify the P2P path, similarly to operation (605) of FIG. 6.

It is noted that, in the embodiment illustrated in FIG. 8, PDU session 1 is established after the AF request. The AF request indicates that the UP should be ready for P2P traffic substantially immediately. It is assumed that PDU session 2 was established before PDU session 1. This embodiment allows the P2P traffic handling to be performed during the establishment of PDU session 1.

Figure 9:
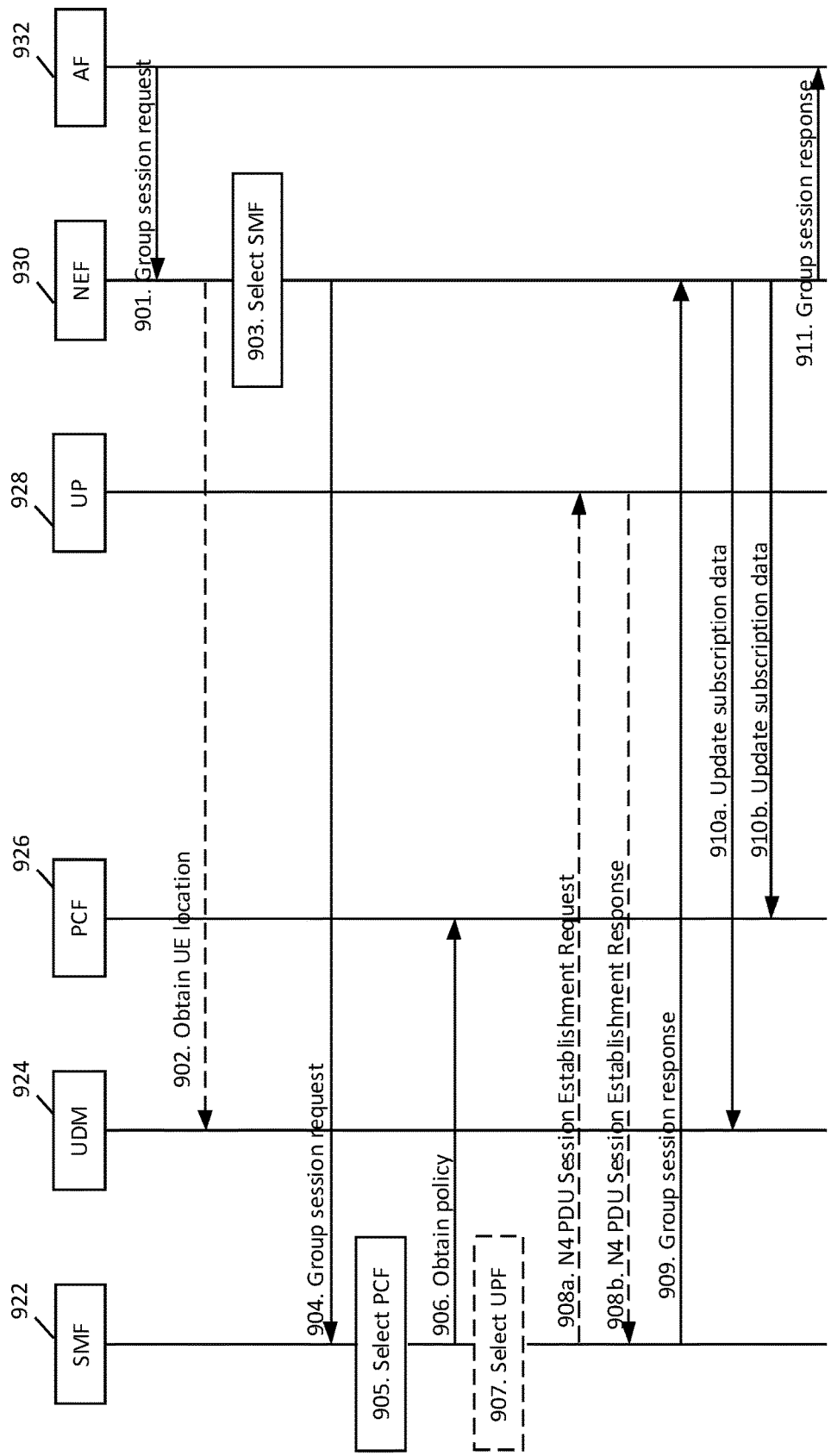
FIG. 9 illustrates a call flow procedure related to group session establishment, according to an embodiment of the present invention.

FIG. 9 illustrates a call flow procedure related to group session establishment, according to an embodiment of the present invention. A single-UE PDU session can be correlated with a group PDU session to enable P2P multicasting. In such multicasting, the single UE multicasts traffic to the UE group. The UP of the group PDU session may have a tree structure. One of the UPFs of the UP may be selected as the root of the tree by the SMF. The single UE sends UL traffic, which is steered via an established bridge to the tree UP of the group PDU session. The bridge may be established according to embodiments of the present invention. Within the tree UP, the traffic is broadcast along the tree. Each UPF in the tree, after receiving the traffic, sends it to all the topological neighbors in the UP (i.e. the UPFs or RAN nodes having a connection with it) except for the UPF or RAN node which it received the traffic from. This can be facilitated by avoiding sending the traffic to the tunnel end points that provided the traffic. RAN nodes receiving the traffic may utilize RAN level multicasting to optimize RAN performance if the RAN node is serving multiple member of the UE group.

To optimize the tree broadcasting structure, each UPF may be configured with an indication of the number or the presence of served UEs in each of branches. The UPF then sends the traffic to that branch only if that branch is serving one or more UEs. The configuration can be performed by the SMF of the group PDU session.

The SMF of the group PDU session may be specified as the Master SMF. This can avoid the requirement to pass information of complicated tree UP structure between SMFs. Each time a PDU session is included into the tree, the SMF updates the information about the number or the presence of served UEs at the UPFs along the tree branch toward the root of the UP tree, starting from the connection UPF, to facilitate tree broadcast optimization.

To maintain the UE counting properly, each UE can be attached to the tree UP through only one PDU session. The single-UE session SMF provides UE information to the group session SMF. The group session SMF then enforces the applicable rules.

The call flow illustrated in FIG. 9 shows an embodiment of the group session establishment procedure. The procedure of P2P path establishment for a single-UE session and a group session is the same as that for two single-UE sessions.

Having reference now to FIG. 9, in operation (901) an AF request for group session setup is sent. The request may indicate some or all of: the information of the UE group, the location area of the UE group, and the location of the application. In one embodiment, the request may designate all the UEs within a specified location area and satisfying the other specified criterion. In operation (902) The NEF 930 obtains the group location area information from the UDM 924, if the information is not part of the AF request. The location area information may be based on the location information of individual group members, for example if the individual's information is available.

In operation (903) the NEF 930 selects an SMF according to the UE group location information. In operation (904) the NEF 930 requests the SMF 922 to establish a group PDU session. The request indicates the location of the application. In operation (905) The SMF 922 selects a PCF. In operation (906) The SMF 922 obtains operator policy from the selected PCF 926. In operation (907) the SMF 922 selects a UPF according to the group location information and the application location information. Operation (907) may be omitted in some embodiments.

In operations (908a) The SMF 922 configures the group session UP. The SMF may send a PDU session establishment request (908a) for initiating the configuration and receive the PDU establishment response (908b) from the UP 928 upon acceptance/completion of the configuration. Operations (908a) and (908b) are optional and may be omitted in some embodiments.

In operation (909) The SMF 922 replies to the NEF 930, indicating the successful establishment of the group session. The reply message may include the multicast address of the group session. In operation (910a) The NEF 930 updates the subscription data in the UDM 924 by providing the group session information to the UDM (including the session information such as the multicast address, the group information such as group ID or detail group membership info, application information such as application ID). This step may be omitted in some embodiments. In some embodiments, rather than performing operation (910a), the NEF 930 may instead provide, in operation (910b), the same information as is described in operation (910a) to the PCF 926. In some embodiments, both operations (910a) and (910b) may be performed. In operation (911) The NEF 930 responds to the AF 932 indicating the acceptance of the group session. The response may include the multicast address of the group session.

In various embodiments, the AF request indicates which portion of the UL traffic in a source PDU session is to be directed to a target PDU session as DL traffic. The AF request includes some or all of: PDU session information, such as source and target PDU session information, traffic filtering information, and traffic steering information.

PDU session information (e.g. for either or both of source and target PDU sessions) can include any of a UE identifier or UE group identifier (such as an External Identifier or MSISDN or GPSI (Generic Public Subscription Identifier)), a DNN (Data Network Name), S-NSSAI (Single Network Slice Selection Assistance Information), an application ID, a UE IP address/prefix, and UPF information (such as a network address or identifier allocated to the UPF). The PDU session information can be used to identify traffic belonging to the PDU session. PDU session information may correspond to an existing or future PDU session for the traffic and can include the types of session information listed above.

The traffic filtering information is used to identify traffic of interest, such as P2P traffic to be diverted. The traffic filtering information can include a flow descriptor, for example involving a UE IP address, or IP 5 tuple. The traffic filtering information can additionally or alternatively include an application ID, traffic detection rules, or a combination thereof. An example traffic detection rule indicates that only data flows should be affected by the policy and P2P traffic flow handling, while control messages should be unaffected and instead should be routed to the AF or the application or the DN. In some embodiments, the traffic filtering information can include a reference to one or more preconfigured and known traffic detection rules. In some embodiments, the traffic detection rules can be explicitly communicated.

Traffic steering information is used to enable the UPF to perform packet processing for routing purposes and for the purpose of P2P traffic handling. The traffic steering information includes information indicative of how P2P traffic is to be handled once detected. This includes information related to routing of the traffic via the bridge, e.g. over a bridge entity (e.g. bridging tunnel or bridge UPF). The traffic steering information can include a packet header processing configuration, protocol parameters, or both, or other information related to the bridge entity.

Further with respect to embodiments of the present invention, and signal content in particular, policy rules, such as operator policy and/or PCC rules, are provided to the SMF by the PCF. These policy rules may be used for the purpose of P2P path establishment, P2P traffic handling, or both. The policy rules may be generated in response to one or more AF requests and may be configured or generated by the PCF based on content of these AF requests and used by the SMF to optimize the UP path for P2P traffic handling. The policy rules may include or be indicative of some or all of the following information. Implementing policy rules by an SMF may comprise enforcing the policy rules by the SMF.

In some embodiments, the policy rules may be indicative of bridging decision information. The bridging decision information may indicate UP path information, UP structure information, or both. This information can include, for example, any of a UPF ID, UPF interconnection information, functionality information for each UPF (e.g. session anchor, UL CL, BP, etc.), or application location. The bridging decision information may include information regarding the identity of a partner PDU session, such as a PDU session ID or other PDU session information such as described above. The bridging decision information may include an indication of whether the partner SMF is the Master SMF or the Slave SMF, i.e. whether the partner SMF is expected to make decisions such as P2P UP decisions. The bridging decision information may include bridge configuration information, such as an identifier of the bridge source end and bridge destination end. The bridging decision information may include the traffic filtering information, traffic steering information, or both.

In some embodiments, the policy rules may be indicative of bridging requirements, for example associated with a bridging decision. The bridging requirement information may include information indicative of one or more partner SMFs, such as SMF IDs or addresses. The bridging requirement information may include information indicative of one or more partner PDU sessions, such as PDU session IDs, UP path information, or UP structural information. The bridging requirement information may indicate whether the bridge needs to pass through location(s) of application server or application. When the bridge does not need to pass through location(s) of application server or application, the bridge connects the UP paths of the PDU Sessions directly, via common UPF or links between UPFs. When the bridge is to pass through the application server, the bridging requirements may include information indicative of interconnection between application servers (or application locations), such as cost and connectivity quality (e.g. delay, throughput) information and information of the weight of each application server (or application location). The bridging requirement information in the policy rules may be derived by the PCF from the bridging requirement information provided by the AF in the AF request(s). In some embodiments, the bridging requirement information in the policy rules is identical to the bridging requirement information providing by the AF in the AF request(s). The bridging requirement information may include the traffic filtering information, traffic steering information, or both.

In some embodiments, the policy rules may indicate a requirement for PDU session handover for P2P traffic handling, the PDU session information, the source SMF information (e.g. address, ID), the target SMF information (e.g. address, ID), traffic steering information, or a combination thereof.

In some embodiments, the policy rules may include indications of application location information. In some embodiments, the application location information is expressed in the form of a Data Network Access Identifier (DNAI). In some embodiments, the application location information indicates whether a common application location is to be selected for both the first and second PDU sessions, or for all of the two, three or more involved PDU sessions. In some embodiments, the application location information includes interconnection information indicative of parameters of data connections between multiple application locations. These parameters can include, for example: interconnection cost, connectivity, throughput, delay, and weight that reflects any of interconnection cost, connectivity, throughput and delay. In some embodiments, the application location information includes information indicative of parameters of application locations. These parameters can include, for example, cost, load, data/traffic processing capabilities (e.g. data processing rate in terms of bits per second or packets per second or number of PDU sessions), and weight that reflects any of cost, load, data/traffic processing capabilities.

In more detail, application location information can be provided in the case where two or more PDU sessions are to be bridged through an application server, or through a plurality of application servers. In this case, application locations, and their associated servers form parts of a connected application network, and the UEs are connected to the application network through either one or multiple application servers. When one application server is involved, its application server acts as bridging node, as described elsewhere herein. When multiple application servers are involved, one or more bridging links are implemented in the application network between the multiple application servers. In some embodiments, when multiple application servers are involved, the SMF is configured to base routing decisions at least in part on the interconnection information between the multiple application servers. It is noted that an application server may refer to a portion of a larger server handling multiple applications. Furthermore, the application location may be a location of an application server. For example, the application server may be a physical entity and the application location may be a logical construct pointing to the location of the application server. As another example, the application location can be a DNAI, which provides access to the application server.

The AF may provide the application location information, application location interconnection information, or both, as part of AF request to entities (e.g. PCF, SMF) within the network. This information may be provided, for example, when the AF transmits a request for P2P traffic handling and indicates that the P2P bridge is to traverse one or multiple application server(s). In response, entities (e.g. PCF and/or SMF) within the network will cause application locations (or associated server or servers) to be present in the jointly optimized P2P UP path. This P2P UP path connects or bridges the two or more PDU Sessions' UPs. The selection or reselection of application location or application server may be performed according to the application location information and/or application location interconnection information provided by the AF as part of an optimization routine to provide an optimal or close to optimal P2P UP path.

Figure 10:
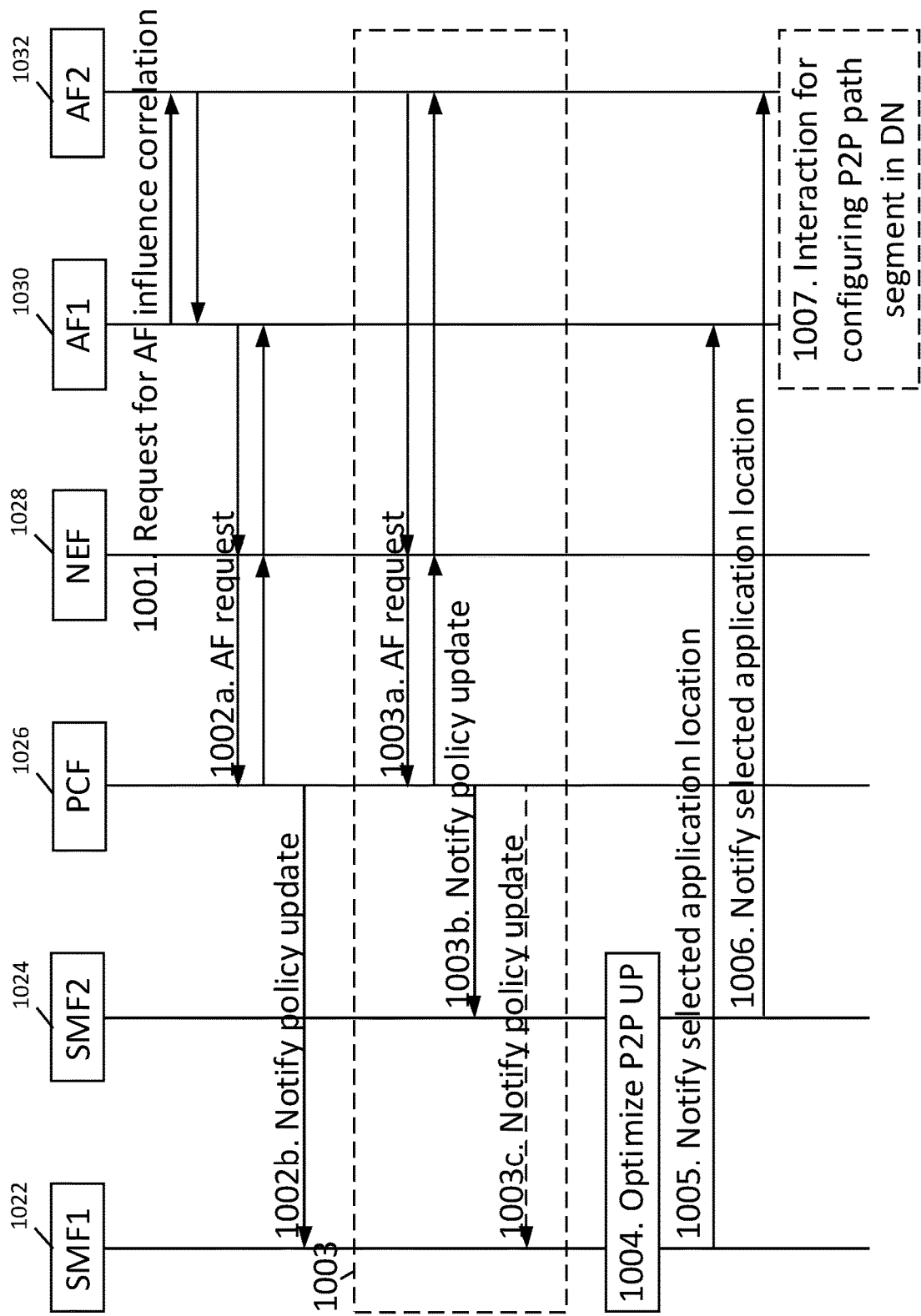
FIG. 10 illustrates a call flow involving a pair of AFs and a P2P UP optimization, according to an embodiment of the present invention.

FIG. 10 illustrates a call flow involving a pair of AFs 1030, 1032 and a P2P UP optimization, according to an embodiment of the present invention. Having reference now to FIG. 10, in operation (1001), a first application function AF1 1030 requests AF influence correlation from a second application function AF2 1032. The request indicates relevant information, such as the application ID, DNN, S-NSSAI, UE information, and traffic information. AF2 1032 responds to AF1 1030 and includes information such as an AF transaction ID in the response. The AF transaction ID refers to the AF request that AF2 1032 sent (or is going to send) to the core network (e.g. $5^{th}$ generation core network (5 GC)) and corresponds to the AF influence correlation requested by the AF1 1030.

In operation (1002), AF1 1030 sends an AF request to the core network to influence the traffic routing decision made by the SMF(s) SMF1 1022, SMF2 1024, or a combination thereof. Operation (1002) includes sub-operations (1002a) and (1002b). In sub-operation (1002a), the AF request is sent to the PCF 1026 directly or through the NEF 1028. The AF request includes the AF transaction ID received from the AF2 1032 in operation (1001), indicating that the AF request is correlated to the AF request identified by that AF transaction ID. In sub-operation (1002b), The PCF 1026 notifies SMF1 1022 (i.e. the SMF serving the traffic identified in the AF) of the policy update due to the AF request in sub-operation (1002a).

If the correlated AF request has already been received by the PCF, the PCF at this step includes the peer PDU Session ID and the serving SMF information indicative of the peer PDU Session. The PCF further indicates to the SMF(s) that the UP path is to be jointly optimized for the two involved PDU Sessions. The SMF accordingly initiates the optimization operations. If the correlated AF request has not been received by the PCF, the PCF at this time may include only the AF request information related to the current PDU Session. That is, the AF request may be provided at this time without any information regarding the correlation and the correlated PDU sessions.

In operation (1003), AF2 1032 sends an AF request to the core network to influence the traffic routing decision made by an SMF or combination of SMFs. Operation (1003) includes sub-operations (1003*a*), (1003*b*) and (1003*c*). In sub-operation (1003*a*,) the AF request is sent by AF2 1032 to the PCF 1026, either directly or through the NEF 1028. The AF request includes the AF transaction ID that the AF2 previously provided to the AF1 in operation (1001). In sub-operation (1003*b*), the PCF 1026 notifies SMF2 1024 of the policy update associated with the AF request provided in sub-operation (1003*a*). SMF2 1024 is the SMF serving the traffic identified in the AF request. In sub-operation (1003*c*), the PCF 1026 notifies the SMF1 1022 regarding the correlation in AF influence, including the PDU Session ID of the correlated PDU Session and the serving SMF of that PDU Session. Sub-operation (1003*c*) can be omitted in some embodiments, for example if sub-operation (1003*b*) takes place before sub-operation (1002*b*).

In operation (1004), SMF1 1022 and the SM2 1024 interact to optimize the P2P UP. Subsequently, in operations (1005) and (1006) respectively, SMF1 1022 notifies AF1 1030 of the selected application location (due to the optimization), and SMF2 1024 notifies AF2 1032 of the selected application location (due to the optimization). In operation (1007), AF1 1030 and AF2 1032 interact to configure application-based PDU session bridging, as described elsewhere herein (e.g. bridging involving one or more application locations or application servers along the bridging path.

In some embodiments, only one of AF1 1030 and AF2 1032 interacts with the core network to influence P2P traffic routing. For example, in operation (1001) of FIG. 10, AF2 may provide AF1 with the application server information and the correlated peer PDU session information. Then, in sub-operation (1002*a*), the AF request sent from AF1 1030 includes the information of both PDU Sessions, along with the application server information for both PDU sessions. After SMF1 1022 receives the PCC rules resulting from the AF request in sub-operation (1002*a*), the SMF1 1022 may trigger a P2P UP path optimization. In this case, operation (1003) is optional and may be omitted in some embodiments.

Figure 11A:
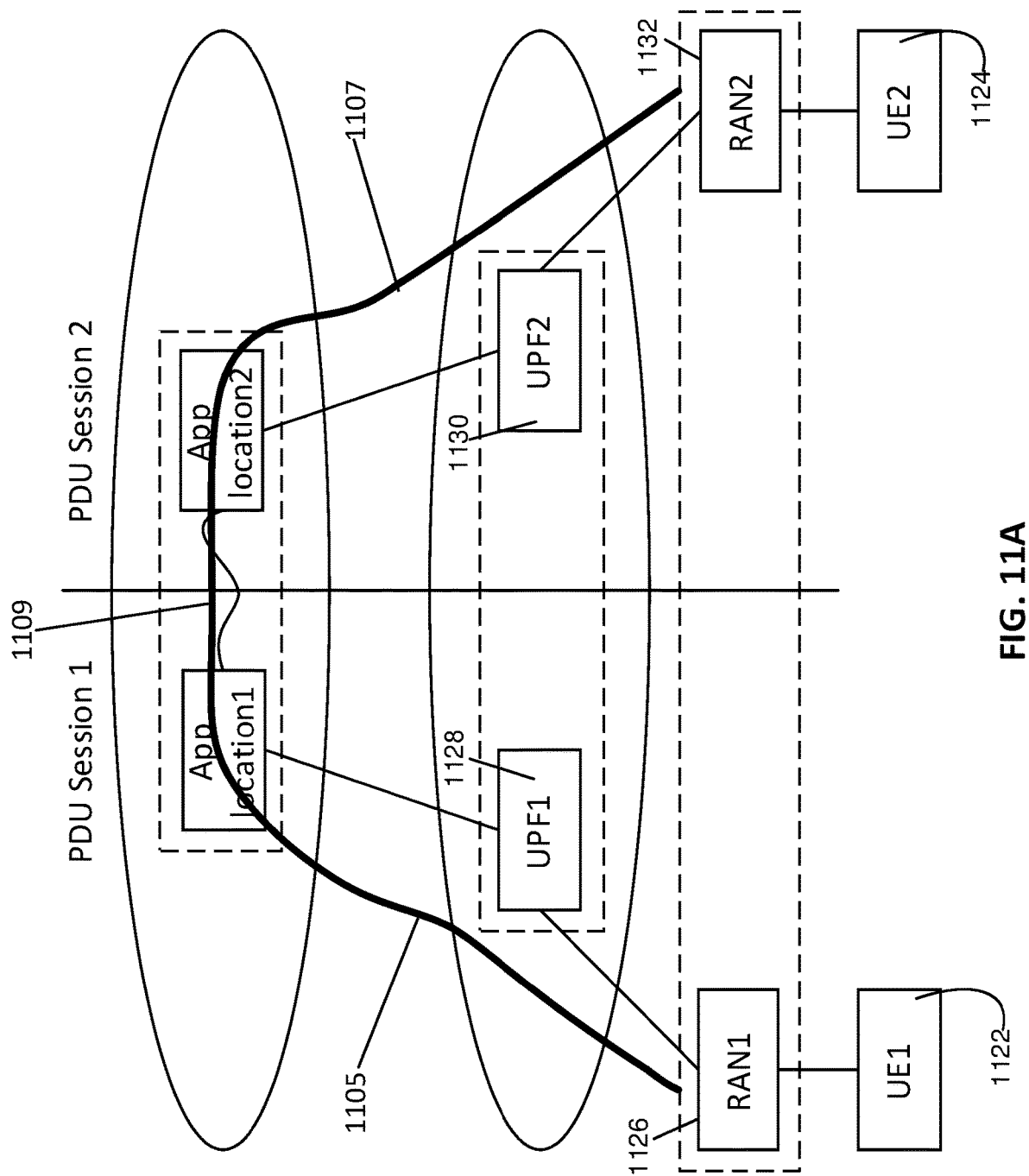
FIGS. 11A and 11B illustrate indirect and direct P2P paths, respectively, according to further embodiments of the present invention.
Figure 11B:
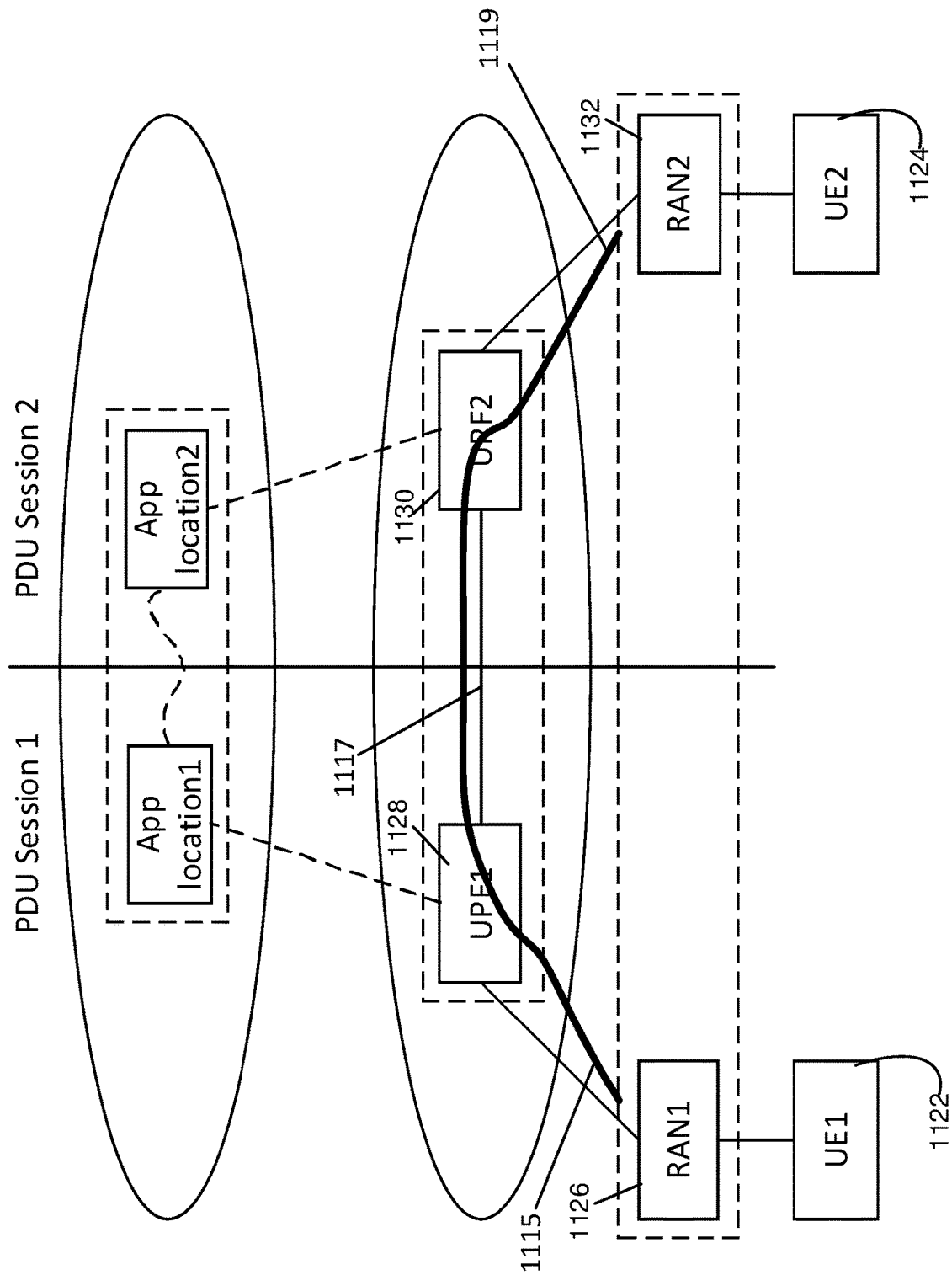

FIGS. 11A and 11B illustrate P2P paths according to different embodiments of the present invention. FIG. 11A illustrates an indirect P2P path traversing a data network, while FIG. 11B illustrates a direct P2P path within a 3 GPP UP (and omitting the data network). The P2P paths can support an IP multimedia subsystem (IMS) media session between UE1 1122 and UE2 1124. IMS is a defined and standardized architectural framework. In FIG. 11A, the P2P path includes two 3 GPP UP path segments 1105, 1107 connecting the two UEs 1122, 1124 to the corresponding IMS media plane (and path thereof). The path also includes a third segment 1109, which may be within the IMS media plane. The three segments 1105, 1107, 1109 of the P2P path may be jointly optimized in order to improve the P2P path efficiency. In some embodiments, Application location 1 and application location 2 are the same application location.

In some embodiments, when a determination is made, by network entities, that an application server is not required in the P2P path, a direct P2P path (involving direct connection of UPs of PDU sessions) can be established as in FIG. 11B. When a determination is made, by network entities, that an application server is required as part of the P2P path, an indirect P2P path, involving such an application server and indirect connection of UPs of PDU sessions, can be established as in FIG. 11A. The path optimization for the scenario of FIG. 11A may comprise selecting an application server location that supports the optimization.

If the IMS media plane (and associated path segments therein and thereto) can be omitted (e.g. when the IMS signaling plan makes a decision to do so), the two 3 GPP UP paths may be connected directly. This alternative is illustrated in FIG. 11B. The P2P path in this case includes a first path segment 1115 from RAN1 1126 to UPF1 1128, a second path segment 1117 from UPF1 1128 to UPF2 1130, and a third path segment 1119 from UPF2 1130 to RAN2 1132. In this case, the two 3 GPP UP paths may be jointly selected to provide a desired (e.g. optimal or near-optimal) level of P2P path efficiency. In embodiments, UPF1 and UPF2 may be the same UPF.

Embodiments of the present invention (including but not necessarily limited to the embodiments illustrated in FIGS. 11A and 11B) enhance AF influence on traffic routing to provide a desirable (e.g. optimized or nearly optimized) P2P path. For example, this can enhance the AF influence described in the $3^{rd}$ Generation Partnership Project (3 GPP) document numbered TS 23.501 (hereinafter referred to as TS 23.501), "System and Architecture for the 5G System," version 15.0.0, Dec. 22, 2017, and in particular in clause 5.6.7 thereof. This document is incorporated herein by reference. These embodiments allow the AF to indicate a correlation between two AF requests to entities (e.g. PCF, SMF) in core network. In response, these core network entities can be configured to apply the AF influence defined in the two AF requests jointly to the relevant PDU Sessions for P2P path optimization. The AF may further indicate whether the P2P paths are to traverse a relevant data network (DN). This may be required for example in order to reach an application location specified in the two correlated AF requests. The core network (e.g. PCF, SMF) then identifies the impacted PDU Sessions and performs UP path selection (including application location selection) jointly for the impacted PDU Sessions based at least in part on the information provided by the AF. Such embodiments are described in more detail below with respect to three scenarios.

In a first scenario, the AF may request to correlate two existing AF requests for path optimization between UEs. In this case, the AF may provide the AF transaction IDs of the two existing AF requests. One of the two existing AF requests contains information (e.g. as defined in TS 23.501, clause 5.6.7) for the traffic of one UE (or UE group). The other existing AF request contains information (e.g. defined in TS 23.501, clause 5.6.7) for the traffic of another UE (or UE group). The AF's correlation request comprises a request for the network to jointly optimize the UP path for the traffic of the two UEs (or UE groups). The optimization is directed toward allowing the two UE (or any member of one UE group and any member of the other UE group) to communicate with each other more efficiently (e.g. with reduced transport delay).

In a second scenario, the AF may request to correlate its current request with an existing AF request. The current AF request contains information (e.g. as defined in TS 23.501, clause 5.6.7) for the traffic of one UE (or UE group), and the existing AF request contains information (e.g. defined in TS 23.501, clause 5.6.7) for traffic of another UE (or UE group). For the purpose of the correlation, the current AF request includes the AF transaction ID of the existing AF request, and, in some embodiments, an indication of the correlation for use in joint UP optimization.

In a third scenario, the AF may request to jointly optimize UP for traffic of two or more UEs (or one or more UE groups) by providing all the detailed information (e.g. as defined in TS 23.501, clause 5.6.7) regarding the traffic of the UEs (or the UE groups) within a current AF request. There are two set of information (e.g. as defined in TS 23.501, clause 5.6.7), one for each of the UEs (or UE groups), in the AF request. In addition, the AF request may include an indication of correlation for use in joint UP optimization.

In the above three scenarios, the indication of correlation for use in joint UP optimization may include bridging requirement information described elsewhere herein.

In the above three scenarios, the UPs, UP paths or UPFs for the traffic of the UEs (or UE groups) may be jointly selected or reselected according to the AF request(s). The current AF request (for correlation) may indicate whether the UPs can be directly connected within the 3 GPP core network (e.g. through a bridge link between UPFs or a bridge UPF), or whether the UPs can be indirectly connected through application locations. If direct connection is allowed, the jointly optimized end-to-end UP path may or may not include application location(s), depending on interconnection quality of application locations.

When application locations may be included along the end-to-end path, there are at least two possible cases. In a first, case, only one application location (the bridging application) is included in the end-to-end path. In a second case, two or more application locations (bridging interconnect applications) are included in the end to end path. In this second case, one or more of the application locations are selected out of a plurality of potential application locations specified in each of the two AF requests (e.g. as in the first and second scenarios above) or in the AF request (e.g. as in the third scenario above) for corresponding traffic. In the first case, the selected application location may belong to the intersection of sets of potential application locations specified in the two AF requests. In the second case, the two or more selected application locations may be interconnected, and the interconnection information (e.g. connectivity, cost, quality, QoS properties such as delay, throughput, etc.) may be provided by the AF to the network for application location selection purpose. The AF request (for correlation purpose) may include the application location interconnection information. Alternatively, the application location interconnection information may be pre-configured into one or more of the PCF, SMF, NEF, UDM, UDR, or network repository function (NRF), for example by the OAM (Operation, Administration and Maintenance) system. The interconnection may represent logical connectivity between two application locations. The AF request (for correlation purpose) may indicate whether or not a common or single application location should be selected. The AF request may indicate this implicitly by specifying there is no interconnection between any pair of application to enforce such single-application-location selection.

In some embodiments, each application location may be associated with an application location weight, which may reflect the load or capacity of the application location. This weight may be provided by the AF in the AF request, when the AF requests to influence traffic routing. The weight may be used by the SMF, together with other information such as one or both of: UP topology information; and application location interconnection information, in order to perform the application location (re)selection decision. Such a (re)location decision is made when the SMF performs UP path (re)selection.

Embodiments of the present invention may be applied to IMS services or IMS applications. When the IMS media between two UEs (e.g. for voice/video call) does not need to traverse the IMS media plane, an IMS server may act as the AF and request direct P2P traffic be routed without involving the IMS media plane (i.e. without involving any application server or application location). The P2P traffic in this case may be bridged prior to traversing the IMS media plane. If the IMS media is required to traverse the IMS media plane (e.g. for some special IMS-related functionalities), the IMS server may request to have the P2P traffic routed via the application servers (e.g. IMS media servers). The application servers are deployed close to the edge of the serving PLMN. If the required IMS-related functionalities are provided natively by UPF, then direct P2P traffic routing may be sufficient. The IMS server may determine which type of P2P traffic routing is required. The application server/location interconnection information may include the IMS media plan topology information, e.g. indicative of how the media servers are interconnected.

The P2P UP optimization capabilities as described herein are applicable to scenarios for which two UEs are both being served by the same PLMN. The serving PLMN may or may not be the HPLMN of one or both of the two UEs.

In some embodiments, the serving call session control function (S-CSCF) of one of the two peer UEs may act as AF, initiating the AF influence on traffic routing as described in 3 GPP TS 23.501 v15.0.0, clause 5.6.7. If the S-CSCF is in the serving PLMN of the UE, the S-CSCF may act as the AF. If it is not, the S-CSCF may interact with a proxy call session control function (P-CSCF) in the visited IMS, which then act as the AF on behalf of the S-CSCF to initiate the AF influence.

In some embodiments, each S-CSCF individually performs AF influence operations, but indicates the correlation to the other AF influence. This is so that the two AF influences are considered jointly for UP management. In some embodiments, multiple S-CSCFs can interact to exchange AF transaction ID information for use in correlation operations. In the PLMN, the PCF or the SMF may be preconfigured with the interconnection information for some or all of the application servers/locations.

In some embodiments, the S-CSCFs of the UEs that have P2P traffic may interact to exchange application service location information (whether or not application servers are to be utilized or visited, and which application servers are suitable candidates). One of the S-CSCFs then initiates the AF influence using the information. In some embodiments, the interconnection information for interconnecting these application servers may be preconfigured in the two S-CSCFs. This mitigates the need to exchange such interconnection information dynamically.

Embodiments of the present invention may be applied to support vehicle-to-everything (V2X) communication, which has been proposed previously and which can be based on wireless local area networking. V2X can, for example, be used to support vehicle platooning. In platooning, vehicles are grouped into coordinated platoons, for example which accelerate and brake together to maintain inter-vehicle distance. Peer-to-peer communication bridging can be used to support and potentially streamline the communication between multiple vehicles in this case.

In the V2X vehicle platooning use case, as mentioned above, the head vehicle may need to perform vehicle-to-vehicle (V2V) communication with the other vehicles in the platoon. This may be required to instruct the other vehicles to apply braking or accelerate in order to maintain a nominal inter-vehicle distance and to avoid collision or to maintain fuel efficiency. Such delay-sensitive V2V communication may occur dynamically in a one-to-many manner (asymmetric communication). If the direct wireless communication link between vehicles is not available or is available only to part of the platoon, the V2V communication may need to traverse the network infrastructure (core network). Even if the direct wireless communication link between vehicles is available, the V2V communication via the infrastructure may take place in parallel to ensure reliability. Efficient user plane paths are needed in order to meet the delay requirements of this use case.

Embodiments of the present invention therefore correlate the PDU Sessions of the platoon vehicles to perform joint UP path optimization for the correlated PDU Sessions. For example, this may involve selecting a common UPF for these PDU Sessions. This can be realized through enhancements to the AF influence on traffic routing described in 3 GPP TS 23.501 v15.0.0, clause 5.6.7. Correlated PDU sessions and the associated bridging has been described previously herein.

In some such embodiments, the AF (which may be a V2X application controller) makes a request to correlate the PDU Sessions of a group of UEs. The AF may indicate which UE is the primary UE or the group head (e.g. the head vehicle in the platooning use case). The AF request is sent to the PCF, which accordingly generates polices sent to the SMF(s) serving the PDU Sessions. The SMFs jointly operate through interaction to (re)select UP paths for the PDU Sessions to provide for path efficiency between the UEs.

Figure 12A:
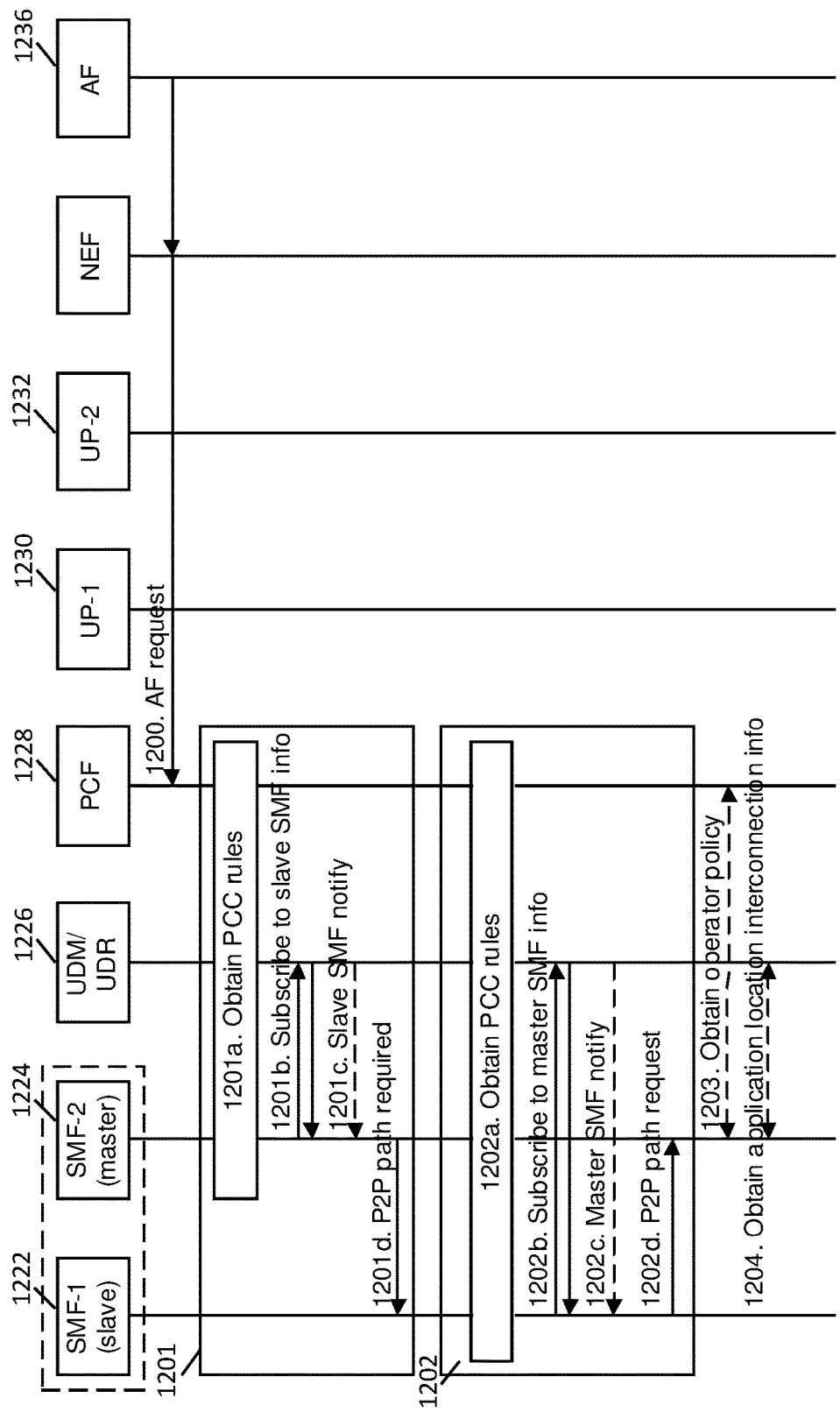
FIGS. 12A and 12B illustrates a call flow for implementing joint UP path optimization involving multiple cooperating master and slave SMFs.
Figure 12B:
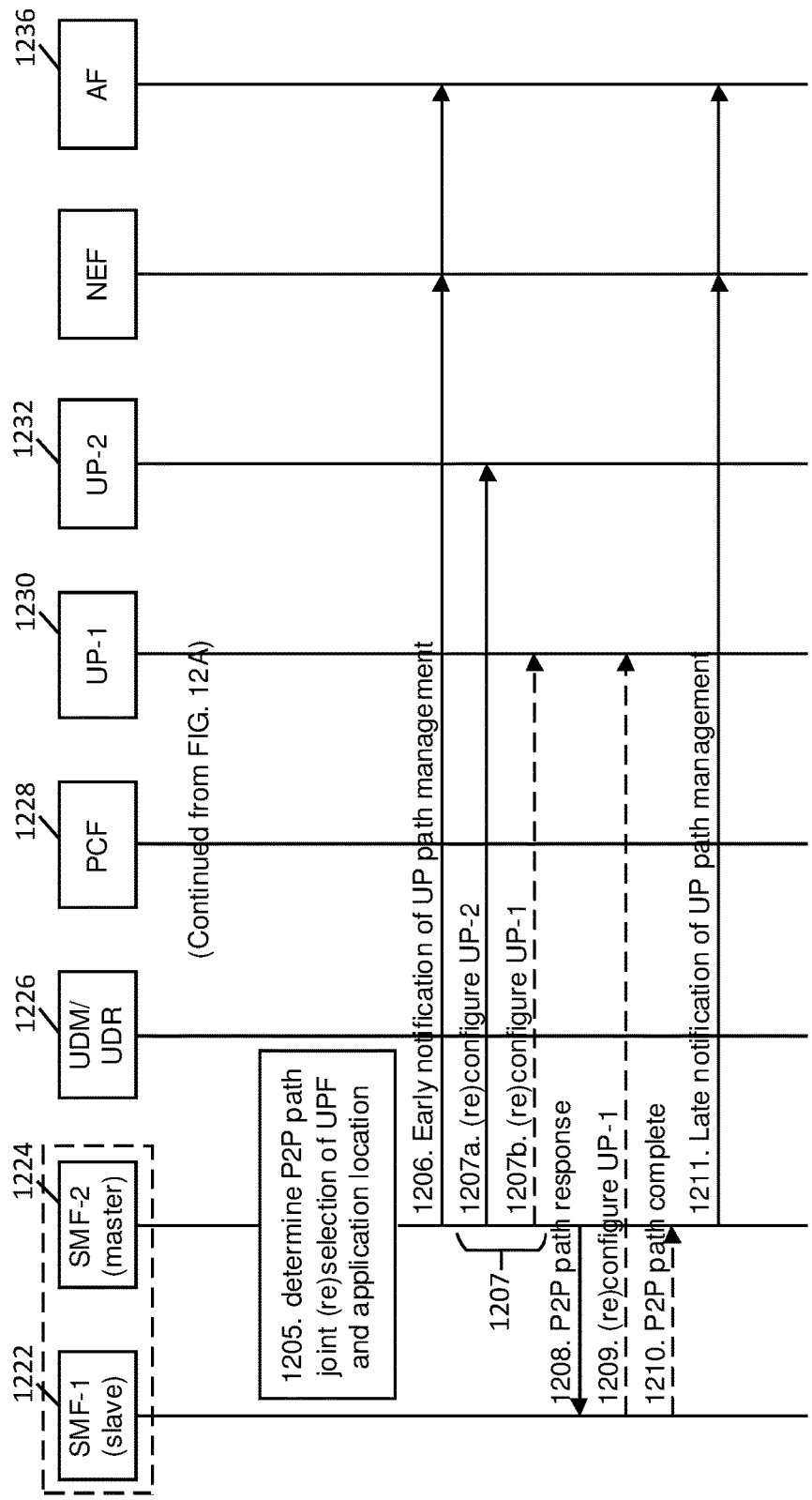

FIGS. 12A and 12B illustrate call flows related to joint UP path optimization, according to embodiments of the present invention, such as embodiments supporting V2X vehicle platooning.

In some embodiments, for the joint UP path optimization, a single, common SMF manages the PDU Sessions. In some such embodiments, a UE includes an application ID in its session request. The application ID indicates the application that the PDU Session is to be used for, e.g. a V2X vehicle platooning application. The AMF selects the appropriate SMF according to the application ID, S-NSSAI, and UE group information and operator policy. The S-NSSAI is provided by the UE (along with the application ID) in the session request. The UE group information is obtained by the AMF from the UDM by providing the UE identify information to the UDM. The operator policy is obtained from the PCF. If the operator policy indicates a particular SMF is to be selected, that SMF is accordingly selected. If the operator polices does not indicate any particular SMF, the AMF selects an SMF and informs the PCF of the identity of the selected SMF. This information will be provided to other AMFs as part of operator policy so that the same SMF is selected for the relevant PDU Sessions.

The common SMF obtains polices (indicating correlation of PDU Sessions) from the PCF, jointly optimizes the UP paths of the correlated PDU Sessions, and configures direct traffic steering/routing between the UP paths to enable asymmetric communication. The traffic steering/routing can be configured so as to enable multicasting or anycasting. In case of multicasting, the UL traffic is steered/routed to all the other UP paths. In case of anycasting, the UL traffic is steered/routed to any selected one of the other UP paths. In some embodiments, the UL traffic may be steered/routed to selected multiple UP paths. Which UP paths the UL traffic is steered/routed to can be dynamically updated by the PCF through the SMF, or by the SMF according to current loading in the network, or according to destination UE mobility, or both.

In some embodiments, for the joint UP path optimization, multiple SMFs cooperate to manage the correlated PDU Sessions. In a first embodiment for multiple cooperating SMFs, the SMF associated with the primary UE or the head UE (e.g. in the V2X platooning case) acts as master SMF, while the other SMFs act as slave SMFs. Slave SMFs hand over UP path selection tasks to the master SMF. The handover may be a full handover such that the master SMF becomes the serving SMF. Alternatively, the handover may hand over the decision making task to the master SMF, to provide for a single decision making point, while other tasks such as configuring UPF are still carried out by the slave SMFs. An identification of which UE is the head UE or the primary UE can be indicated by the AF in the AF request. The SMF associated with the primary or head UE may be the SMF that is serving the traffic of that UE, as identified in the AF request.

The AF request includes an identification of the UE to which the AF request is related, the traffic (of the UE) to which the AF request is related, or both. PDU Session(s) can be identified based on this information in the AF request. Embodiments of the present invention comprise correlating the identified PDU Session(s) for joint UP optimization.

In some embodiments, the PCF directly indicates which of a plurality of SMFs is to function as a master SMF, and optionally SMFs which are to function as slave SMFs. In other embodiments, the PCF indirectly indicates which SMF is to function as master SMF. For example, the PCF may indicate that a particular UE is a primary UE (e.g. the head UE in a platooning application). The SMF which is managing the PDU session associated to the traffic of the primary UE as defined in the AF request is then automatically determined and selected as the master SMF.

FIGS. 12A and 12B illustrates a call flow for implementing the above-mentioned embodiment for joint UP path optimization involving multiple cooperating SMFs, in particular where a first SMF (SMF-1 1222) acts as slave SMF and a second SMF (SMF-2 1224) acts as master SMF. The operations illustrated in FIGS. 12A and 12B are described as follows. In operation (1200), the AF 1236 sends the AF request to the PCF 1228. The AF request includes PDU Session correlation information, as described elsewhere herein. The AF request may indicate which UE is to be considered the primary UE. The PDU Session associated to the traffic of indicated primary UE specific in the AF request is considered the primary PDU Session. The PCF 1228 may consider the serving SMF of this primary PDU Session as master SMF. The PCF generates PCC rules based on the content in the AF request.

In operation (1201), The PCF 1228 provides PCC rules, related to the AF request, to the master SMF (SMF-2 1224). Operation (1201) includes the following sub-operations. In sub-operation (1201*a*), the master SMF 1224 obtains the PCC rules from the PCF 1228. The PCC rules include the PCC rules generated based on the AF request in operation (1200). This may occur during PDU Session establishment, when the SMF obtains operator policies from the PCF. This may also occur in the form of policy update notification during PDU Session modification. For example, this may happen when the master SMF 1224 interacts with the PCF 1228 to obtain P2P traffic related policy upon being informed about P2P traffic detection by a UPF. The master SMF 1224 may then apply the PCC rules to optimize the P2P user plane path as part of PDU Session modification.

How the UPF detects P2P traffic is described elsewhere herein. How the PCC rules are obtained by the master SMF 1224 may depend on whether or not the primary PDU Session has already been established when the AF request (for PDU Session correlation) arrives. In sub-operation (1201*b*), the master SMF 1224 subscribes to receive slaving SMF information from the UDM 1226. The UDM 1226 maintains the information of serving SMF of any given PDU session. The slave SMF 1222 is the serving SMF of a non-primary PDU Session correlated to the primary PDU Session. The master SMF 1224 provides the slave UE (i.e. non-primary UE or non-head UE) identity information (e.g. IP address, GPSI, etc.), application ID, S-NSSAI, DNN, or any combination of them, which is received from the PCF 1228 as part of the PCC rule in operation (1201*a*), to the UDM for subscription. In sub-operation (1201*c*), the UDM 1226 notifies the master SMF 1224 about the information of slave PDU Session and the slave SMF 1222. The notification may include, for example, the SMF identifier or the address of the slave SMF 1222, identifier of the slave PDU Session. In sub-operation (1201*d*), the master SMF 1224 indicates to the slave SMF 1222 that P2P path optimization is required, or alternatively indicates that SMF relocation or PDU Session handover is required, for the slave PDU Session. The indication may indicate whether full relocation or handover, or alternatively partial relocation or handover, is required and the identifier of slave PDU Session or the UE IP address.

In operation (1202), the slave SMF 1222 initiates SMF relocation, PDU Session handover, or a combination thereof. Operation (1202) includes the following sub-operations. In sub-operation (1202*a*), the slave SMF 1222 obtains the PCC rules from the PCF 1228. This may occur during PDU Session establishment, when the SMF obtains operator policies from the PCF. This may also occur in the form of policy update notification during PDU Session modification. How the PCC rules are obtained may depend on whether or not the slave PDU Session has already been established when the AF request arrives. In sub-operation (1202*b*), the slave SMF 1222 subscribes to receive master SMF information from the UDM 1226. The master SMF 1224 is the serving SMF of the primary PDU Session. The slave SMF 1222 provides the master UE identity information (e.g. IP address, GPSI, etc.) to the UDM 1226 for subscription. In sub-operation (1202*c*), the UDM 1226 notifies the slave SMF 1222 of information indicative of the master SMF 1224. This may include the SMF identifier or the address of the SMF. In sub-operation (1202*d*), the slave SMF 1222 indicates to the master SMF 1224 that P2P path optimization is requested, or indicates that SMF relocation or PDU Session handover is requested. The slave SMF 1222 may indicate whether full relocation or handover, or alternatively partial relocation or handover, is required. In sub-operation (1202*d*), the slave SMF 1222 may provide the UP information (such as which UPFs are part of the UP and how they are interconnected) of the slave PDU Session to the master SMF 1224. In the case of full SMF relocation or PDU Session handover, the slave SMF 1222 may provide complete context information of the slave PDU Session to the master SMF 1224 in sub-operation (1202*d*).

Operation (1202) may be triggered by operation (1201). For example, operation (1202) may proceed in response to sub-operation (1*d*) occurring. In that case, sub-operations (1202*a*), (1202*b*), and (1202*c*) are optional and may be omitted. If operation (1202) is not triggered by operation (1201), sub-operations (1202*a*), (1202*b*), (1202*c*) may be needed. In more detail, sub-operations (1202*b*) and (1202*c*) may be used for discovering the master SMF and primary PDU session, similar to sub-operations (1201*b*) and (1201*c*) (which are for discovery of slave SMF and slave PDU Session). The PCC rules obtained in sub-operations (1201*a*) and (1202*a*) may be the PCC rules generated based on the AF request for PDU Session correlation in operation (1200).

In operation (1203), the master SMF 1224 obtains operator policies from the PCF 1228. This step may be used to validate the SMF relocation/PDU Session handover requested in operation (1202). Operation (1203) is optional if the master SMF 1224 has already obtained valid operator policy (i.e. PCC rules), for example, through the operation (1201*a*) or configuration from the OAM system. In operation (1204), the master SMF 1224 obtains information indicative of interconnection between application locations and cost, quality (such as QoS performance or parameters), and/or weight associated to the interconnection from the UDM 1226 or UDR. This step is optional if the operator policy (i.e. PCC rules) generated based on the AF request in operation (1200) indicates that the P2P path does not need to involve application location. In operation (1205), the master SMF 1228 determines (e.g. selects or reselects) the P2P path, possibly including the applications (e.g. required application servers in selected locations).

In operation (1206), the master SMF 1224 notifies the AF 1236 of the application location(s) selected in the P2P path if the AF request in operation (1200) indicates subscription for such a notification. This is an early notification as it happens before the P2P path is configured. In operation (1207), the master SMF configures the P2P path. Operation (1207) includes the following sub-operations. In sub-operation (1207*a*), the master SMF 1224 configures (or initiates configuration of) UP-2 1232, including the traffic steering behavior at UPFs in UP-2. In sub-operation (1207*b*), the master SMF 1224 configures or initiates configuration of) UP-1 1230, including the traffic steering behavior at UPFs in UP-1. Sub-operation (1207*b*) is optional if the master SMF is not capable of configuring UP-1 (e.g. if the master SMF is in a different administrative domain and not authorized to do such configuration) or if the slave SMF does not fully hand over the slave PDU Session to the master SMF (i.e. full relocation of serving SMF for the slave PDU Session).

In operation (1208), the master SMF 1224 notifies the slave SMF 1222 of the P2P path decision (e.g. which UPF(s) are to be added in or removed from UP-1 1230, which application location the UP-1 is connect to (if any) and connected through which UPF, which UPF in UP-1 connects to UP-2) related to UP-1. The master SMF 1224 may inform the slave SMF 1222 regarding whether the UP-1 configuration has been done (i.e. whether sub-operation (1207*b*) has been performed). In operation (1209), the slave SMF 1222 configures the UP-1 1230, including the traffic steering behavior at UPFs in the UP-1, if this has not yet been performed (e.g. as indicated in operation (1208)). In operation (1210), the slave SMF 1222 informs the master SMF 1224 that the UP-1 configuration is completed. This operation (1210) is optional if the configuration of UP-1 is performed by the master SMF 1224 in operation (1207*b*). In operation (1211), the master SMF 1224 notifies the AF 1236 of the application location(s) selected in the P2P path if the AF request in operation (1200) indicates subscription for such a notification. This is a late notification.

In a second embodiment supporting multiple SMFs cooperating to manage PDU sessions for joint UP path optimization, the PCF directs the joint UP optimization. This may be performed for example in support of direct routing. The PCF selects or reselects the PSAs (PDU Session Anchors) of each of the correlated PDU Sessions that are used to connect the UP paths of the correlated PDU Sessions and informs each of the involved SMFs (the serving SMFs of the correlated PDU Sessions) of the selection or reselection. The SMFs optimizes UP paths for the correlated PDU Sessions served by them according to the PCF-selected PSAs, and configure traffic steering at the PSA to enable direct traffic routing between the UP paths. In the prior art, PSA is typically a UPF that connects the UP path to data network. However, in embodiments of the present invention, when two UP paths are connected directly (direct routing), a PSA of one UP is connected to a PSA of the other UP or shared by the other UP as common PSA. In this case, the PCF monitors the location of the relevant UE (specified in the AF request) and has an indication of the UP topology. That is, the PCF has knowledge of UP topology (e.g. how UPFs are interconnected to each other and associated interconnection cost or performance such as delay, throughput). In some embodiments, PCF relocation may be performed in order to provide a common PCF across multiple PDU Sessions.

In some embodiments, to support indirect routing (i.e. via DN or application location) rather than direct routing (without involving DN or application location), the PCF selects or reselects application locations for the correlated PDU Sessions, rather than selecting or reselecting the PSAs in direct routing case. Then, the SMFs optimizes UP paths according to the PCF-selected application location(s).

Figure 13:
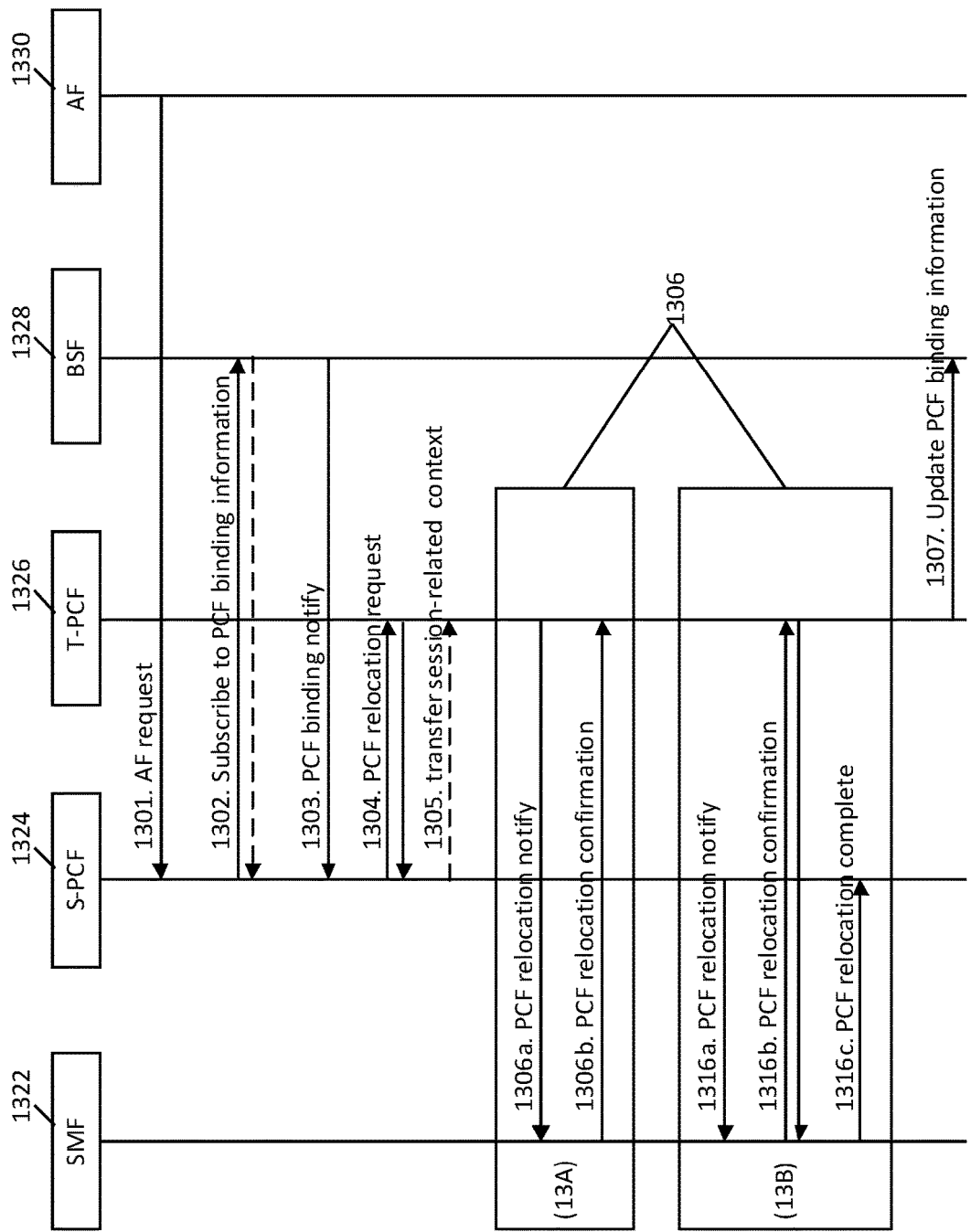
FIG. 13 illustrates PCF relocation operations triggered by a source PCF, according to embodiments of the present invention.

FIG. 13 illustrates a procedure for PCF relocation, according to embodiments of the present invention, in which the source PCF (S-PCF) 1324 triggers the PCF relocation to a target PCF (T-PCF) 1326. The call flow illustrated in FIG. 13 proceeds as follows. In operation (1301), the AF 1330 sends an AF request (for PDU Session correlation/P2P UP optimization purpose) to the core network (e.g. 5 GC). The AF request is transported to the current serving PCF (S-PCF) 1324 of the PDU Session related to the AF request. In operation (1302), the S-PCF 1324 identifies that the AF request is related to a peer PDU Session whose UE is identified using an IP address or some other identifier such as a GPSI (Generic Public Subscription Identifier). The S-PCF 1324 also identifies that the peer PDU Session (or the associated UE) is the primary PDU Session (e.g. associated with the primary UE or head UE). The S-PCF 1324 subscribes to receive the serving PCF of that peer PDU Session by providing the IP address or the UE identifier to a Binding Selection Function (BSF) 1328. The BSF 1328 maintains the information binding between PCF and PDU Session, i.e. indicating which PCF is serving which PDU Session. The S-PCF 1324 may also provide the S-NSSAI and/or DNN and/or application ID (included in the AF request) to the BSF 1328. In operation (1303), the BSF 1328 notifies the S-PCF 1324 regarding the PCF binding information, which indicates the serving PCF of the peer PDU Session (i.e. the T-PCF 1326). For example, the indication may include the network (e.g. IP) address of T-PCF or the identifier of the T-PCF. In the case that the peer PDU Session has not yet been established, (and thus the T-PCF is not known yet), the binding information may not be provided immediately after operation (1302). However, in this case the binding information is provided at a later time To clarify, from the SMF point view, PCF relocation refers to a reselection of the PCF. The reselection target is provided by the T-PCF 1326 or S-PCF 1324. For the S-PCF point of view, PCF relocation is a relocation in which the PDU Session is handed over to the T-PCF.

In operation (1304) of FIG. 13, the S-PCF 1324 indicates to the T-PCF 1326 (via a request for PCF relocation) that PCF relocation is needed or requested. The PCF relocation involves the PDU Session (i.e. the PDU session related to the AF request in operation (1301) and being served by the S-PCF) being handed over from the S-PCF to the T-PCF. In this operation, the S-PCF may provide the session related context to the T-PCF. In operation (5), if the session related context was not provided to the T-PCF in operation (1304), the S-PCF 1324 provides this context the T-PCF 1326. Otherwise operation (1305) can be omitted. In operation (1306), the SMF 1322 reselects the T-PCF 1326 as the serving PCF. In operation (1307), the T-PCF 1326 passes a message to the BSF 1328 in relation to updating the PCF binding information, i.e. to indicate to the BSF 1328 that the T-PCF 1326 is now the serving PCF of the PDU Session.

Operation (1306) of FIG. 13 can proceed either as indicated in routine (13A) or routine (13B), as marked in FIG. 13. In the case of routine (13A), the T-PCF 1326 initiates the reselection of the T-PCF as the serving PCF, whereas in the case of routine (13B), the S-PCF initiates the reselection. Routine (13A) proceeds as follows. In sub-operation (1306a), the T-PCF 1326 transmits a notification message to the SMF 1322 indicative of the PCF relocation for the PDU session. The notification may include any of the ID of the PDU session, UE IP address allocated for the PDU Session, the identifier of T-PCF and the network address (e.g. IP address) of the T-PCF. Then, the SMF 1322 reselects the T-PCF 1326 as the serving PCF of the PDU Session. The SMF 1322 may locally update that the T-PCF is the serving PCF of the PDU session, and the T-PCF may provide the identifier of the T-PCF and/or the network address of the T-PCF to the SMF. In sub-operation (1306b), the SMF 1322 responds to the T-PCF 1326 with a message confirming the PCF relocation. The confirmation may indicate that the SMF has taken the T-PCF as the serving PCF of the peer PDU Session. The T-PCF will subsequently interact with the SMF as the serving PCF of the PDU Session.

Routine (13B) proceeds as follows. In sub-operation (1316a), the S-PCF 1324 transmits a notification message to the SMF 1322 indicative of the PCF relocation. The notification may include any of the PDU Session ID, UE IP address allocated for the PDU Session, and information indicative of the T-PCF identity (e.g. network address or identifier of the T-PCF). Then, the SMF reselects the T-PCF as the serving PCF of the PDU Session. In sub-operation (1316b), the SMF 1322 messages the T-PCF 1324 with a message confirming the PCF relocation. As above, the confirmation may indicate that the SMF has taken the T-PCF as the serving PCF of the peer PDU Session and the T-PCF will subsequently interact with the SMF as the serving PCF of the PDU Session. The T-PCF records the mapping between the PDU session and the SMF. In sub-operation (1316c), the SMF 1322 notifies the S-PCF 1324 that the PCF relocation has been completed.

Figure 14:
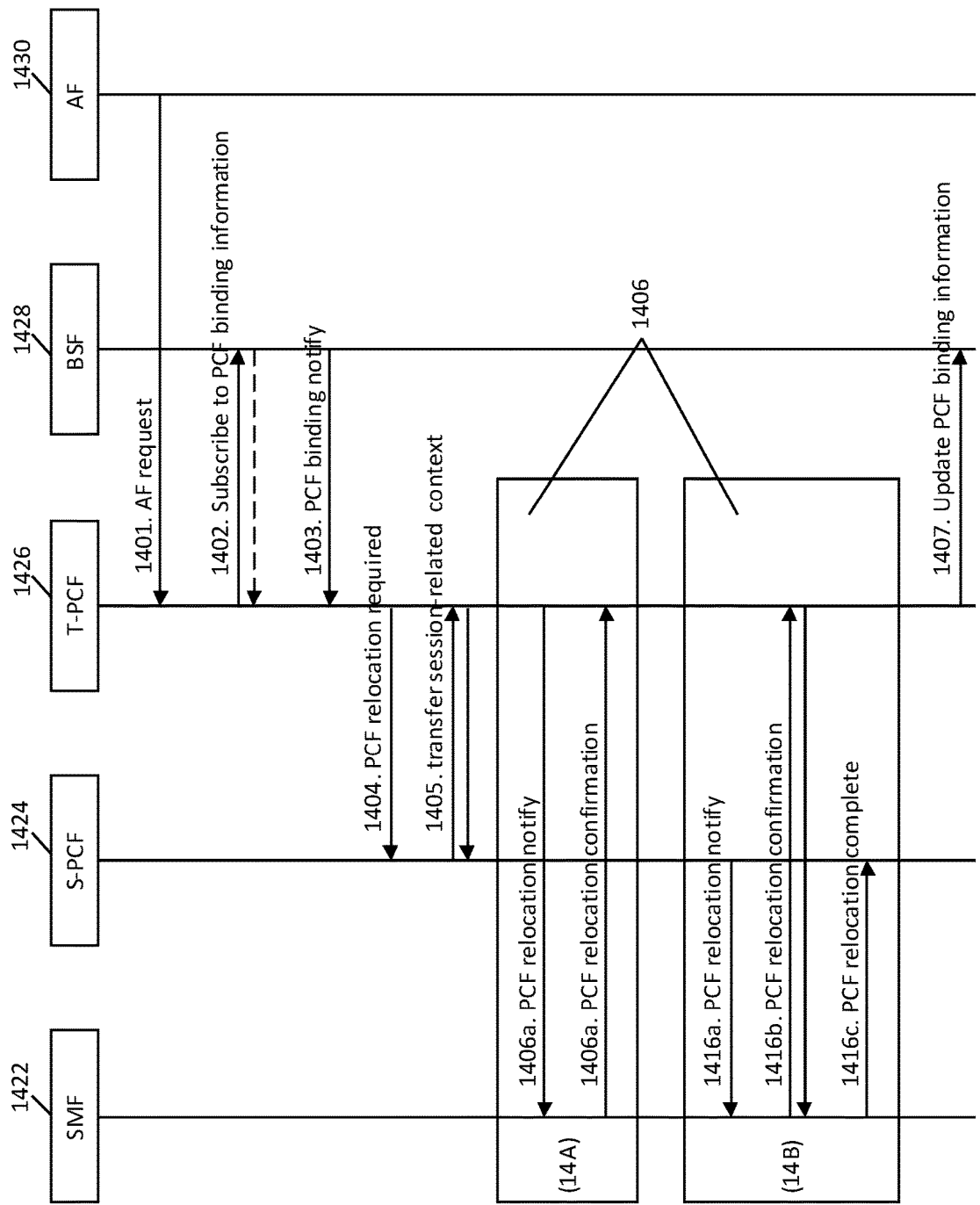
FIG. 14 illustrates PCF relocation operations triggered by a target PCF, according to embodiments of the present invention.

FIG. 14 illustrates another PCF relocation procedure, in which the T-PCF triggers the S-PCF to perform the relocation, according to another embodiment of the present invention. FIGS. 13 and 14 together illustrate PCF relocation as triggered by either the S-PCF or the T-PCF. The procedures in each of FIGS. 13 and 14 allow for alternatives such that either the S-PCF or the T-PCF can initiate a reselection part of the procedure.

The call flow illustrated in FIG. 14 proceeds as follows. Various details in FIG. 14 may be the same as in FIG. 13. In operation (1401), the AF 1430 sends an AF request (for PDU Session correlation/P2P UP optimization purpose) to the core network (e.g. 5 GC). The AF request is transported to the current serving PCF (T-PCF) of the primary PDU Session related to the AF request. This PCF will be the target PCF of PCF the relocation. In operation (1402), the T-PCF 1426 identifies that the AF request is related to a peer PDU Session whose UE is identified using an IP address or some other identifier such as a GPSI. The T-PCF 1426 also identifies that the peer PDU Session (or the associated UE) is the primary PDU Session (or primary UE or head UE). The T-PCF 1426 subscribes to receive the serving PCF of that peer PDU Session by providing the IP address or the UE identifier to a Binding Selection Function (BSF) 1428. The T-PCF may also provide the S-NSSAI and/or DNN and/or application ID (included in the AF request) to the BSF. In operation (1403), the BSF 1428 notifies the T-PCF 1426 regarding the PCF binding information, which indicates the serving PCF of the peer PDU Session (i.e. the S-PCF). For example, the indication may include the network (e.g. IP) address of S-PCF or the identifier of the S-PCF. In the case that the peer PDU Session has not yet been established, (and thus the S-PCF is not known yet), the binding information may not be provided immediately after operation (1402). However, in this case the binding information is provided at a later time.

In operation (1404) of FIG. 14, the T-PCF 1426 indicates to the S-PCF 1424 (via a PCF relocation request) that PCF relocation is needed or requested. The PCF relocation involves the peer PDU Session being handed over from the S-PCF 1424 to the T-PCF 1426. In operation (1405), the S-PCF 1424 hands over the peer PDU session to the T-PCF 1426. This may involve providing the session related context to the T-PCF. In operation (1406), the SMF 1428 reselects the T-PCF 1426 as the serving PCF of the peer PDU session. In operation (1407), the T-PCF 1426 passes a message to the BSF 1428 in relation to updating the PCF binding information.

Operation (1406) of FIG. 14 can proceed either as indicated in routine (14A) or routine (14B), as marked in FIG. 14. In the case of routine (14A), the T-PCF 1426 initiates the reselection of the T-PCF as the serving PCF, whereas in the case of routine (14B), the S-PCF 1424 initiates the reselection. Routine (14A) proceeds as follows. In sub-operation (1406*a*), the T-PCF 1426 transmits a notification message to the SMF 1422 indicative of the PCF relocation for the peer PDU session. The peer PDU session is the session currently being served by the S-PCF (and related to the AF request in operation (1401)) and which is to be relocated to the T-PCF. The notification may include any of the ID of the PDU session, UE IP address allocated for the PDU Session, the identifier of T-PCF and the network address (e.g. IP address) of the T-PCF. Then, the SMF 1422 reselects the T-PCF as the serving PCF of the (peer) PDU Session. The SMF may locally update that the T-PCF is the serving PCF of the (peer) PDU session, and the T-PCF may provide the identifier of the T-PCF and/or the network address of the T-PCF to the SMF. In sub-operation (1406*b*), the SMF 1422 responds to the T-PCF 1426 with a message confirming the PCF relocation. The confirmation may indicate that the SMF has taken the T-PCF as the serving PCF of the peer PDU Session. The T-PCF will subsequently interact with the SMF as the serving PCF of the (peer) PDU Session. Afterward, the SMF uses the T-PCF as the serving PCF of the peer PDU Session.

Routine (14B) proceeds as follows. In sub-operation (1416*a*), the S-PCF 1424 transmits a notification message to the SMF 1422 indicative of the PCF relocation for the peer PDU session. The notification may include any of the PDU Session ID, UE IP address allocated for the PDU Session, and information indicative of the T-PCF identity (e.g. network address or identifier of the T-PCF). Then, the SMF 1422 reselects the T-PCF as the serving PCF of the PDU Session. In sub-operation (1416*b*), the SMF 1422 messages the T-PCF 1426 with a message confirming the PCF relocation. As above, the confirmation may indicate that the SMF has taken the T-PCF as the serving PCF of the peer PDU Session and the T-PCF will subsequently interact with the SMF as the serving PCF of the PDU Session. The T-PCF records the mapping between the PDU session and the SMF. In sub-operation (1416*c*), the SMF 1422 notifies the S-PCF 1424 that the PCF relocation has been completed.

FIGS. 13 and 14 support relocation of the role of serving PCF for a PDU Session, from a source PCF to a target PCF. This may be performed for example in response to an AF request, and may be performed as part of a path optimization, for example. The AF request may indicate which UE (or PDU Session) is the primary UE (or primary PDU Session), and may thereby indicate which PCF is to be master PCF. This may be performed similarly to the master SMF concept in other embodiments such as the embodiment illustrated in FIGS. 12A and 12B. The master PCF may be considered the target PCF in PCF relocation for PDU Sessions of non-primary UEs (or non-primary PDU Sessions) specified in the AF request. The AF request can be received at either the source PCF or target PCF, and that receiving PCF may trigger the relocation. PCF relocation may be used for example to allow a master (target PCF) to act as a single decision making point and generate or provide policy decisions (in the form of PCC rules) for multiple PDU Sessions jointly. The policy decisions are provided to the serving SMFs of those PDU Sessions.

In some embodiments, and by way of example, PCF relocation may comprise using a BSF to monitor for and provide PCF binding information, and to perform the relocation only upon receiving the PCF binding information. In various embodiments, the PCF relocation operation is coordinated with other associated operations, such as the relocations of other PCFs involved in the same P2P session (or the same P2P path undergoing optimization). In this case, the PCF relocation can be prepared but not implemented until a specified time, for example upon receiving confirmation that other associated operations have also been performed, or are to be performed at the specified time. Multiple operations including the relocation operation (e.g. multiple PCF relocations) can be coordinated and performed concurrently, by waiting for confirmation that all the different operations are ready to be performed, triggering the relocation operations so that they are performed concurrently after such confirmation is received.

In some embodiments, the NEF (network capability exposure function) may select a PCF as master PCF if the NEF is used for transporting the AF request from the AF to the PCF. This may provide an alternative way to determine a primary or master PCF, rather than relying on an indication, in the AF request, of a primary UE or primary PDU Session. When the NEF selects the PCF in this manner, the information (e.g. identifier or network address (e.g. IP address) of the NEF-selected master PCF) can be provided by the NEF to the PCF together with the content of the AF request. The PCF may then associate that PCF information with the PCC rules generated based on the content of the AF request. Alternatively, the information may be included in the PCC rules. Subsequently, the S-PCF or the T-PCF may trigger PCF relocation as described for example in FIG. 13 or 14, according to the master PCF information as specified in the PCC rules.

Figure 15:
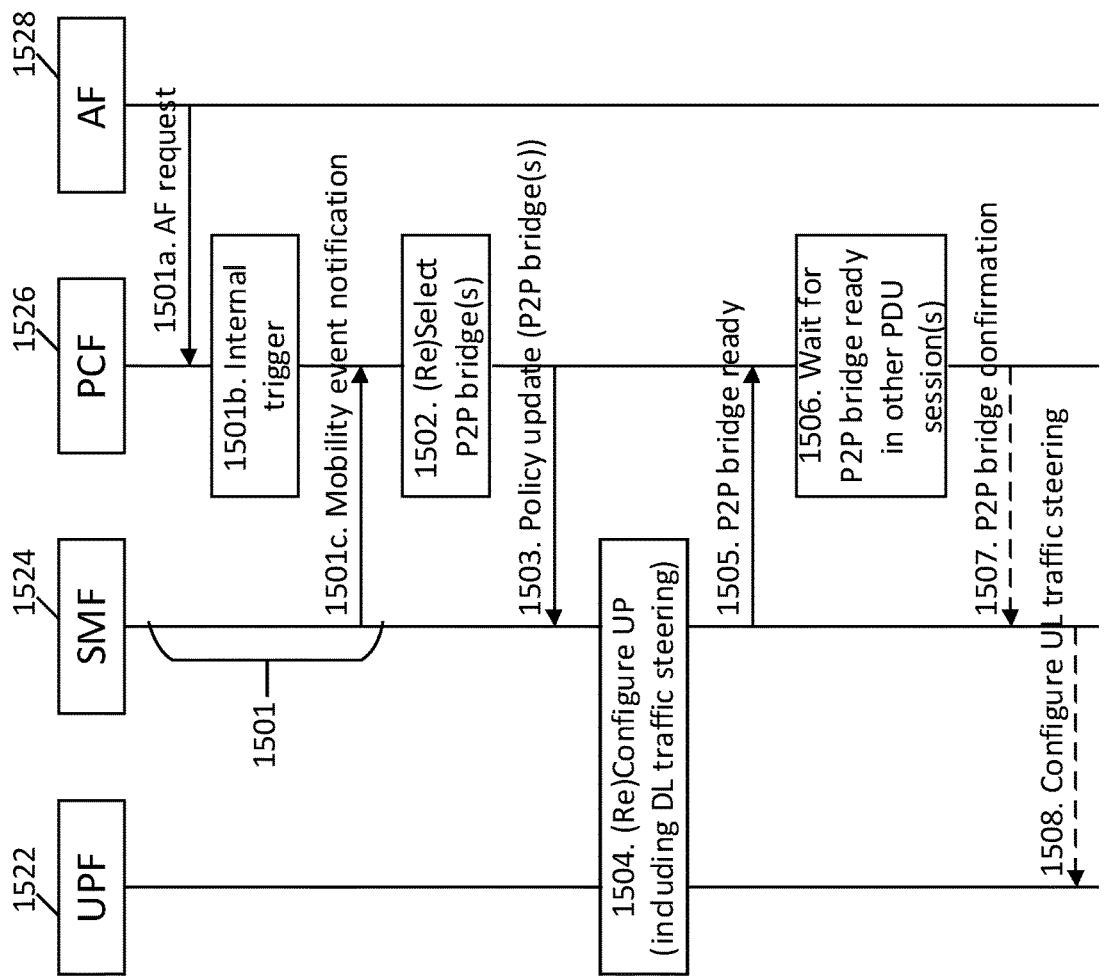
FIG. 15 illustrates P2P path optimization, according to an embodiment of the present invention.

FIG. 15 illustrates P2P path optimization, according to an embodiment of the present invention. The call flow illustrated in FIG. 15 proceeds as follows. In operation (1501), the PCF 1526 receives trigger for optimizing a P2P path. Operation (1501) can comprise one or more alternative triggers, illustrated as sub-operations (1501*a*), (1501*b*), and (1501*c*). Therefore, one or two of these sub-operations can be omitted in some embodiments. In more detail, in sub-operation (1501*a*), the trigger is received as an AF request, which is transported to the PCF from the AF 1528 via the NEF and/or UDR, for example. The AF request may be a new AF request or an update to an existing AF request. The AF request may be a request for PDU Session correlation for P2P path optimization as described elsewhere herein. Embodiments of the present invention comprise transmitting, receiving, or handling the AF request, or a combination thereof. In sub-operation (1501*b*), an internal trigger such as overloading or failure event trigger related to the UPF or application location occurs. In sub-operation (1501*c*), a UE mobility event occurs, and, when the PCF subscribes to UE mobility events, the SMF 1524 notifies relevant events to the PCF 1526. For example, the UE mobility event may be triggered when the UE moves in or out of an area of interest specified by the PCF, and the notification may indicate same. In some embodiments, the mobility event notification may be sent from the AMF, for example, when the PCF subscribe to such notification from the AMF. FIG. 15 illustrates use of a master PCF for jointly generating policies for correlated PDU Sessions to facilitate P2P path optimization.

In operation (1502) of FIG. 15, the PCF 1526 selects or reselects the P2P bridges for use in supporting one or more correlated PDU Sessions. P2P bridge selection is described in detail elsewhere herein. The PDU session correlation information is provided by the AF 1528 through an AF request, which may be the AF request in operation (1501) or an AF request received by the PCF at an earlier time. A P2P bridge connects the UPs of two or more correlated PDU sessions. The P2P bridge may be a node bridge or a link bridge. In the case of node bridge, the P2P bridge may comprise a UPF that is shared by the two or more UPs or an application location that is shared by the two or more UPs. In the case of a link bridge, the P2P bridge may comprise a link between two UPFs, one from each of the UPs, or a link between two application locations, one for each UP path of the two or more PDU sessions. Whether the bridge should be a bridge defined by UPF(s) or a bridge defined by application location(s) may depend on requirements or indications provided by the AF. If the AF 1528 indicates (in the AF request) that a UPF-based bridge is to be used, the PCF will (re)select UPF-based bridge for the correlated PDU sessions. If the AF indicates (in the AF request) that an application location based bridge is to be used, the PCF will (re)select application location based bridge by the correlated PDU Sessions. Selection of the bridge type and bridge(s) of the type to use may be performed as part of Operation (1502). This selection may be based on the UE location information (e.g. notified to the PCF 1526 in operation 1501*c*) the application location interconnection information provided by the AF 1528 and/or the UP topology information. Application location interconnection information and UP topology information have described elsewhere. Operation (1502) may involve one or a plurality of application servers. For example, the P2P bridge may be traverse one or more application servers which are used in supporting the P2P communication.

As will be readily understood in view of the present disclosure, a P2P bridge may comprise a UPF commonly shared by UPs of the correlated PDU Sessions, a link between UPFs in UPs of correlated PDU Sessions, An application location shared by correlated PDU Sessions, a link between application locations of correlated PDU Sessions; in this case, the link is in the DN, or a combination thereof.

In operation (1503) of FIG. 15, the PCF 1526 provides the P2P bridge information to the relevant SMFs 1524 via a policy update message. The information may be provided in the form of PCC rules generated based on the content of AF request in operation (1501*a*). The policy update of operation (1503) may indicate, for each of one or more sessions, which bridges are to be used for each session. In operation (1504), the SMF 1524 performs UP (re)selection with respect to the P2P bridge information received from the PCF and other information such as defined in 3 GPP TS 23.501 v15.0.0, clause 6.3.3, and the configures the UP path, including the configuring/updating the traffic steering behavior of the UPF 1522, for example, for routing/delivering P2P DL traffic. In operation (1505), the SMF 1524 notifies the PCF 1526 that the UP and P2P bridge on the UP side is ready (e.g. for DL traffic). In operation (1506), the PCF 1526 waits for indications that the UP and P2P bridge on the UP side of one or more relevant peer PDU Session(s) is ready. Upon receiving such indications, in operation (1507), the PCF 1526 notifies the SMF 1524 that the P2P bridge is ready (e.g. for UL traffic). In operation (1508), the SMF 1524 configures/updates the traffic steering at the UPF, e.g. for supporting the UL P2P traffic.

The P2P bridge information provided in operation (1503) of FIG. 15 may include the information (e.g. ID or network address) indicative of a UPF related to the P2P bridge. This can be the UPF forming the bridge (in case of UPF based bridge) or connecting to the bridge (in case of application location based bridge). The information may include traffic steering information to be configured in the UPF for supporting the P2P bridge.

In case of UPF based bridge, tunneling may be applied on the bridge. In that case, the tunnel configuration related to the UPF may be provided as part of the bridge information to the relevant SMF, which then configures the tunnel configuration into the UPF.

Operations (1505), (1506), (1507) and (1508) in FIG. 15 are used to coordinate P2P bridging operation of SMFs and/or UPFs of multiple different UPs. For example, when a bridge between two or more UPs is to be established, set-up is performed for each UP. Upon confirming that the set-up has been completed for all UPs, traffic steering is performed in a manner which implements the bridging. This coordination is used to avoid one UP steering traffic toward a bridge prior to a UP on the other side of the bridge being fully configured to accept and handle the bridged traffic. PDU sessions may be managed independently by their own SMFs, and therefore such coordination may be necessary.

In view of FIG. 15, embodiments of the present invention provide for a PCF, or method of operating a PCF, in which the PCF performs P2P bridge selection, reselection, or both. The selected bridge can be created to connect two, three or more PDU sessions in a particular manner, and may also involve one or more application functions or application servers, service function chains, etc., where appropriate. The PCF may perform this function in support of an application, for example as indicated in an application function request. The AF may provide, to the PCF, an indication of two or more PDU sessions which are correlated. The PCF may, in response, initiate bridging between these PDU sessions or other joint path optimization. The PCF may further direct one or a plurality of SMFs, for example associated with different user planes and/or different PDU sessions, to implement one or more different parts of the selected bridge. This direction may be provided in the form of policy updates. The PCF may further coordinate bridging operation by waiting for confirmation that all the different parts of the selected bridge are ready, and triggering UPFs to perform traffic steering in support of bridging only after such confirmation is received. Implementation of traffic steering changes for multiple UPFs can thereby be performed concurrently.

Although operation of the PCF is described above with respect to bridging of correlated PDU sessions (with or without intermediating application servers), the PCF may more generally perform joint path optimization of the correlated PDU sessions. The AF may provide the correlation information, and the PCF may perform joint path optimization based on the provided information, and then direct implementation of the jointly optimized paths. The correlation information is passed from the AF to the PCF, and used for path configuration (and associated traffic steering configuration) by the SMF and UPF.

Embodiments of the present invention provide for an SMF which cooperates with the PCF as described above, and also as illustrated in FIG. 15. The SMF is configured to receive policy update information from the PCF, and to perform one or more of: selecting, reselecting, configuring and reconfiguring, of its managed UP based on the policy update. The selection, reselection, configuration or reconfiguration is in support of joint path optimization and/or bridging. The configuration or reconfiguration may involve directing an underlying UPF to perform traffic steering in order to implement the joint path optimization and/or bridging. The SMF may further be configured to notify the PCF when the configuration or reconfiguration is ready to implement, but to refrain from implementing the configuration or reconfiguration until a confirmation message is received from the PCF. Implementing the configuration or reconfiguration can then be performed (e.g. substantially immediately or at a specified future time) after receiving the confirmation message. Implementing the configuration or reconfiguration can involve directing the UPF to implement the previously configured traffic steering.

Further with respect to embodiments of the present invention, and control signal content in particular, information regarding interaction between SMFs may be provided. This information may be provided for example by one SMF to the other during such interaction. The information may include UP path information, UP path structural information, or both. The information may include bridge endpoint information, for example exchanged between SMFs. The information may include the traffic filtering information, traffic steering information, or both. In some embodiments, the traffic filtering information is sent only to the source SMF, or similarly only to SMFs expected to handle uplink traffic.

In various embodiments, for example with respect to FIG. 4, the NEF maps the information provided in the AF request to information used internally in the core network. The NEF may map the target PDU session information to the target PDU session ID by contacting a Network Repository Function (NRF) or unified data manager (UDM). In this case, the serving SMF of the target PDU session may accordingly register the mapping in the NRF or UDM. Additionally or alternatively, the NEF may map the source PDU session information to the source PDU session ID, for example in the case of an ongoing PDU session. This mapping may be performed by contacting the NRF or UDM. In this case, the serving SMF of the source PDU session may accordingly register the mapping in the NRF or UDM. In various embodiments, the NEF provides the mapped information to the PCF for use in generating PCC rules. The NEF may provide the information to the PCF for example via a unified data repository (UDR).

In some embodiments, the PCF provides an update of the PCC rules to the serving SMF of the source PDU session. The serving SMF can be identified via UDM or NRF, if not known to the PCF locally, using the source PDU session information. If the target UPF is not mapped by the NEF, the PCF can perform a required mapping using the target PDU session information obtained from the AF request. In this case, the SMF may need to register the UPF with the PCF. Alternatively, the PCF may perform a mapping to the service SMF of the target PDU session. As noted above, a PCC rule may include traffic filtering information, traffic steering information, and an indication of a target UPF or target SMF involved in the bridging. In various embodiments, if the source UPF and target UPF are not connected in the transport layer, no corresponding PCC rule is generated.

In some embodiments, the serving SMF of the source PDU session configures the source UPF with the traffic steering information. In further embodiments, if the PCC rule includes target SMF information instead of target UPF information, the SMF interacts with the target SMF to discover the target UPF information. If the source UPF and target UPF are not connected, the SMF will refrain from configuring the P2P traffic steering operation. In this case, traffic will be processed at the UPF in a default (e.g. prior art) manner. An error or event signal may be generated in response to such a situation.

In some embodiments, the source UPF detects the UL traffic according to the flow descriptor and processes the traffic according to the traffic steering information. The source UPF then forwards the processed traffic to the target UPF. The target UP receives and handles the rerouted bridge traffic as if it came from the application server, and forwards the traffic to the destination UE via the DL.

In some embodiments, the PCF identifies the source SMF and target SMF and obtains the UP path information from them. The PCF then determines UP (re)configuration parameters and provides these parameters along with the PCC rules including UP (re)configuration information, such as UPF (re)selection and traffic steering (re)configuration. Alternatively, the PCF may obtain the UP information from a storage function such as a UDM. To support this alternative, the SMFs are configured to store and update the UP path information in the storage function.

In some embodiments, the source SMF requests target UP information from the target SMF or from a storage function (e.g. UDM, UDR, or UDSF). The source SMF may then (re)select the source UP according to the target UP information.

In some embodiments, the PCF indicates that SMF reselection is required. In response, the source SMF redirects the PCC rules containing target PDU session ID to the source SMF. The source SMF then identifies the target SMF and requests UP path information for the target PDU session from the target SMF. The information is used to determine UP (re)configuration parameters.

In some embodiments, the core network may inform (for example periodically or upon request) the AF with regard to the data usage in connection to this invention. For example, messages indicative of the total number of P2P messages (or the total number of bytes of such messages) rerouted across one or more bridges can be provided to the AF. In some embodiments, The AF or AS may initiate or apply (e.g. 3rd party) charging based on this information, if needed.

In some embodiments, when the SMF detects a peer to peer scenario involving or requiring bridging as described herein (e.g. based on PCC rules), UPF reselection may be triggered to allow the two PDU sessions share the same UPF.

In some embodiments, as described above, directional paths may be created between RAN nodes to facilitate bridging. In this case, for further clarity, the UPF path may exclude the actual UPF.

Embodiments of the present invention relate to a method and apparatus which manages UE groups for one-to-many (e.g. multicasting) communication. According to such embodiments, a network function, referred to as Group Management Function (GMF) may be provided which is responsible for managing UE groups (e.g. creating, modifying, removing, responding to queries about UE groups) and maintaining information of UE groups (or context of UE groups) such as group membership, group properties like, IDs, addresses, metadata, information related to individual group members, etc. An authorized entity, such as a UE or an AF, can interact with the GMF to manage a UE group. This includes to create, modify or remove the group and to query information (e.g. metadata, group ID, group address) about the group or information (e.g. IP address) about a member UE of the group.

When a UE interacts with the GMF, the UE sends a request for UE group management to the GMF via the AMF, and the UE request may be authorized by the GMF according to subscription information (e.g. information about whether the UE is allowed to make such a request).

When an AF interacts with the GMF, the AF sends a request for UE group management to the GMF directly or via the NEF, depending on whether operator allows the AF to access the network directly as described in 3 GPP TS 23.501, clause 6.2.10. When the NEF is involved, the NEF may authorize the AF request according to local configuration (e.g. AF contract information stored locally, indicating whether the AF is allowed to make such a request), if the AF request is not yet authorized.

The request may include an ID of the requesting UE (if the requesting entity is a UE), AF-service-ID (if the requesting entity is an AF, and the AF-service-ID may be used to identify an AF request), DNN (Data Network Name), S-NS-SAI. Depending on the management purpose, the request may further include the following information.

In some embodiments, for creating the UE Group, the request may indicate type of traffic (e.g. IP type or Ethernet type) to be supported by the 5 GC for UEs in the UE group. The request may include an IP address list/range or IP prefix (for IP type traffic), VLAN ID(s) (for Ethernet type traffic), indicating allowed IP address/prefix or allowed VLAN ID(s) for the UE group. The request may include a group address (e.g. multicast address) that can be used as destination address by member UEs for sending traffic (e.g. multicast traffic or one-to-many traffic containing the group address as destination address) to the UE group (e.g. all the member UEs or all the other member UEs of the group), (optionally) an indication of multicast group creation (indicating the UE group to be created is a multicast group for supporting one to many communication among the group members).

In some embodiments, for creating or modifying the UE Group, the request includes identity information (e.g. UE IDs (such as GPSI, SUPI) uniquely identifying a UE in the network, or UE IDs uniquely identifying a UE in the UE group), security credentials (for authenticating and/or authorizing individual member UE(s) for establishing a PDU Session; they can be provided by the individual member UE(s) to the core network (5 GC) for the purpose secondary authentication/authorization during establishment of the PDU Session) and address information (e.g. static IP address used by the UE for communicating with other UEs) of the UEs to be added or removed from the UE group, information (e.g. UE IDs) indicating which member UE(s) of the group is allowed to send traffic (e.g. one-to-many or multicast traffic) to the UE group (i.e. all the other UEs in the group) by using the group address as destination in the traffic (the group address may be provided by the requesting entity as described in the previous bullet or allocated to the UE group by the GMF), metadata of the UE group, describing e.g. the name and/or the purpose of the UE group and/or the application associated with the UE group.

In some embodiments, for creating, modifying or removing or querying the UE group, the request includes information identifying the UE group (e.g., in the form of Internal Group ID or External Group ID). The request may further include information indicating not to notify relevant UEs (e.g. members of the UE group impacted by the UE group management operations) about the UE group management operators. When such information is provided in the request, the GMF may be inhibited from performing the notification.

In some embodiments, for removing the UE group, the request may include the group address of the UE group (which can be used by member UEs of the UE group for sending traffic to the UE group as describe above). This may occur, for example, if the group address was allocated to the UE group by the GMF during creation or modification of the UE group.

In some embodiments, for querying the UE group, the request includes information identifying the UE group (e.g. ID of the UE group), the types of information (e.g. metadata of the UE group, information such IP address or IDs of member UEs, group address of the UE group, group-level UE ID and security credentials described above) being queried.

The GMF validates the information provided by the entity, e.g. UE IDs, and manages the UE group according to the information. As a result of the UE group management operations, the context of the UE group is created, modified, or removed in the GMF, or information being queried by the entity is identified from local storage of the GMF and sent back to the entity. The GMF may update the UE group membership information to the UDM for each member UE, if the UDM is a different entity from the GMF. The GMF may include the UE group ID and group address in the response message sent to the request entity.

During creation of the UE group, the GMF may allocate a ID to the UE group, if the requesting entity did not provide a UE group ID for the UE group in the request. The GMF may further allocate a group address (e.g. multicast address) to the UE group, for example if the requesting entity did provide a group address for the UE group in the request. In some embodiments, the allocation of group address is performed only if an indication of group address allocation or multicast group creation (indicating a request for allocating a group address to the UE group) is included in the request.

During creation or modification (for adding a UE into the UE group) of the UE group, the GMF may allocate a UE ID for each member UE uniquely identifying the member UE in the UE group, if the requesting entity did not provide such a group-level UE ID for the member UE in the request. The group-level UE ID may be used to identify the UE group(s) that the UE belongs to. The group-level UE ID may be unique across multiple UE groups or be shared or reused across multiple UE groups. When the UE belongs to multiple UE groups, the same group-level UE ID may be allocated to the UE for the multiple UE groups. In this case, the group-level UE ID may not be allocated to other UE(s). The group-level UE ID may be viewed as or equivalent to DN-related identity information of the UE, where the DN (Data Network) is the DN identified by the DNN provided by the requesting entity (i.e. a UE or an AF) in the request for UE group creation.

During creation or modification (for adding member UE(s) into the UE group) of the UE group, the GMF may allocate security credentials to each member UE. This may occur if the requesting entity did provide security credentials for the UE in the request (in some embodiments. The allocation may be performed only if an indication of security credential allocation (indicating a request for allocating security credential to the member UE(s)) is included in the request. The security credentials can be used for authenticating and/or authorizing individual member UE(s) for establishing a PDU Session; they can be provided by the individual member UE(s) to the core network (5 GC) for the purpose secondary authentication/authorization during establishment of the PDU Session.

During removal of the UE group, if the requesting entity includes a group address of the UE group in the request as described above and if the group address was allocated to the UE group by the GMF, the GMF may mark or consider the group address as recycled or returned. Such returned addresses can be reused for a second UE group, e.g. allocated to the second UE group, so that member UEs of the second UE group can use the group address as destination address to send traffic (e.g. multicasting traffic or one-to-many traffic) to the second UE group.

When a UE group is created, modified or removed, the GMF notifies the UE(s) impacted by the UE group management operations. The UE(s) can be notified about, e.g., being added in or removed from the UE group, metadata and/or ID and/or group address of the UE group, group-level UE ID and security credentials described above. For the registered UEs, the GMF may notify them via a UE Configuration Update procedure; for the unregistered UEs, the GMF may notify them during initial registration procedure performed by the UEs in the future.

In response to or in association to the management of UE group described above, the GMF (e.g. in the case of UE-initiated group management) or an AF (e.g. in the case of AF-initiated group management) may provide policy requirements to the PCF for influencing traffic routing (e.g. for handling disallowed/unauthorized traffic indicated during management of the UE group) for a PDU Session. In some embodiments, an AF or the GMF may provide such policy requirements to the PCF independent of management of UE group. The AF or the GMF (the GMF may be viewed acting as AF) may the provide policy requirements to the PCF (directly or via NEF) in the form of request (e.g. AF request). In the request, the PDU Session may be identified by any of the following: network address, UE ID, UE group ID, DNN, S-NSSAI, and the disallowed or unauthorized traffic may be identified by network address(es) (e.g. MAC address(es), IP address(es), or a group address described above for UE group management. The disallowed or unauthorized traffic may be traffic containing the network address(es) as source address or traffic containing the network address(es) as destination address. The PCF generates policies (i.e. in the form PCC rules) based on the policy requirements (i.e. request) received from the AF or the GMF and provide the policies to the SMF for a PDU Session that the policy requirements are applicable to. The PCF may determine whether the policy requirements applicable to the PDU Session by checking the information provided by the SMF about the PDU Session and/or traffic carried by the PDU Session, e.g. DNN, S-NSSAI, UE ID, UE group ID, UE address, application ID (referencing some packet filter that the traffic matches), packet/traffic information (e.g. source address in the traffic or destination address in the traffic) against the UE (or PDU Session) information and the traffic information in the policy requirements. The policies provided to the SMF from the PCF may include information (e.g. in the form of a list of allowed or disallowed source network addresses or a list of allowed or disallowed destination addresses) of disallowed or unauthorized traffic and indicate actions (e.g. dropping the traffic) to be taken for the disallowed or unauthorized traffic. The SMF may configure a UPF (such as PDU Session Anchor (PSA) UPF, Uplink Classifier (UL CL) UPF, Branching Point (BP) UPF) in the UP path of the PDU Session to detect and drop disallowed or unauthorized traffic, e.g. by providing the UPF with packet handling instructions (e.g. Packet Detection Rules, Forwarding Action Rules), which are generated by the SMF based on the polices.

Figure 16:
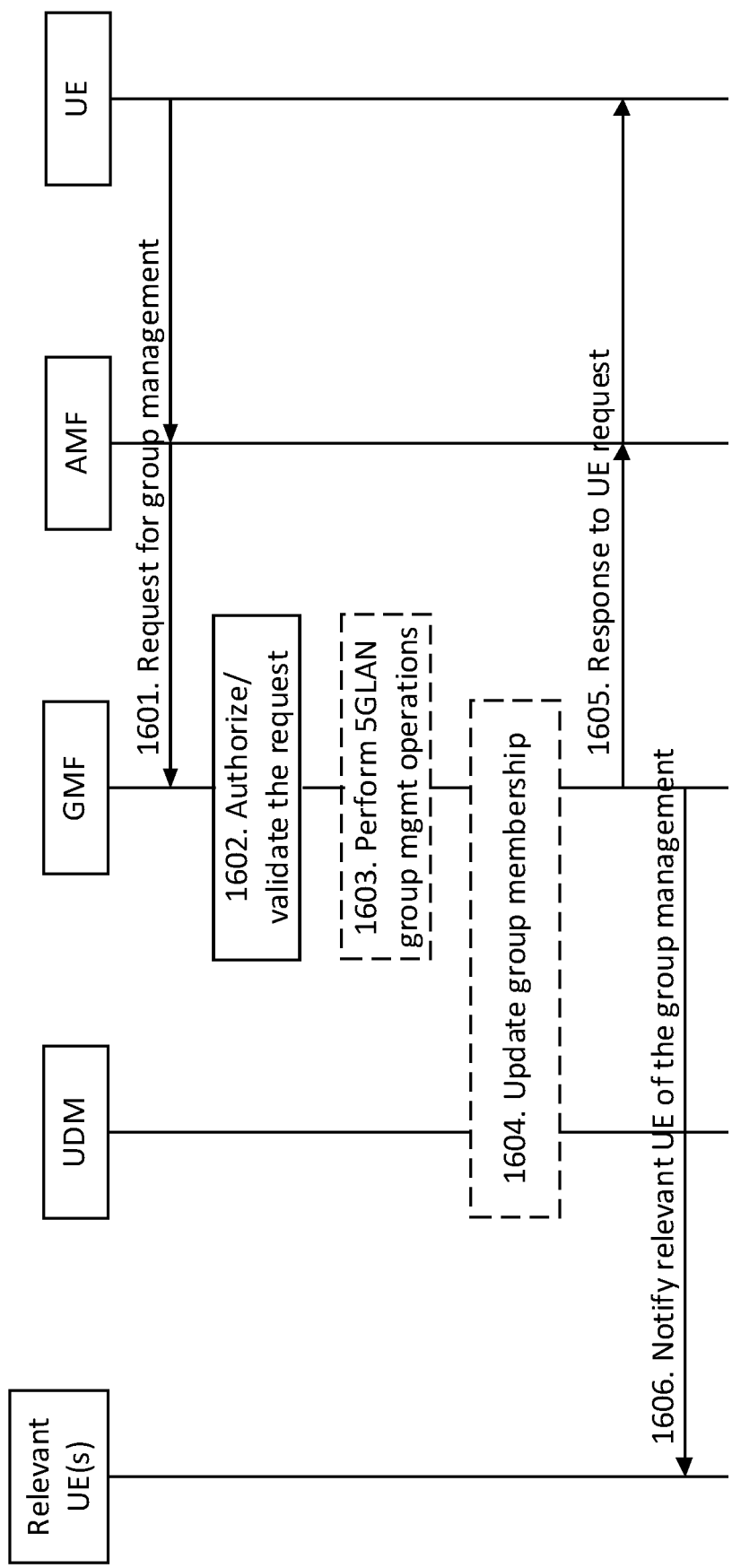
FIG. 16 illustrates a procedure of managing a UE group upon request from a UE, according to an embodiment of the present invention.

FIG. 16 depicts the procedure of managing a UE group upon request from a UE. The procedure may correspond to the above-described embodiments related to a method and apparatus which manages UE groups for one-to-many (e.g. multicasting) communication. Referring now to FIG. 16: In operation 1601, the UE sends a request to the GMF for management of a UE Group. The request is sent to the GMF via the AMF. The request may be for the purpose of creating, modifying or removing the UE group, or for the purpose of querying information of the UE group or of UE(s) belonging to the UE group. When the request is for creating a UE group, in the request, the UE may indicate that the UE group is a multicast group (or that the UE group is created to support one-to-many/multicasting communication). The UE may provide a group address for the UE group in the request. Alternatively, a group address may be allocated to the UE group by the GMF after the GMF receives the request. The UE may indicate in the request which UEs (e.g. identified by a list of UE IDs) belong to the UE group. The UE may further indicate which member UEs (e.g. identified by a list of UE IDs) of the UE group is allowed or not allowed to transmit traffic to the UE group (i.e. to the other UEs in the group in a multicast or one-to-many manner by using the group address in the traffic as destination).

In operation 1602, the GMF authorizes the request. For the authorization, the GMF may interact with the UDM to identify whether the UE is allowed to send such a UE group management request (such information may be stored in the UDM as part of UE subscription data). For authorized UE request, the GMF validates information in request. The GMF may interact with the UDM for the validation, e.g. to verify the UE IDs in the request.

In operation 1603, the GMF performs the requested UE group management operations according to the information in the request. The GMF may allocate an ID for the UE group. The GMF may allocate a group address for the UE group (the group address can be used as destination in traffic during one to many communication, this cause the traffic to be sent to all member UEs of the group except for the UE that sends the traffic.)

In operation 1604, the GMF updates the group membership information of each member UE to the UDM. The GMF may provide the UE group ID and the IDs of member UEs of the UE group to the UDM. The UDM may store the UE group ID as part of subscription data of each individual member UE).

In operation 1605, the GMF responds to the UE, acknowledging the acceptance of the request. The request includes information identifying the UE Group (e.g. ID of the UE group). The request may include the group address of the UE group. If the request in operation 1601 is for querying the UE Group, the response includes information being queried.

In operation 1606, the GMF notifies relevant member UE(s) of the UE group about the UE group management operations, e.g. creation, modification, removal. The notification may be sent to the UE(s) through the control plane of the network, e.g. via the AMF. Alternatively, the notification may be sent as play load of a device or application trigger message sent to the UE(s). In the notification, the GMF may provide any of the following information: ID of the UE group, group address of the UE group, metadata of the UE group to the UE(s). In the notification, the GMF may indicate to the UE(s) whether the UE(s) are allowed or disallowed to send traffic to the UE group, i.e. to send UL traffic destined to the group address. The GMF may skip this operation if the request received from the UE in operation 1601 contains information indicating not to perform such notification.

Figure 17:
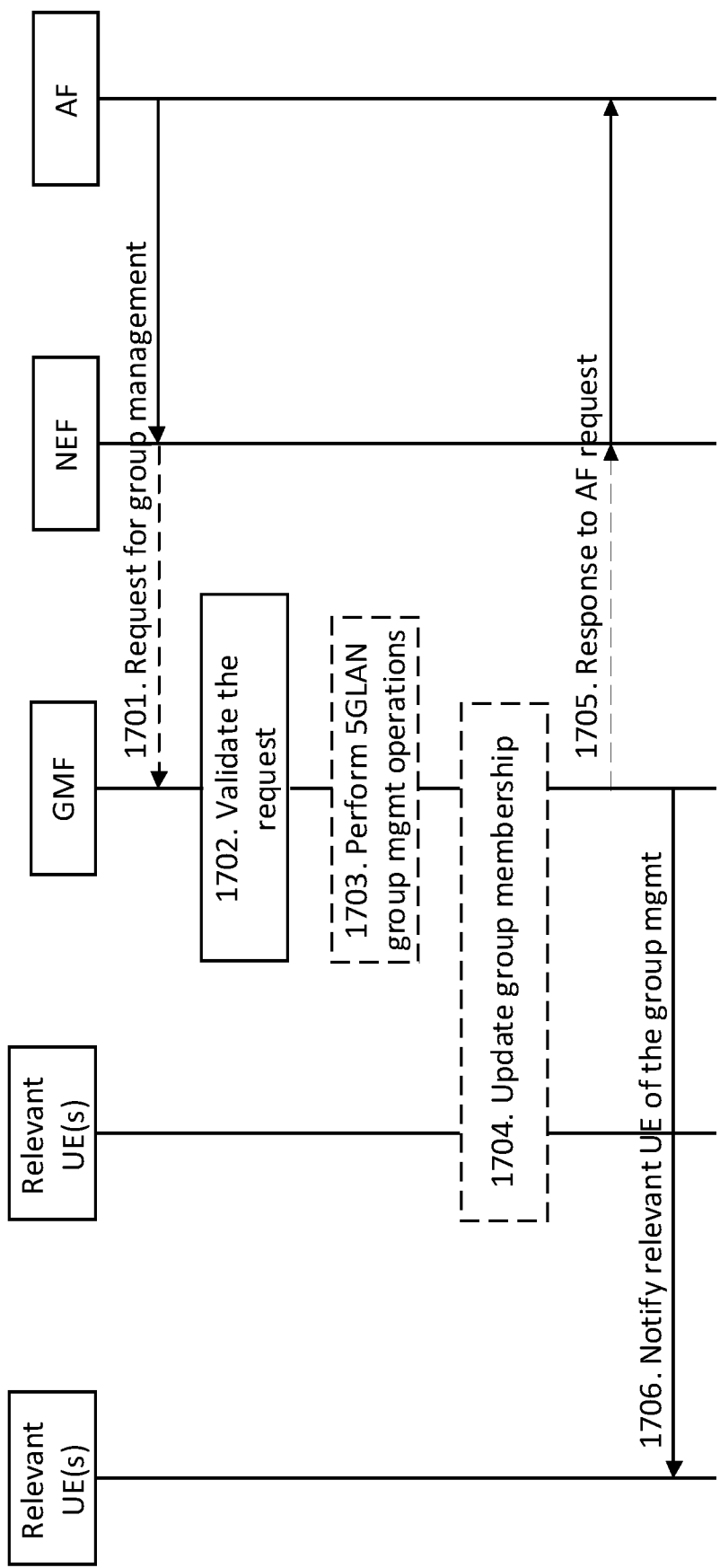
FIG. 17 illustrates a procedure of managing a UE group upon request from an AF, according to an embodiment of the present invention.

FIG. 17 depicts the procedure of managing a UE group upon request from an AF. The procedure may correspond to the above-described embodiments related to a method and apparatus which manages UE groups for one-to-many (e.g. multicasting) communication. Referring to FIG. 17: In operation 1701, the AF sends a request to the GMF for management of a UE group. The request may be sent to the GMF directly or via the NEF. If the NEF is involved, the NEF may authorize the request (e.g. according to local configuration such as AF contract to check whether the AF is allowed to send such a UE group management request) and forwards the authorized request to the GMF. The request may be for the purpose of creating, modifying or removing the UE group, or for the purpose of querying information of the UE group or of UE(s) belonging to the UE group. When the request is for creating a UE group, in the request, the AF may indicate that the UE group is a multicast group (or that the UE group is created supporting one-to-many/multicasting communication). The UE may provide a group address for the UE group in the request. Alternatively, a group address may be allocated to the UE group by the GMF after the GMF receives the request. The UE may indicate in the request which UEs (e.g. identified by a list of UE IDs) belong to the UE group. The UE may further indicate which member UEs (e.g. identified by a list of UE IDs) of the UE group is allowed or not allowed to transmit traffic to the UE group (i.e. to the other UEs in the group in a multicast manner by using the group address in the traffic as destination).

In operation 1702, the GMF validates information in request. The GMF may interact with the UDM for the validation, e.g. to verify the UE IDs in the request.

Operations 1703, 1704, 1705 and 1706 are similar to or the same as operations 1603, 1604, 1605 and 1606, respectively, of FIG. 16.

Information of UE group (e.g. UE group ID) managed by the GMF can be used to identify UEs or PDU Sessions in the AF request in embodiments illustrated in FIGS. 6 to 8 and 12 to 15. In some embodiments, the GMF may participate these procedures by acting or behaving as the AF.

In response to or in association to the management of UE group described in FIG. 16 or FIG. 17, the GMF (e.g. in the case of UE-initiated group management in FIG. 16) or an AF (e.g. in the case of AF-initiated group management in FIG. 17) may provide policy requirements to the PCF for influencing traffic routing (e.g. for handling disallowed/unauthorized traffic indicated during management of the UE group). In some embodiments, the GMF or the AF may provide such policy requirements to the PCF independent from the management of UE group.

The policy requirement is sent from the GMF or the AF to the PCF in the form of request, e.g. AF request. The GMF may act as AF in the procedure. The request (e.g. AF request) may be sent from the AF or the GMF directly or via the NEF (and possibly then via UDR, if the request impacts multiple PDU Sessions and should be delivered to multiple PCFs) to the PCF.

The request may include information identifying disallowed/unauthorized traffic and information identifying UE(s) (or PDU Sessions).

The information identifying disallowed/unauthorized traffic may be in the form of a list of disallowed/unauthorized source or destination network addresses (e.g. a group address or multicast address described above in UE group management). In this case, traffic that contains one of the disallowed source network addresses as a source address or one of the disallowed destination network addresses as a destination address is considered disallowed/unauthorized. The information may also be in the form of a list of allowed/authorized source or destination network addresses. In this case, traffic that does not contain one of the allowed source network addresses as a source address or one of the allowed destination network address as a destination address is considered disallowed/unauthorized.

Information identifying disallowed/unauthorized traffic may further include DNN, S-NSSAI.

Information identifying UE(s) (or PDU Sessions) may include any of UE ID, UE group ID, UE network address (e.g. MAC address, IP address or prefix).

The PCF generates policies (PCC rules) based on the policy requirements (i.e. the request) received from the AF or the GMF and provides the policies to the SMF for relevant PDU Sessions. The SMF configures the UPF according to the policies so that the UPF detects and drops disallowed/unauthorized traffic identified in the policies.

Figure 18:
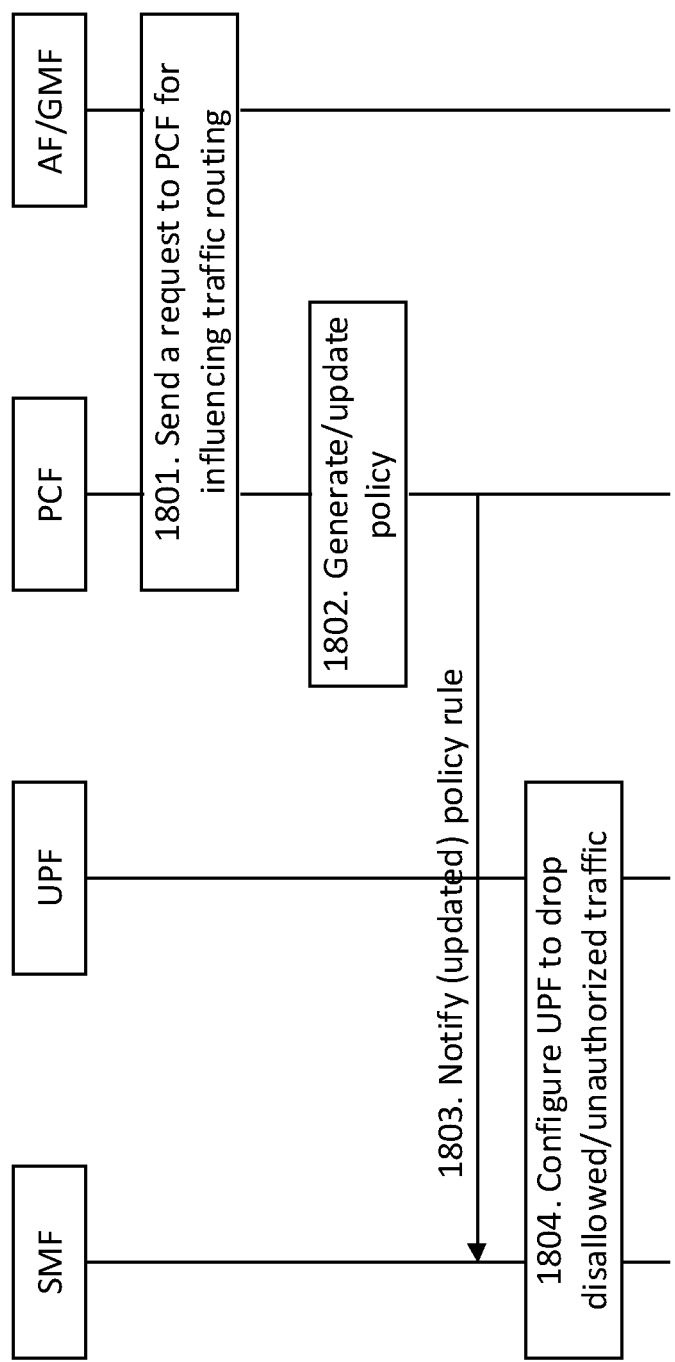
FIG. 18 illustrates a procedure for dropping disallowed or unauthorized traffic, according to an embodiment of the present, according to an embodiment of the present invention.

FIG. 18 illustrates a procedure for dropping disallowed or unauthorized traffic, according to an embodiment of the present invention. Referring now to FIG. 18: This procedure may correspond to the above-described provision of policy requirements to the PCF for influencing traffic routing in response to or in association to the management of UE groups. In operation 1801, the AF or the GMF sends a request to the PCF for influencing traffic routing. The request includes information identifying disallowed/unauthorized traffic and information identifying UE(s) (or PDU Sessions), as described above.

In operation 1802, the PCF generate or update policies based on the request received in operation 1801.

In operation 1803, the PCF notifies or provides the generated/updated policies to the SMF for a relevant PDU Session (i.e. a PDU Session that the policy requirements or the request received in operation 1801 are applicable to). The policies indicate disallowed/unauthorized traffic of the PDU Session, i.e., traffic that the PDU Session is not allowed or authorized to carry. This operation may happen during establishment of the PDU Session establishment or as a trigger of modifying the PDU Session.

In operation 1804, the SMF configures the user plane of the PDU Session (a UPF in the UP path of the PDU Session, such as the PSA (PDU Session Anchor) UPF or UL CL (uplink classifier) UPF, BP (branching point) UPF) to detect and drop disallowed/unauthorized traffic, according to the policies received in operation 1803.

Embodiments of the present invention relate to a method and apparatus which detects and drops disallowed one-to-many (multicasting) traffic in user plane. According to such embodiments, the SMF receives for a PDU Session from the GMF information identifying disallowed/unauthorized traffic, e.g., a list of disallowed/unauthorized source or destination network addresses (traffic containing a disallowed/unauthorized source network address as source address is considered disallowed/unauthorized; traffic containing a disallowed/unauthorized destination network address as destination address is considered disallowed/unauthorized), or information identifying allowed/authorized traffic, e.g. a list of allowed/authorized source or destination network addresses (traffic containing an allowed/authorized source network addresses as source address is considered allowed/authorized; traffic containing an allowed/authorized destination network address as destination address is considered allowed/authorized).

The above receiving at the SMF may take place during establishment of the PDU Session when the SMF interacts with the GMF for authenticating and/or authorizing the UE for establishing the PDU Session, and the information identifying disallowed/unauthorized (or allowed/authorized) traffic may be received by the SMF from the GMF as part of authentication/authorization result/data or after establishment of the PDU Session when the GMF updates the SMF with new authentication/authorization result/data where the information is contained.

The SMF may alternatively receive the information identifying disallowed/unauthorized traffic or allowed/authorized traffic from the PCF in the form of PCC rules during establishment of the PDU Session or modification of the PDU Session. This alternative may be as described in detail with respect to FIG. 18.

The SMF configures the UPF according to the information (i.e. information identifying disallowed/unauthorized traffic or allowed/authorized traffic) received from the GMF or from the PCF to drop disallowed/unauthorized traffic or forward only allowed/authorized traffic.

Figure 19:
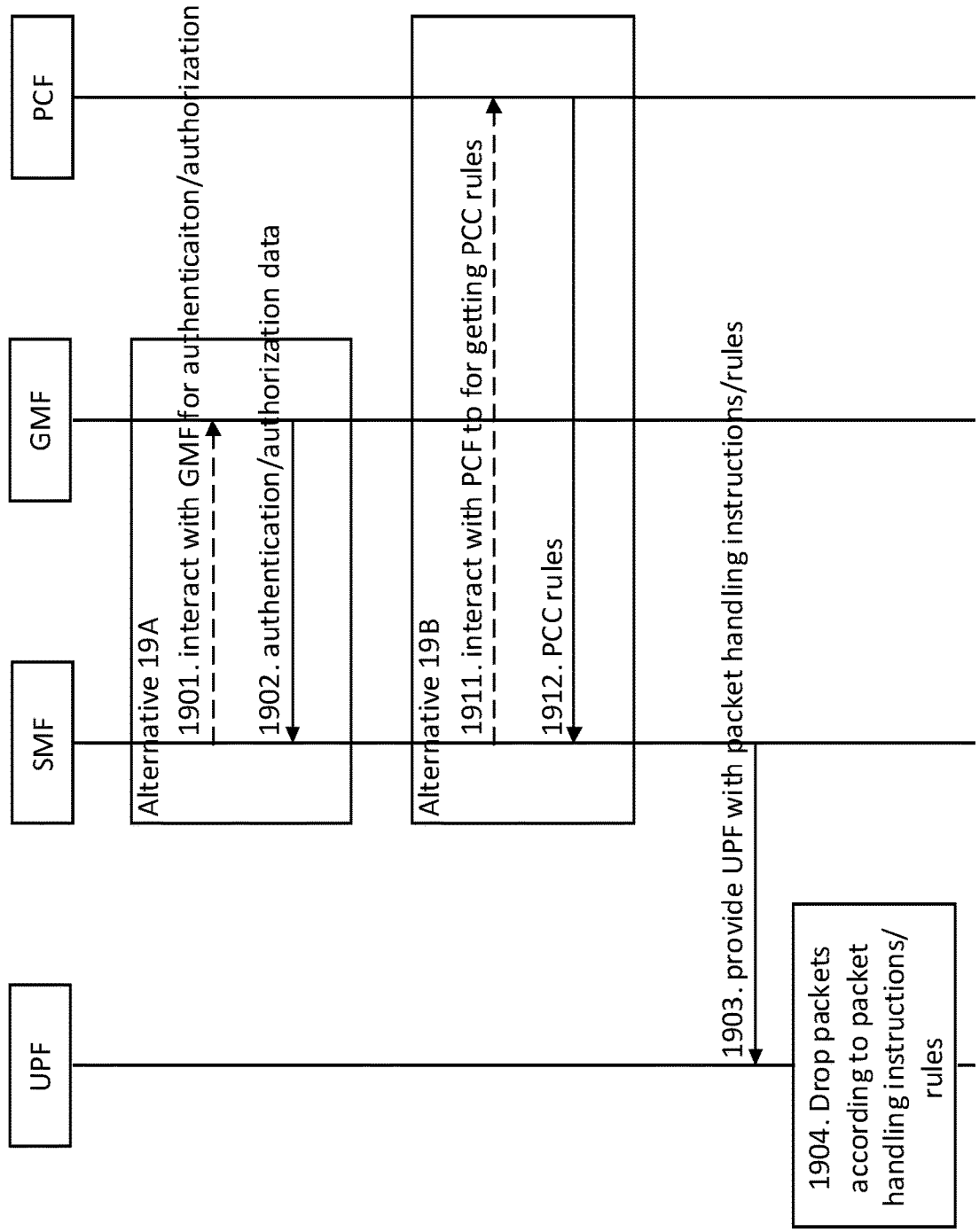
FIG. 19 illustrates a procedure of enabling the UPF to identify and drop disallowed traffic, according to an embodiment of the present invention.

FIG. 19 depicts a procedure of enabling the UPF to identify and drop disallowed traffic. Referring to FIG. 19: either of alternatives 19A and 19B can be performed. In alternative 19A: This procedure may for example enable UEs that do not belong to a UE group to receive traffic destined to the UE group or disable UEs (which may or may not belong to the UE group) to send traffic destined to the UE group. In operation 1901, the SMF interacts with the GMF for authenticating/authorizing establishment of the PDU Session. This step may be optional. In operation 1902, the GMF provides authentication/authorization result/data to the SMF, which indicates the result of the authentication/authorization. The data may include a list of disallowed source or destination network addresses (e.g. IP address or prefix). They are used to identify the traffic that the PDU Session is not allowed to carry (in the UL direction or DL direction). Alternatively, a list of allowed source or destination network addresses may be included in the data for identifying allowed traffic.

In alternative 19B: In operation 1911, the SMF interacts with the PCF for obtaining PCC rules related to the PDU Session. The SMF may provide information about the PDU Session and/or traffic carried by the PDU Session, e.g. DNN, S-NSSAI, UE ID, UE group ID, UE address, application ID (referencing some packet filter that the traffic carried by the PDU Session matches), packet/traffic information (e.g. source address in the traffic or destination address in the traffic) This operation may be optional. In operation 1912, the PCF provides the SMF with PCC rules related to the PDU Session. The PCC rules may indicate disallowed source or destination network addresses (e.g. IP address or prefix) or allowed source or destination network addresses (e.g. IP addresses or prefix). This optional operation is similar to the operation 1803 in FIG. 18.

Following alternative 19A and 19B, in operation 1903, the SMF configures the UPF with packet handling instructions (e.g. PDR (Packet Detection Rule), FAR (Forwarding Action Rule)) based on the information received from the GMF or the PCF in operation 1902 or 1912. This operation is similar to Operation 1804 in FIG. 18.

In Operation 1904, and according to the packet handling instructions, the UPF discards/drops any UL or DL traffic that contains one of the disallowed source network addresses as source address or one of the disallowed destination network addresses as a destination address or discards/drops any UL or DL traffic that does not contain one of the allowed source network addresses as a source address or one of the allowed destination network address as a destination address.

Figure 20:
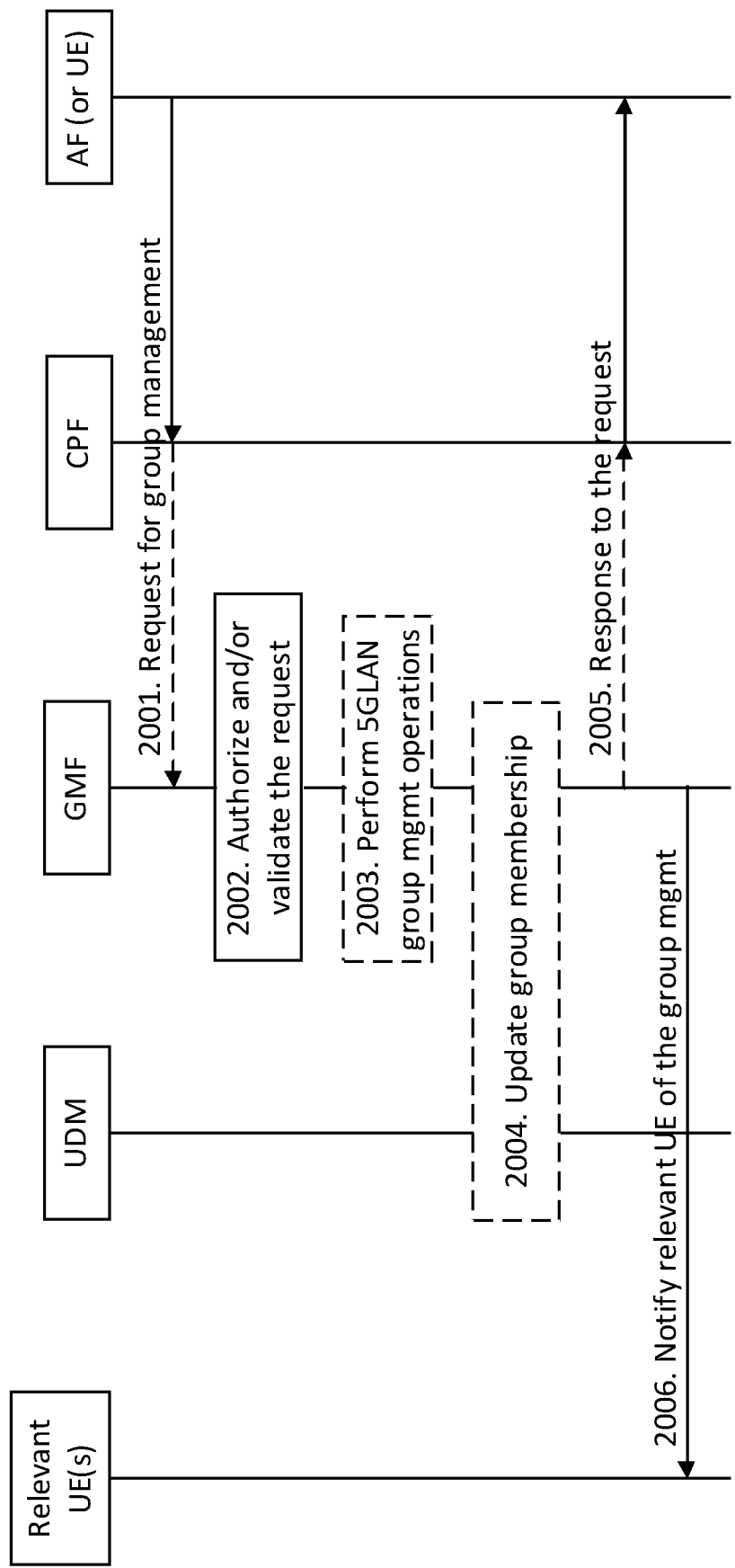
FIG. 20 illustrates a procedure for managing UE groups, according to another embodiment of the present invention.

FIG. 20 illustrates a procedure for managing UE groups in accordance with another embodiment of the present invention. The procedure of FIG. 20 is comparable to that of FIG. 16 and that of FIG. 17. The procedure is initiated by a requesting entity (which can be an AF or a UE as shown in FIG. 16 or can be a network function different from AF such as SMF). If the requesting entity is a UE, the operations 2001, 2002 of the procedure are similar to the operations 1601, 1602, respectively, of FIG. 16. If the requesting entity is an AF, the operations 2001, 2002 of the procedure are similar to operations 1701, 1702, respectively, of FIG. 17. The operations 2003, 2004, 2005, 2006 of the procedure are similar to the operations 1603, 1604, 1605, 1606, respectively, of FIG. 16 or to the operations 1703, 1704, 1705, 1706, respectively, of FIG. 17. The procedure of FIG. 20 differs from that of FIG. 16 and that of FIG. 17 in that the request can be transmitted by a requesting entity, which can be an application function (AF) or a UE or a network function different from AF such as SMF. Furthermore, the request can be received and handled by a Control Plane Function (CPF), which may be an Access Management Function (AMF) (e.g. in the case that the requesting entity is a UE as described in embodiments corresponding to FIG. 16), be a Network Exposure Function (NEF) (e.g. in the case that the requesting entity is an AF as described in embodiments corresponding to FIG. 17), or be an AMF and then a SMF (Session Management Function) in order (e.g. in the case that the requesting entity is a UE and that the procedure is integrated with a procedure of establishing a PDU Session as described in embodiments corresponding to FIG. 21). The CPF is optional in the procedure. For example, if the requesting entity is an SMF, the operations 2001, 2005 can take place directly between the requesting entity and the GMF without going through the CPF. When an SMF is performing the procedure in FIG. 20 as requesting entity, the SMF may be acting on behalf of the UE and performing the procedure for the UE, for example, as described in embodiments corresponding to FIG. 21, the SMF may be on behalf of the UE performing the procedure with the GMF to remove a multicast group that is created together with a PDU Session upon the UE's request, after the PDU Session is terminated.

Figure 21:
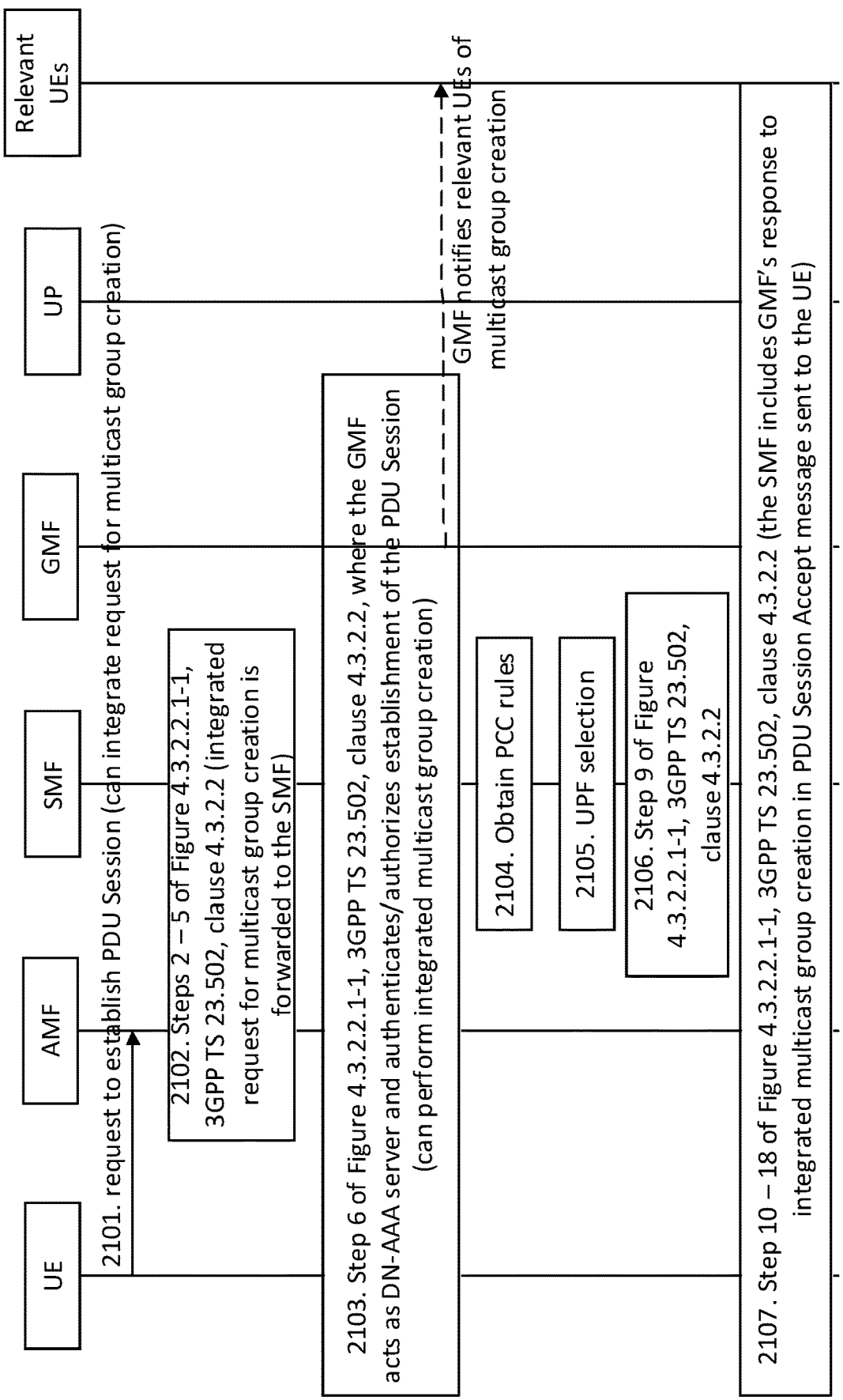
FIG. 21 illustrates an integrated procedure for both PDU session establishment and multicast group creation, according to an embodiment of the present invention.

FIG. 21 illustrates an integrated procedure for both PDU session establishment and UE group creation (e.g. a multicast group). Embodiments of the present invention provide for a method and apparatus for performing this integrated procedure. Details of the PDU session establishment procedure can be found in TS 23.502, particularly with respect to Figure 4.3.2.2.1-1 and clause 4.3.2.2 thereof. In particular, operation 2101 can be integrated with (or similar to) step 1 of Figure 4.3.2.2.1-1, operation 2102 can be integrated with (or similar to) steps 2 to 5 (SMF selection, Nsmf_PDUSession_CreateSMContext Request and Response, Registration/Subscription retrieval/Subscription for updates, Nsmf_PDUSession_CreateSMContext Response) of Figure 4.3.2.2.1-1, and operation 2103 can be integrated with (or similar to) step 6 (PDU Session authentication/authorization) of Figure 4.3.2.2.1-1. Further, operation 2106 can be integrated with step 9 (SMF initiated SM Policy Association Modification) of Figure 4.3.2.2.1-1, and operation 2107 can be integrated with steps 10 to 18 of Figure 4.3.2.2.1-1.

In more detail, in operation 2101, a UE transmits a request to the AMF to establish a PDU session. The request can integrate a request for UE group (e.g. a multicast group) creation. The request may include the UE's identity information (e.g. group-level UE ID or DN-related identity information received from the GMF (as described above) before the current procedure), which may be used by the GMF for authenticating/authorizing the UE for establishing the PDU Session in operation 2103. In operation 2102, the AMF and SMF interact as described in steps 2 to 5 of Figure 4.3.2.2.1-1. During this interaction, the integrated request for UE group creation can be forwarded by the AMF to the SMF. In operation 2103, PDU Session authentication/authorization is performed. In operation 2103, the SMF may select the GMF according to the UE's identity information received in option 2101, and the GMF acts as a DN-AAA server and authenticates/authorizes establishment of the PDU session. In operation 2103, the GMF can perform integrated UE group creation, including receiving the integrated request for UE group creation from the SMF and performing operations similar to operations 2002, 2003 and 2004 in FIG. 20. As a result of operation 2103, the GMF may provide the SMF with information (e.g. UE group ID(s)) identifying the UE group(s) mapped from the group-level UE ID (which can be interpreted as DN (data network)-related identity information) received from the UE via the SMF. The SMF may provide this information to the PCF to obtain policies that are related to the UE group(s) from the PCF. Additionally or alternatively, the SMF may use this information to identify packet handling instructions or rules related to the UE group(s) and configure the instructions or rules into the UPF for handling traffic associated to the UE group(s). The GMF may also notify relevant UEs (e.g. of the group) of the UE group creation, which is similar to operation 2006 in FIG. 20. The GMF may perform operation 1801 with the PCF in FIG. 18 so that the PCF can generate or update polices related to the PDU Session (operation 1802 in FIG. 18) for influencing traffic routing (e.g. handling disallowed/unauthorized traffic). The policies may be provided to the SMF in operation 2104. The interaction between the SMF and the PCF and the PCF's operation are not shown in FIG. 21. In operation 2104, PCC rules are obtained by the SMF. In operation 2105, UPF selection is performed by the SMF. This operation 2105 may be supported by the techniques described in this invention, e.g. embodiments associated to FIGS. 5, 6, 7, 8, 9, 10, 12, 15 (particularly, the operations for the SMF to determine or select or reselect UPF or UP path for the PDU Session). In operation 2106, SMF initiated SM Policy Association Modification is performed. In operation 2107, integrated with steps 10 to 18 of Figure 4.3.2.2.1-1, the SMF may include, within a PDU Session Establishment Accept message (a message indicating the request for PDU Session establishment is accepted) sent to the UE (e.g. step 13 of Figure 4.3.2.2.1-1), the GMF's response to integrated UE group creation (e.g. including a response to the UE's group creation request of operation 2101. After this procedure, the PDU Session is established for the UE, and the UE group is created. If the UE group is a multicast group (supporting one-to-many communication), the PDU Session can be used by the UE to send multicast/one-to-many traffic to the UE group (i.e. the member UEs in the group).

In some embodiments, in the procedure of establishing a PDU Session having an integrated UE group (e.g. multicast group) creation as illustrated in FIG. 21, the UE may provide information (e.g. an indication) in operation 2101, indicating whether or not the UE group is coupled or associated with the PDU Session or is PDU Session dependent. (If the UE group is coupled or associated with the PDU Session or is PDU Session dependent, the UE group may be removed by the network after the PDU Session is terminated.) The information can be provided by the UE as part of the request for PDU Session establishment sent to the SMF via the AMF (operations 2101 and 2102). In this case, the SMF may retrieve or extract the information from the request and insert the information (in the original form or in a transformed form) into the integrated request for UE group creation when sending the integrated request for UE group creation to the GMF in operation 2103. (For example, information indicating the UE group is coupled to or associated with the PDU Session, or is PDU Session dependent, may be transformed or mapped to information indicating not to notify relevant UEs about the UE group management operations described above. As another example, information indicating the UE group is not coupled or associated with the PDU Session, or is PDU Session dependent, is transformed or mapped to information indicating to notify relevant UEs about the UE group management operations described above.) Alternatively, the information can be provided by the UE as part of the integrated request for UE group creation. In this case, the GMF may include the information (in the original form or in a transformed form) in the authentication/authorization data sent to the SMF in operation 2103. In either case, the GMF may receive the information (original or transformed). According to this information (e.g. if this information in the original form indicates the UE group is coupled or associated with the PDU Session or is PDU Session dependent), the GMF may skip (perform, otherwise) in operation 2103 the step of notifying relevant UEs (e.g. of the group) of the UE group creation (which is similar to operation 2006 in FIG. 20 and shown in FIG. 21 as dashed line). In either case, the SMF may receive the information (original or transformed). According to this information (e.g. if this information in the original form indicates the UE group is coupled or associated with the PDU Session or is PDU Session dependent), the SMF may (may not, otherwise) interact with the GMF, e.g. send a request for removing the multicast group to the GMF on behalf of the UE, to remove the UE group when or after the PDU Session is terminated. The PDU Session may be terminated by the SMF upon request from the UE or due to other factors. In some embodiments, the UE does not provide the above-described information in operation 2101, and the information is configured in the SMF as default option such that the SMF in the procedure considers according to the configuration the UE group is or is not coupled or associated with the PDU Session. In this case, the SMF according to the configured information operates or behaves similarly as described above, where the information is provided by the UE in operation 2101.

A variety of operations, call flows, and procedures have been described above. It should be noted that two or more of the described operations, call flows, and procedures, or other features or embodiments, can be combined together to arrive at further embodiments of the present invention. For example, one or more procedures or features can be used to support operation of one or more other procedures or features. As another example, one or more different procedures or features can provided as alternatives for use in different situations, and a procedure (or corresponding network entity) for selecting between the alternatives based on available information can be included.

As will be readily understood based on the above, embodiments of the present invention provide for an application function configured to send a message indicative of whether user plane (UP) paths of two or more PDU sessions are to be jointly selected or reselected. This may include PDU session correlation for the purpose of P2P UP path optimization, as disclosed herein. This may additionally or alternatively include P2P traffic steering, as disclosed herein. Selection or reselection of one or both of: a user plane function (UPF); and a selected or reselected application location, may be performed based on the joint selection or reselection. Furthermore, at least one selected or reselected UPF, or application location, which is a result of the joint selection or reselection, is shared by the UP paths. In some embodiments, an indication may also be provided (e.g. by the AF) regarding whether or not UP paths of the two or more sessions are to be connected through an application location. This can be included as part of bridging requirement information as disclosed herein, and the connection can refer to the P2P bridge. Connection in this context, as well as elsewhere, refers to bridging.

In some embodiments, the AF transmits a request carrying the message indicative of whether user plane (UP) paths of two or more PDU sessions are to be jointly selected or reselected. In some embodiments, the AF transmits a request carrying the indication of whether or not UP paths of the two or more sessions are to be connected through an application location. In some embodiments, request from the AF includes information indicating a primary PDU session of the two or more PDU sessions or a primary UE (or head UE) of a group of UEs.

As will also be readily understood based on the above, embodiments of the present invention provide for a PCF configured to: receive a message indicative of whether user plane (UP) paths of two or more PDU sessions are to be jointly selected or reselected; and also configured to transmit an instruction to a session management function (SMF) indicative that the user plane (UP) paths of two or more PDU sessions are to be jointly selected or reselected. The PCF may further be configured to receive an indication of whether or not UP paths of the two or more sessions are to be connected through an application location, and may optionally be configured to transmit an instruction to a session management function (SMF) indicative that the UP paths of the two or more sessions are to be connected through an application location or not. The PCF may further be configured to receive a request carrying one or both of: said message indicative of whether user plane (UP) paths of two or more PDU sessions are to be jointly selected or reselected; and indication of whether or not UP paths of the two or more sessions are to be connected through an application location.

As will also be readily understood based on the above, embodiments of the present invention provide for a SMF configured to: receive an instruction (also referred to as a rule) from a policy control function (PCF), the instruction indicative that user plane (UP) paths of two or more designated PDU sessions are to be jointly selected or reselected; and to jointly select or reselect the UP paths of the two or more designated PDU sessions based on the instruction. This UP path selection or reselection can correspond to P2P UP path optimization or P2P traffic steering as described previously herein.

As will also be readily understood based on the above, embodiments of the present invention provide for a PCF configured to: receive, from an application function (AF), a message indicative that user plane (UP) paths of two or more PDU sessions are to be jointly selected or reselected; and selecting or reselecting one or both of: user plane functions (UPFs); and application locations, for use in connecting said UP paths of said two or more PDU sessions. The indication that the PDU sessions are to be jointly selected or reselected can correspond to PDU session correlation as described previously herein. Connecting of the UP paths can correspond to bridging as described previously herein. The PCF may be configured to perform said selecting or reselecting in response to a trigger. The trigger may be received from a session management function (SMF) or an access and mobility management function (AMF). The PCF may be configured to receive an indication that the UP paths of the two or more PDU sessions are to be connected through an application location. The PCF may be further configured, after the selecting or reselecting, to notify a session management function (SMF) of the selected or reselected UPFs or application locations. The PCF may be configured to receive a message from a session management function (SMF) indicating that a connection (P2P bridge) relating to one of the UP paths is ready, and confirming with the SMF that the connection is established once connections relating to all the two or more PDU sessions are ready.

As will also be readily understood based on the above, embodiments of the present invention provide for a SMF configured to: receive an instruction from a policy control function (PCF), the instruction indicative of one or both of: a selected or reselected user plane function (UPF); and an application location, and selecting or reselecting a UP path of a PDU session based on the received instruction. The selected or reselected UP path may include one or both of the selected or reselected UPF and the application location. The SMF may be further configured to send a message indicating that a connection relating to the UP path is ready.

It will be readily understood that, throughout the preceding discussion, the above-described network functionalities and operations may correspond to a method for use in supporting operation of a communication network, such as a 5G wireless communication network. The method may involve computer-implemented functions, namely functions which are implemented by one or more computing, communication or memory components of the network infrastructure, or a combination thereof. These components may take various forms, such as specific servers or general-purpose computing, communication or memory devices, or combinations thereof, which are configured to provide the required functionality through virtualization technologies. The method may involve the operation of one or more network components in order to improve the operation of the network. As such, with the communication network viewed as an apparatus, embodiments of the present invention may be directed to improving internal operations of the communication network.

Further, it will be readily understood that embodiments of the present invention relate to a communication network system or associated apparatus thereof, which is configured to perform the above-described network functionalities and operations. Again, the system or apparatus may comprise one or more computing, communication or memory components of the network infrastructure, or combinations thereof, which may take various forms, such as specific servers or general-purpose computing, communication or memory devices, or combinations thereof, which are configured to provide the required functionality through virtualization technologies. Various methods as disclosed herein may be implemented on one or more real or virtual computing devices, such as devices within a communication network control plane, devices operating in the data plane, or a combination thereof. Computing devices used to implement method operations may include a processor operatively coupled to memory, the memory providing instructions for execution by the processor to perform the method as described herein.

Various embodiments of the present invention utilize one or both of: real computer resources; and virtual computer resources. Such computer resources utilize, at a hardware level, a set of one or more microprocessors operatively coupled to a corresponding set of memory components which include stored program instructions for execution by the microprocessors. Computing resources may be used to provide virtual computing resources at one or more levels of virtualization. For example, one or more given generic computer hardware platforms may be used to provide one or more virtual computing machines. Computer hardware, such as processor resources, memory, and the like, may also be virtualized in order to provide resources from which further virtual computing machines are built. A set of computing resources which are allocatable for providing various computing resources which in turn are used to realize various computing components of a system, may be regarded as providing a distributed computing system, the internal architecture of which may be configured in various ways.

Figure 22:
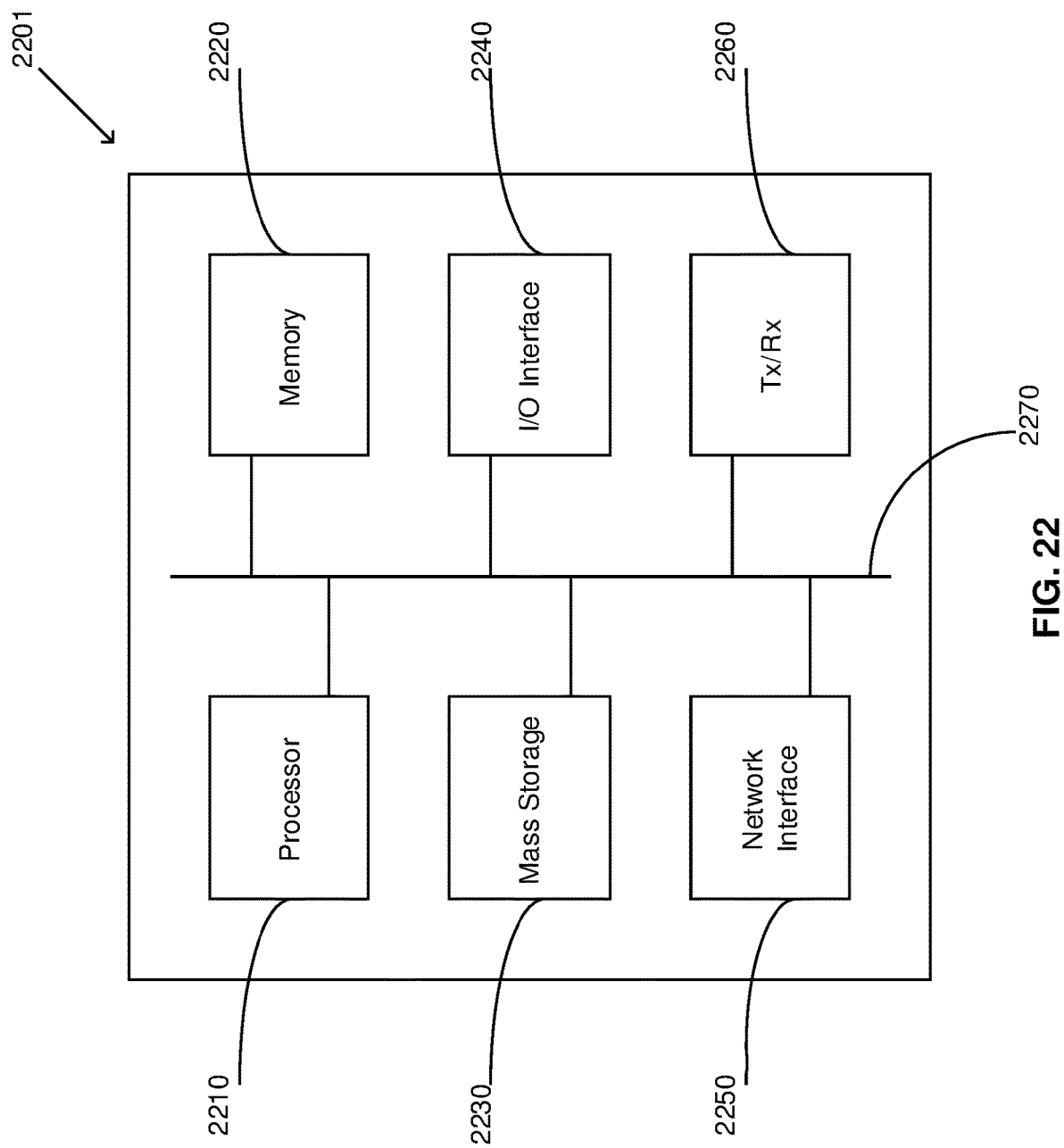
FIG. 22 is an exemplary block diagram of a processing system that may be used for implementing network functions according to embodiments of the present invention.
Figure 23:
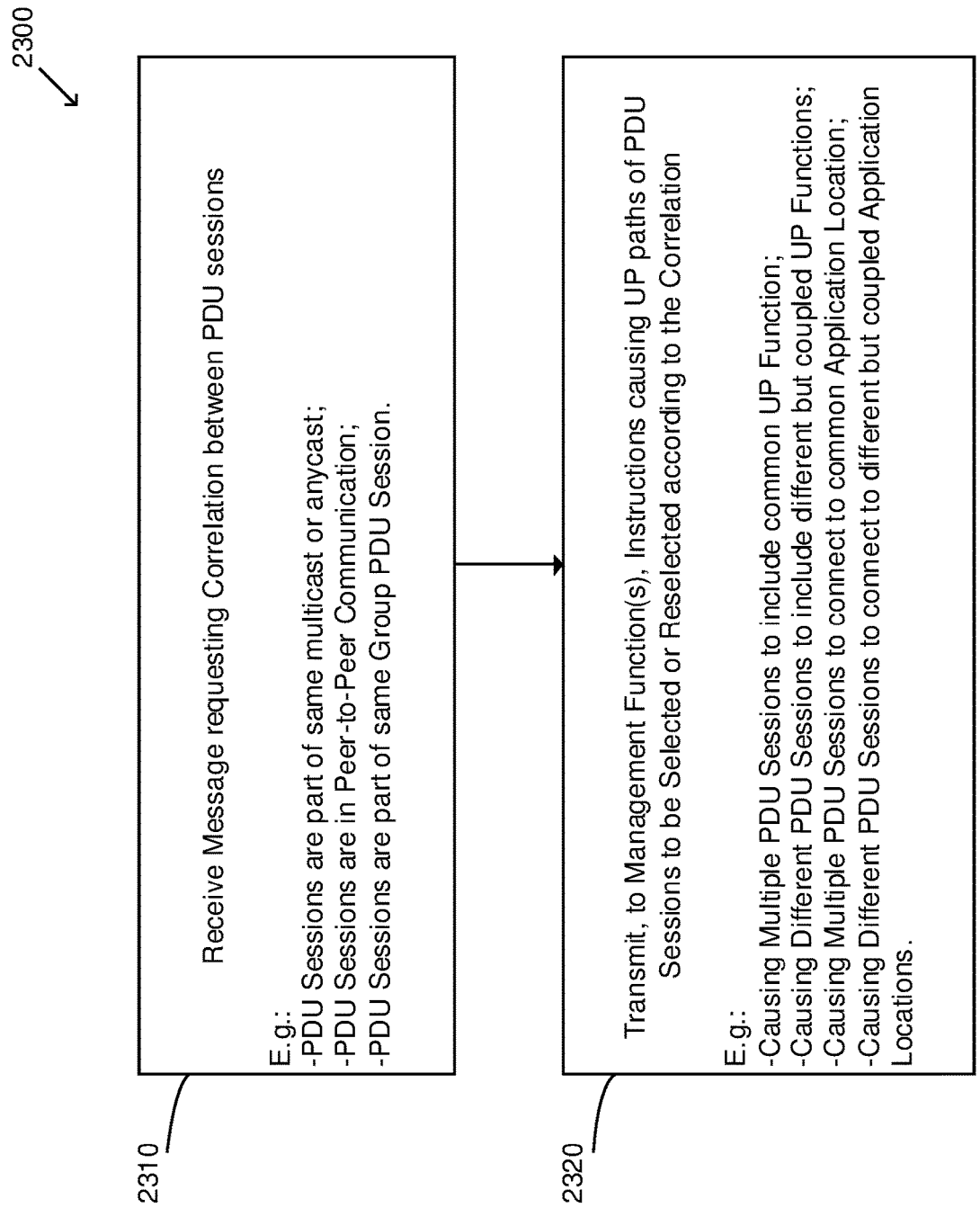
FIG. 23 illustrates a method, by a control function, for controlling user plane (UP) paths in a communication network, according to an embodiment of the present invention.
Figure 24:
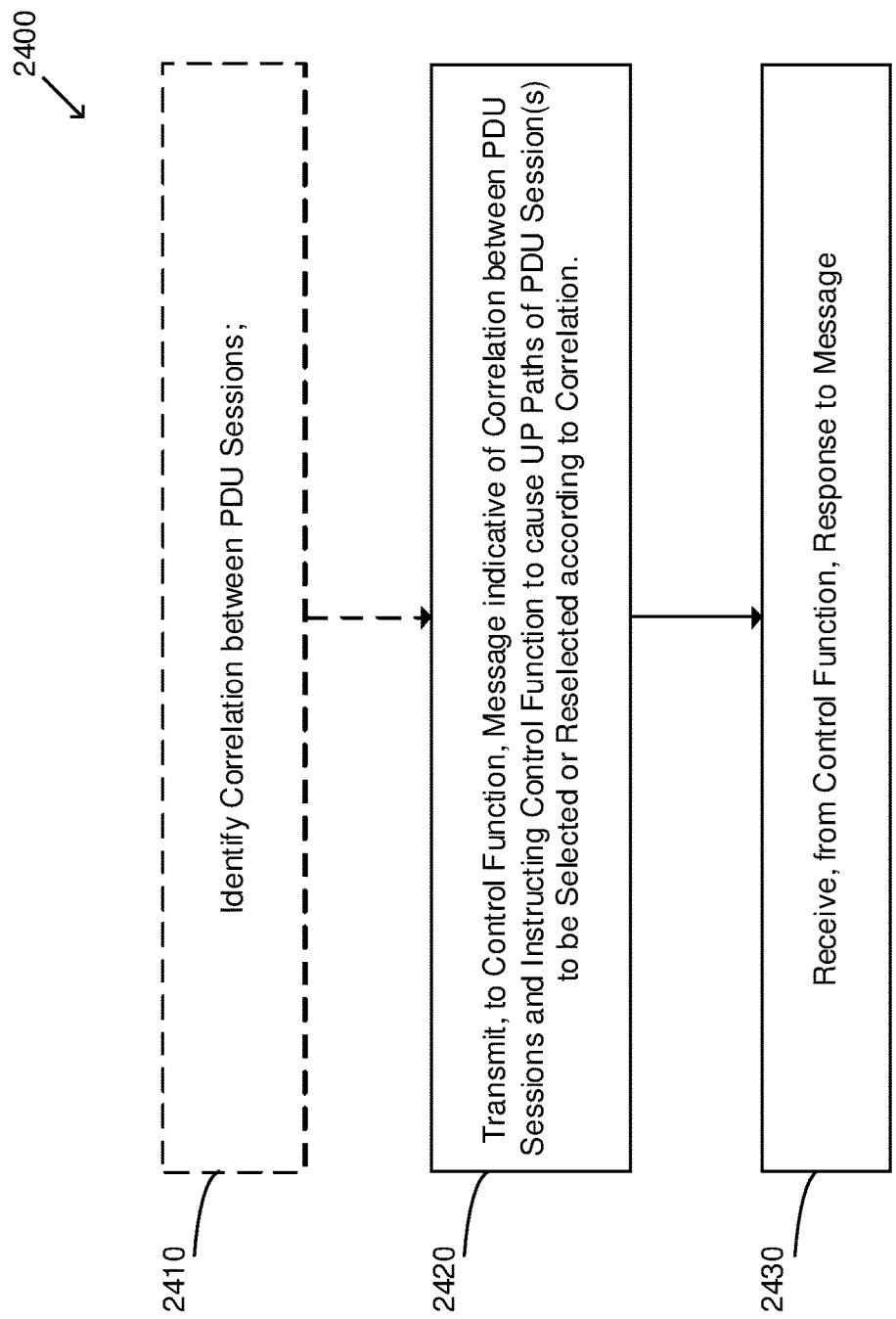
FIG. 24 illustrates a method, by a network function, for controlling user plane (UP) paths in a communication network, according to an embodiment of the present invention.
Figure 25:
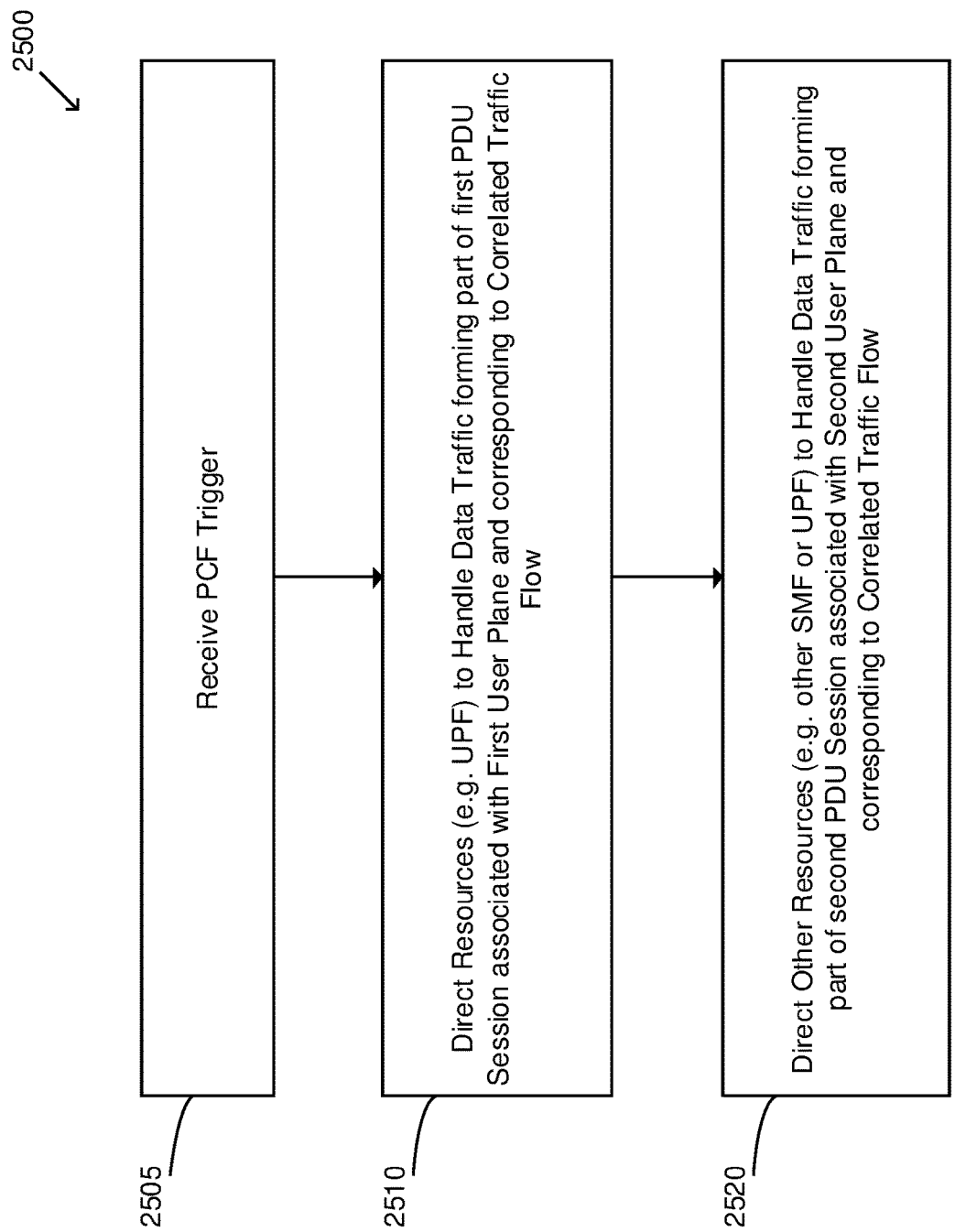
FIG. 25 illustrates a method for operating a session management function (SMF) for managing a PDU session, according to an embodiment of the present invention.

FIG. 22 is an example block diagram of a processing system 2201 that may be used for implementing the various network functions described herein. As shown in FIG. 22, processing system 2201 includes a processor 2210, working memory 2220, non-transitory storage 2230, network interface, I/O interface 2240, and depending on the node type, a transceiver 2260, all of which are communicatively coupled via bi-directional bus 2270.

According to certain embodiments, all of the depicted elements may be utilized, or only a subset of the elements. Further, the processing system 2201 may contain multiple instances of certain elements, such as multiple processors, memories, or transceivers. Also, elements of processing system 2201 may be directly coupled to other components without the bi-directional bus.

The memory may include any type of non-transitory memory such as static random access memory (SRAM), dynamic random access memory (DRAM), synchronous DRAM (SDRAM), read-only memory (ROM), any combination of such, or the like. The mass storage element may include any type of non-transitory storage device, such as a solid state drive, hard disk drive, a magnetic disk drive, an optical disk drive, USB drive, or any computer program product configured to store data and machine executable program code. According to certain embodiments, the memory or mass storage have recorded thereon statements and instructions executable by the processor for performing the aforementioned functions and steps.

The processing system 2201 can be used to implement a user plane function (UPF) or router or a CP function (PCF, SMF, etc.) as described herein.

Through the descriptions of the preceding embodiments, the present disclosure may be implemented by using hardware only or by using software and a necessary universal hardware platform. Based on such understandings, the technical solution of the present disclosure may be embodied in the form of a software product. The software product may be stored in a non-volatile or non-transitory storage medium, which can include the device memory as described above, or stored in removable memory such as compact disk read-only memory (CD-ROM), flash memory, or a removable hard disk. The software product includes a number of instructions that enable a computer device (computer, server, or network device) to execute the methods provided in the embodiments of the present disclosure. For example, such an execution may correspond to a simulation of the logical operations as described herein. The software product may additionally or alternatively include number of instructions that enable a computer device to execute operations for configuring or programming a digital logic apparatus in accordance with embodiments of the present disclosure.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method comprising:
   receiving, by a policy control function (PCF) from an application function (AF), a request indicating that a common application location is to be selected or reselected from at least one application location included in the request, wherein the request further comprises information to identify traffic;
   according to the request, generating, by the PCF, rules for multiple packet data unit (PDU) sessions associated with the traffic, wherein the rules indicate that the common application location is to be selected or reselected from the at least one application location included in the rules;
   sending, by the PCF, the rules to a session management function (SMF) for a selection or reselection of the common application location from the at least one application location during a selection or reselection of user plane (UP) paths for the multiple PDU sessions, wherein the UP paths include the common application location and one or more user plane functions (UPFs), the common application location being different from the one or more UPFs.

2. The method according to claim 1, wherein each of the at least one application location is expressed as a data network access identifier (DNAI) which provides access to an application server associated with the traffic.

3. The method according to claim 1, wherein the information to identify the traffic comprises a data network name (DNN) associated with the traffic.

4. The method according to claim 1, wherein the information to identify the traffic comprises a single network slice selection assistance information (S-NSSAI) associated with the traffic.

5. The method according to claim 1, wherein the information to identify the traffic comprises traffic filter information used to identify the traffic.

6. The method according to claim 5, wherein the traffic filter information comprises an IP 5 tuple.

7. The method according to claim 5, wherein the traffic filter information indicates how to detect the traffic.

8. The method according to claim 1, wherein the information to identify the traffic comprises an application ID associated with the traffic.

9. The method according to claim 1, wherein the request further comprises information on a UE group which the traffic is associated with.

10. The method according to claim 9, wherein the information on the UE group comprises an external group identifier of the UE group.

11. The method according to claim 9, wherein the multiple PDU sessions are identified according to at least one of the information to identify the traffic and the information on the UE group.

12. The method according to claim 1, wherein the common application location is shared by each of user plane (UP) paths selected or reselected for the multiple PDU sessions.

13. The method according to claim 12, wherein the SMF selects or reselects the common application location during selecting or reselecting the UP paths.

14. An apparatus implementing a policy control function (PCF) configured to:
receive, from an application function (AF), a request indicating that a common application location is to be selected or reselected from at least one application location included in the request, wherein the request further comprises information to identify traffic;
according to the request, generate rules for multiple packet data unit (PDU) sessions associated with the traffic, wherein the rules indicate that the common application location is to be selected or reselected from the at least one application location included in the rules; and
send the rules to a session management function (SMF) for a selection or reselection of the common application location from the at least one application location during a selection or reselection of user plane (UP) paths for the multiple PDU sessions, wherein the UP paths include the common application location and one or more user plane functions (UPFs), the common application location being different from the one or more UPFs.

15. The apparatus according to claim 14, wherein each of the at least one application location is expressed as a data network access identifier (DNAI) which provides access to an application server associated with the traffic.

16. The apparatus according to claim 14, wherein the information to identify the traffic comprises at least one of a data network name (DNN) associated with the traffic, a single network slice selection assistance information (S-NSSAI) associated with the traffic, traffic filter information used to identify the traffic, or an application ID associated with the traffic.

17. The apparatus according to claim 14, wherein the request further comprises information on a UE group, the information on the UE group comprising an external group identifier of the UE group which the traffic is associated with.

18. The apparatus according to claim 17, wherein the multiple PDU sessions are identified according to at least one of the information to identify the traffic and the information on the UE group.

19. The apparatus according to claim 14, wherein the common application location is shared by each of user plane (UP) paths selected or reselected for the multiple PDU sessions.

20. The apparatus according to claim 19, wherein the SMF is further configured to select or reselect the common application location during selecting or reselecting the UP paths.

21. A method comprising:
sending, by an application function (AF) to a policy control function (PCF), a request indicating that a common application location is to be selected or reselected from at least one application location included in the request, wherein the request further comprises information to identify traffic;
according to the request, generating, by the PCF, rules for multiple sessions associated with the traffic, wherein the rules indicate that the common application location is to be selected or reselected from the at least one application location included in the rules; and
sending, by the PCF, the rules to a session management function (SMF) for a selection or reselection of the common application location from the at least one application location during a selection or reselection of user plane (UP) paths for the multiple sessions, wherein the UP paths include the common application location and one or more user plane functions (UPFs), the common application location being different from the one or more UPFs.

22. A system comprising:
at least one processor;
at least one machine readable memory storing machine readable instructions, which when executed by the at least one processors, implements an application function (AF) and a policy control function (PCF);
wherein the AF is configured to:
send to the PCF a request indicating that a common application location is to be selected or reselected from at least one application location included in the request, wherein the request further comprises information to identify traffic;
the PCF is configured to:
generate rules for multiple sessions associated with the traffic based on the request, wherein the rules indicate that the common application location is to be selected or reselected from the at least one application location included in the rules; and
send the rules to a session management function (SMF) for a selection or reselection of the common application location from the at least one application location during a selection or reselection of user plane (UP) paths for the multiple sessions, wherein the UP paths include the common application location and one or more user plane functions (UPFs), the common application location being different from the one or more UPFs.

* * * * *